United States Patent [19]
Dorricott et al.

[11] Patent Number: 5,353,119
[45] Date of Patent: Oct. 4, 1994

[54] FORMAT CONVERSION OF DIGITAL VIDEO SIGNALS, INTEGRATION OF DIGITAL VIDEO SIGNALS INTO PHOTOGRAPHIC FILM MATERIAL AND THE LIKE, ASSOCIATED SIGNAL PROCESSING, AND MOTION COMPENSATED INTERPOLATION OF IMAGES

[75] Inventors: Martin R. Dorricott; Clive H. Gillard, both of Basingstoke; John W. Richards, Stockbridge, all of United Kingdom; Tsuneo Morita, Tokyo, Japan; James J. Galt, Glendale, Calif.; Morgan W. A. David, Farnham, United Kingdom; James E. Burns; Shima R. Varsani, both of Basingstoke, United Kingdom

[73] Assignee: Sony United Kingdom Limited, Staines, United Kingdom

[21] Appl. No.: 789,754

[22] Filed: Nov. 8, 1991

[30] Foreign Application Priority Data

| Nov. 15, 1990 | [GB] | United Kingdom | 9024816.2 |
| Nov. 15, 1990 | [GB] | United Kingdom | 9024817.0 |
| Nov. 15, 1990 | [GB] | United Kingdom | 9024818.8 |
| Nov. 15, 1990 | [GB] | United Kingdom | 9024825.3 |
| Nov. 15, 1990 | [GB] | United Kingdom | 9024826.1 |
| Nov. 15, 1990 | [GB] | United Kingdom | 9024827.9 |
| Nov. 15, 1990 | [GB] | United Kingdom | 9024828.7 |
| Nov. 15, 1990 | [GB] | United Kingdom | 9024829.5 |
| Nov. 15, 1990 | [GB] | United Kingdom | 9024835.2 |
| Nov. 15, 1990 | [GB] | United Kingdom | 9024836.0 |
| Nov. 15, 1990 | [GB] | United Kingdom | 9024837.8 |
| Nov. 15, 1990 | [GB] | United Kingdom | 9024838.6 |
| Nov. 15, 1990 | [GB] | United Kingdom | 9024838.6 |

[51] Int. Cl.$^5$ ............................................. H04N 7/01
[52] U.S. Cl. .................... 348/446; 348/459; 348/97
[58] Field of Search ............... 358/140, 11, 214, 335, 358/105; H04N 7/01

[56] References Cited

U.S. PATENT DOCUMENTS

| 4,184,177 | 1/1980 | Millward | 358/214 |
| 4,876,596 | 10/1989 | Faroudja | 358/140 |
| 4,881,125 | 11/1989 | Krause | 358/140 X |
| 4,982,280 | 1/1991 | Lyon et al. | 358/140 X |
| 5,115,311 | 5/1992 | Jaqua | 358/140 |
| 5,221,966 | 6/1993 | Clayton et al. | 358/140 |

Primary Examiner—Victor R. Kostak
Attorney, Agent, or Firm—William S. Frommer; Alvin Sinderbrand

[57] ABSTRACT

A system for integrating film material with a digital video signal employs a film scanner to produce a digital video signal from the source film, and a post production system for combining with that signal the input digital video signal. Motion interpolated temporal compensation is employed at stages of frame rate conversion.

5 Claims, 45 Drawing Sheets

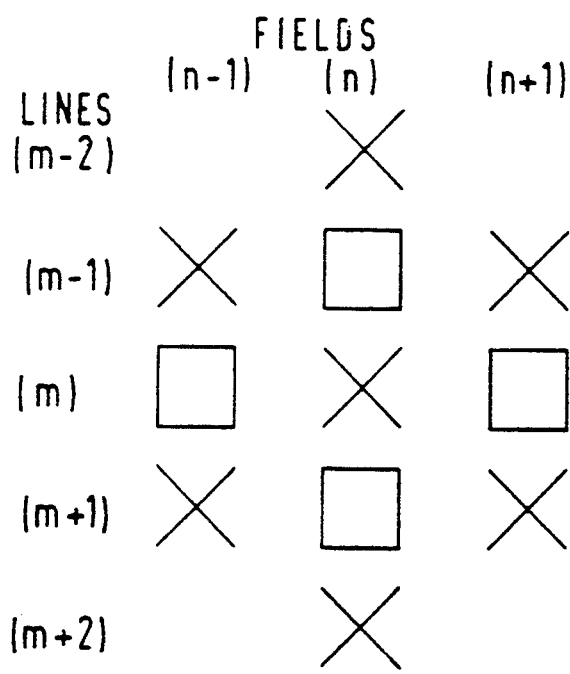
FIG. 5
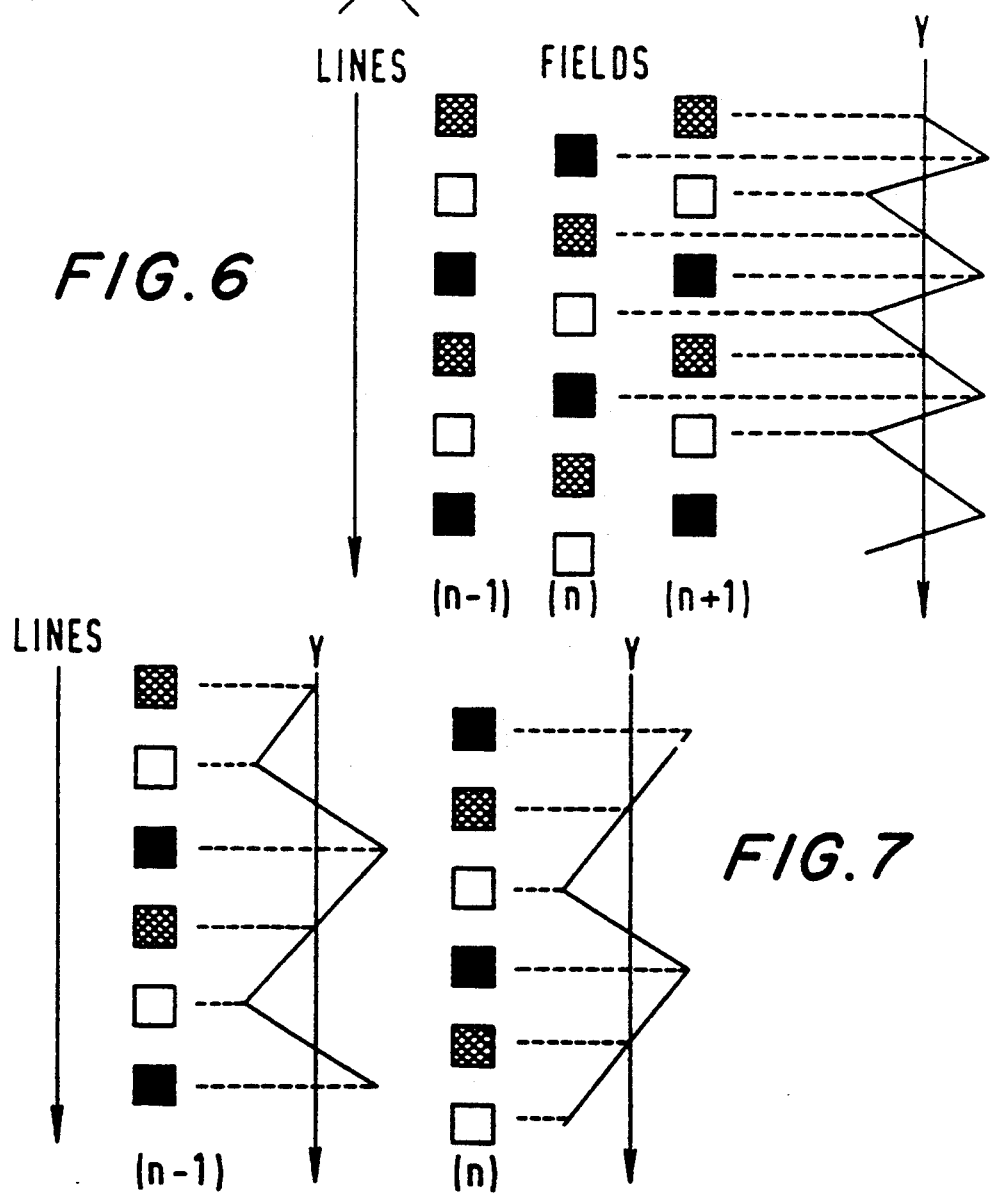
FIG. 6
FIG. 7

INTER-FRAME AVERAGE FOR STATIC PICTURES

INTRA-FIELD INTERPOLATION FOR MOVING PICTURES

FRAME N

FRAME (N+1)

SEARCH BLOCK 3A

SEARCH AREA

SEARCH BLOCKS
1A  2A  3A

FRAME (t)

MOTION (5,0)

FRAME (t+1)

1B    2B    3B
SEARCH AREAS.

FRAME OF VIDEO

SAMPLE BLOCKS
AND
POSITION OF SEARCH BLOCKS

REGION A

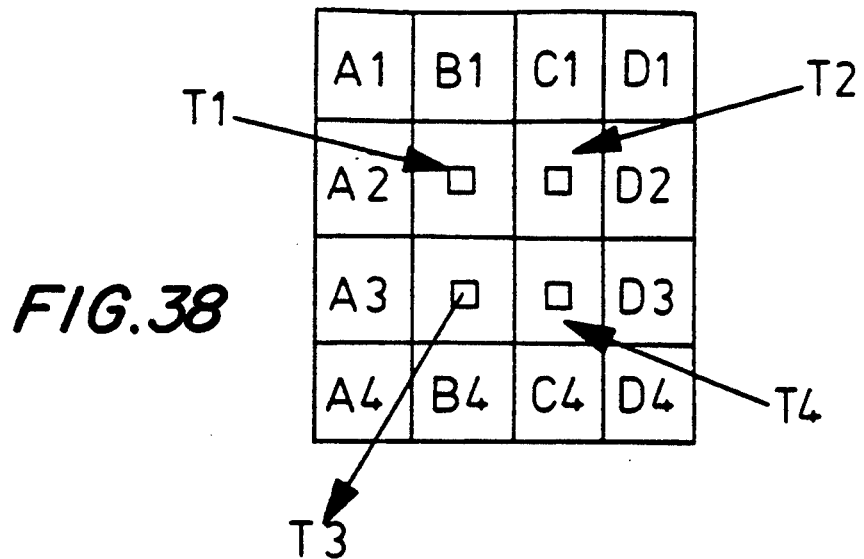
*FIG.38*
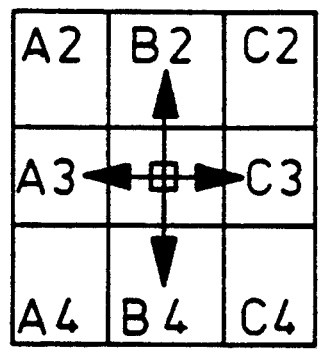
*FIG.39*
*FIG.40*
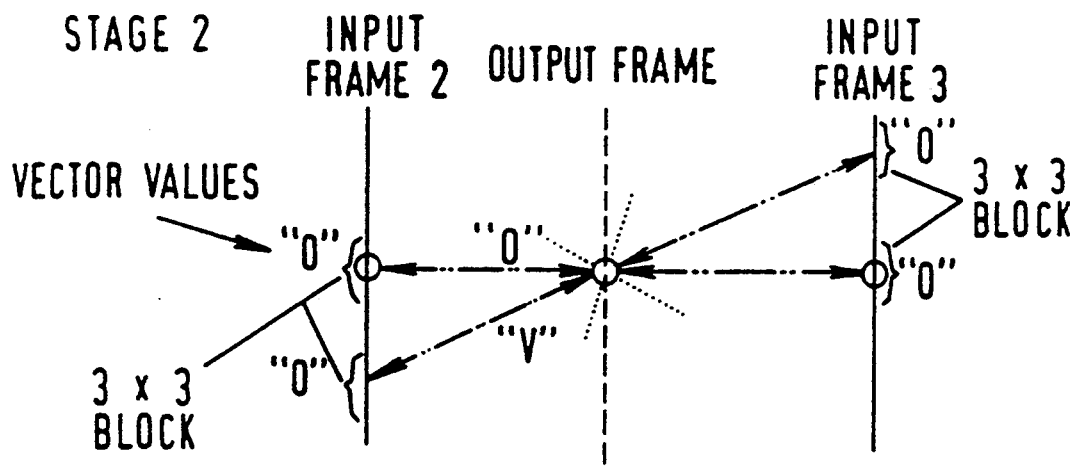

FIG. 45
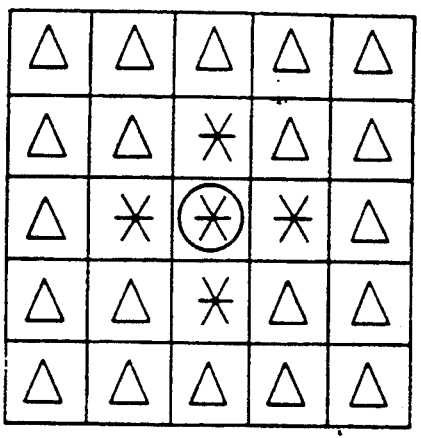
FIG. 46
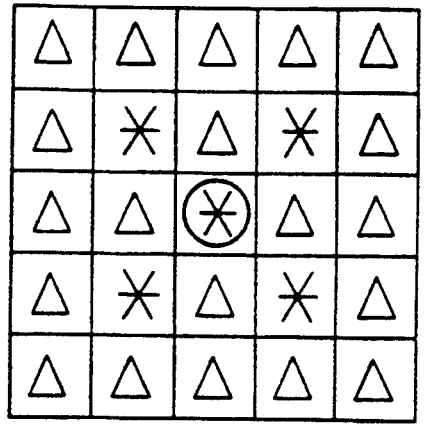
FIG. 47
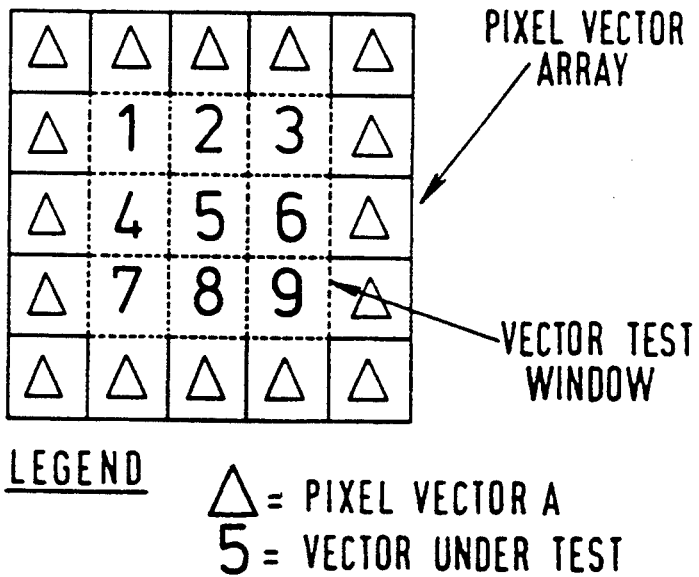
PIXEL VECTOR ARRAY
VECTOR TEST WINDOW
LEGEND
△ = PIXEL VECTOR A
5 = VECTOR UNDER TEST
FIG. 48
NO UNCOVERED OR COVERED SURFACES
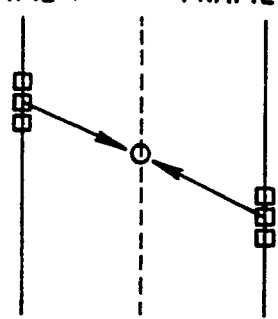
COVERED SURFACE
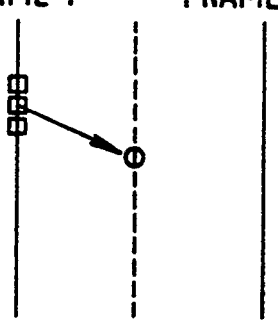
UNCOVERED SURFACE
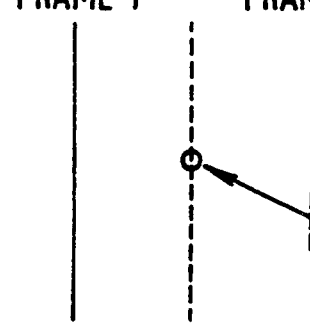

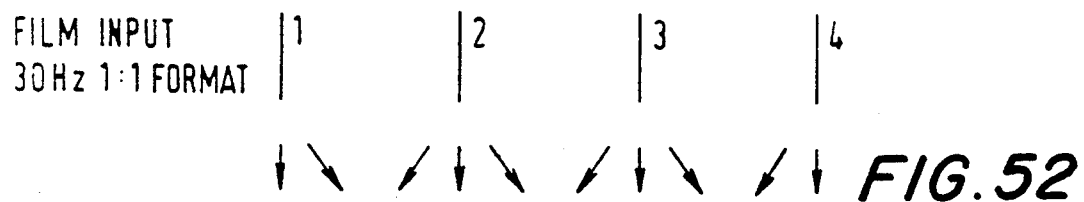
FIG. 52
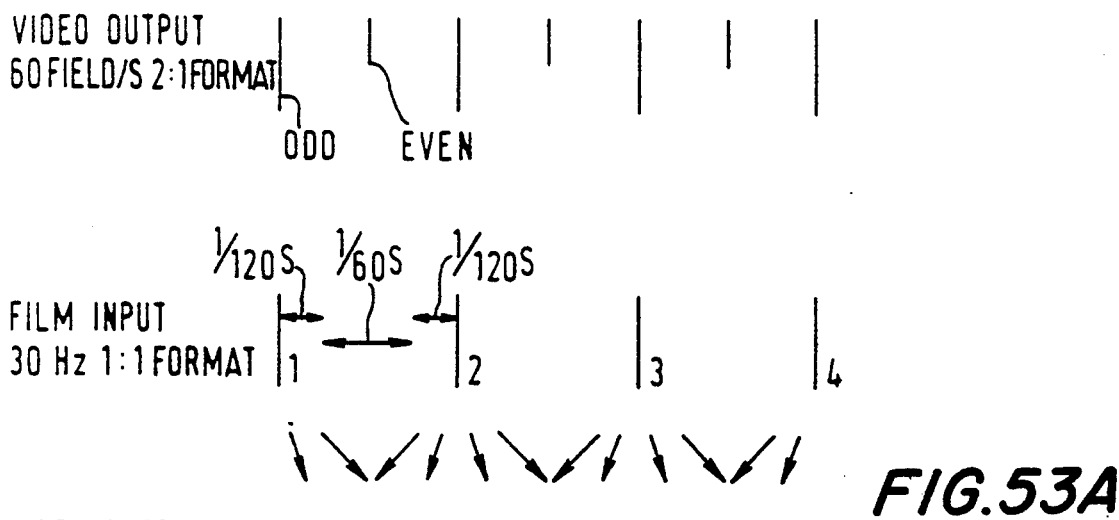
FIG. 53A
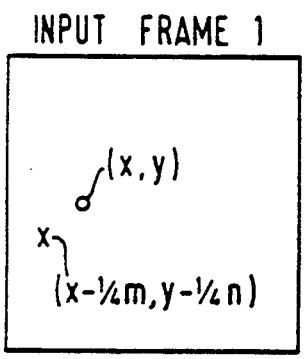 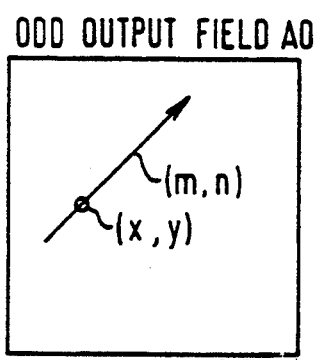 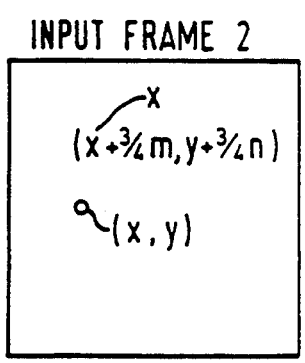
FIG.53B-1    FIG.53B-2    FIG.53B-3
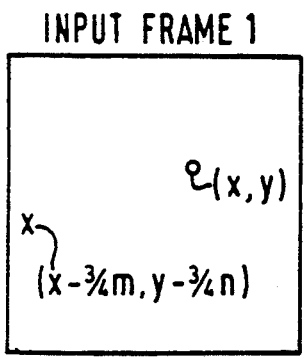 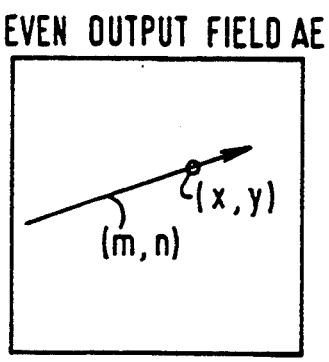 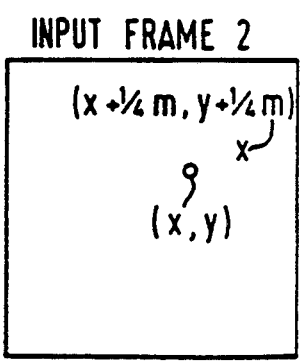
FIG.53C-1    FIG.53C-2    FIG.53C-3

FILM INPUT
24 Hz 1:1

VIDEO OUTPUT
60 FIELD/S
2:1 FORMAT

FILM INPUT
24 Hz 1:1

FILM OUTPUT
30 Hz 1:1

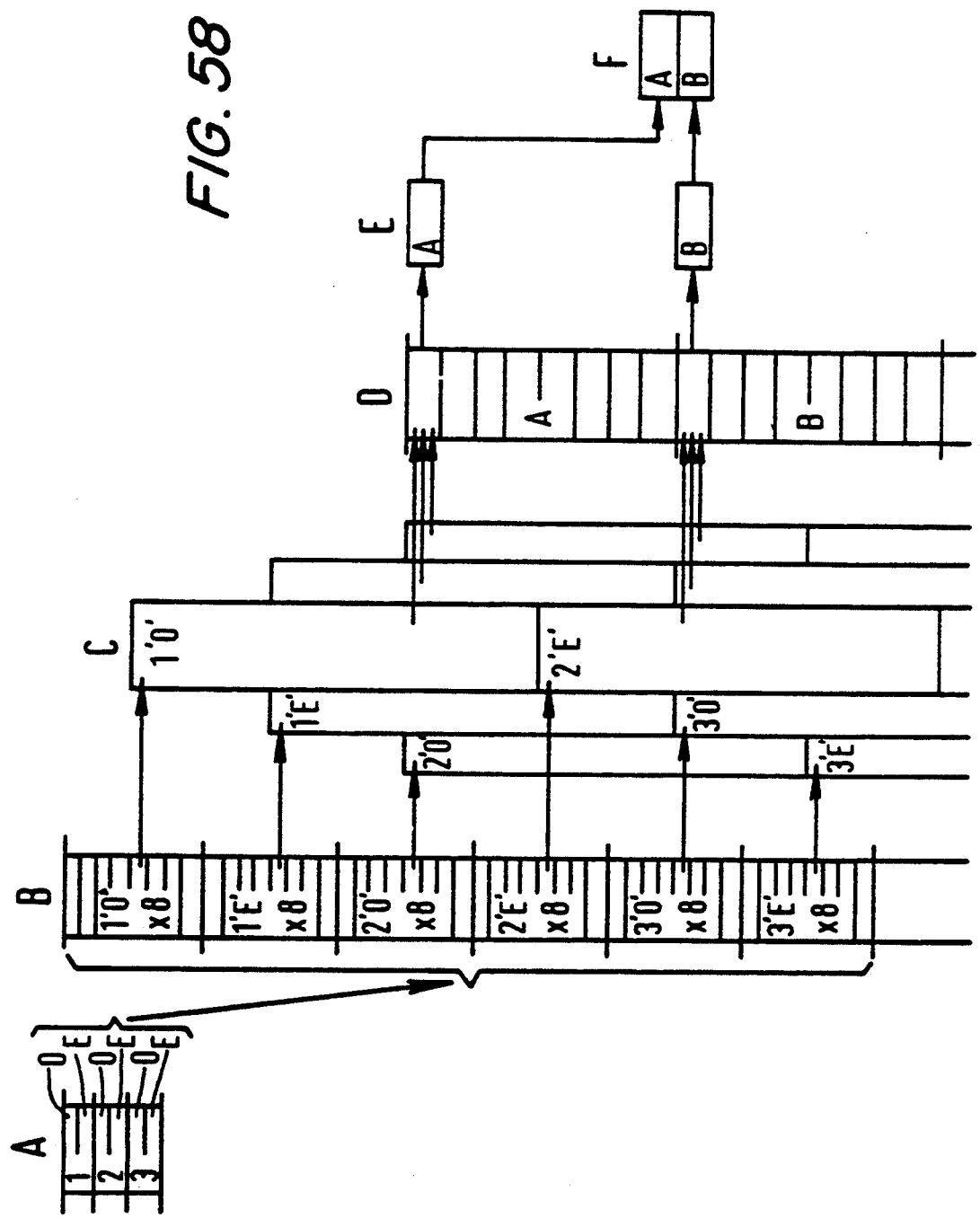

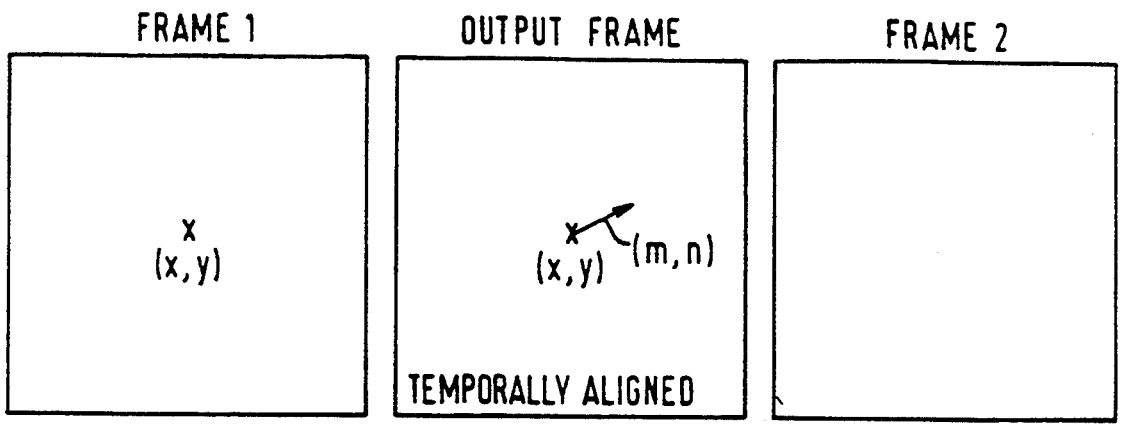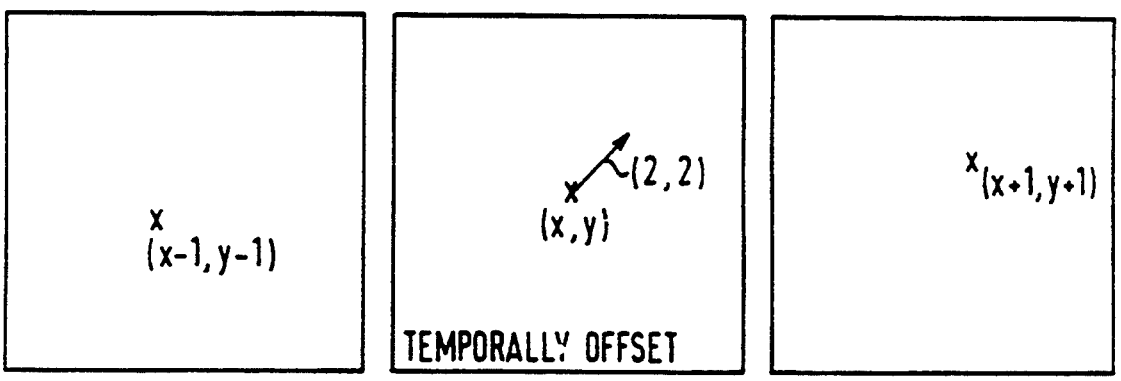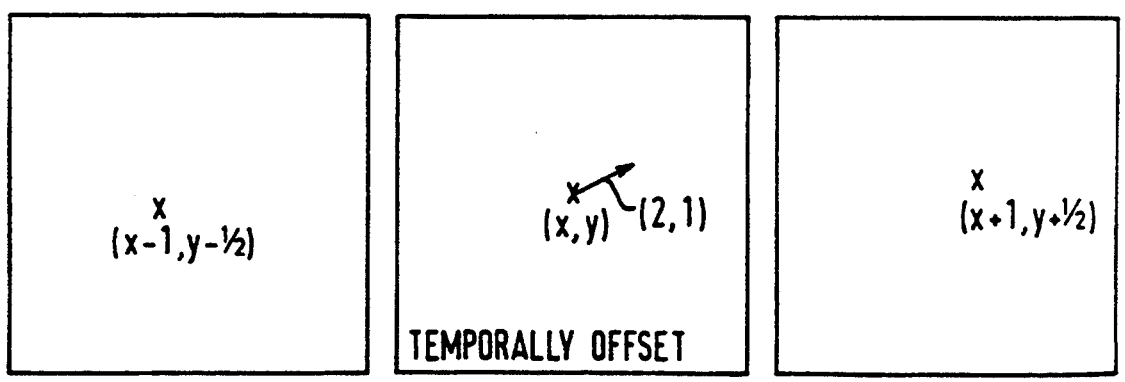

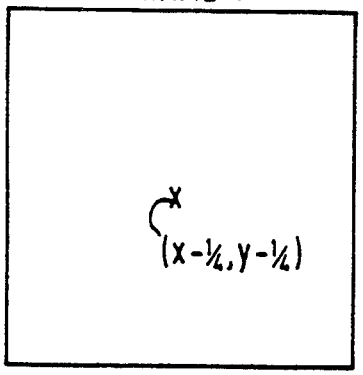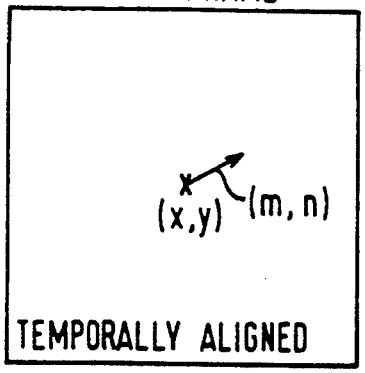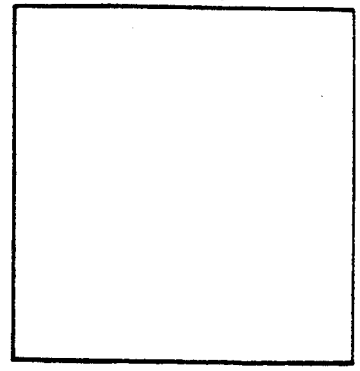

FORMAT CONVERSION OF DIGITAL VIDEO SIGNALS, INTEGRATION OF DIGITAL VIDEO SIGNALS INTO PHOTOGRAPHIC FILM MATERIAL AND THE LIKE, ASSOCIATED SIGNAL PROCESSING, AND MOTION COMPENSATED INTERPOLATION OF IMAGES

BACKGROUND OF THE INVENTIONS

Field of the Inventions

The first to fourth inventions disclosed herein relate to methods of format conversion of digital video signals. The fifth to ninth inventions disclosed herein relate to methods of integrating digital video signals into photographic film material. The tenth invention disclosed herein relates to associated signal processing apparatus. The eleventh and twelfth inventions disclosed herein relate to methods of motion compensated temporal interpolation.

Description of the Prior Art Relevant to the First Invention

In video signal production systems in which video signals are combined and/or manipulated, it is necessary that any signals to be combined are of, or are converted to, the same format. Accordingly, format conversion of input. signals to the format of the production system and/or format conversion of signals from the production system to a required output format becomes necessary for many applications.

In the case of integration of input 24 frame/s progressive scan format material with input 60 field/s 2:1 interlace scan format. material to produce output material primarily in 24 frame/s progressive scan format, it would seem appropriate: (a) to convert the input 24 frame/s progressive scan format to 60 field/s 2:1 interlace scan format; (b) for the production system to operate on the two 60 field/s 2:1 interlace scan format signals to produce a combined 60 field/s 2:1 interlace scan format signal; and (c) to convert the combined signal to 24 frame/s progressive scan format. Preferably, the latter conversion 'c' should employ motion compensated temporal interpolation, as described in United Kingdom patent application GB 2231228A in view of the change of frame rate. Also, the former conversion 'a' from 24 frame/s progressive scan format to 60 field/s 2:1 interlace scan format should employ motion compensated interpolation, if such is possible, again in view of the change of frame rate. However, there is a risk that motion compensated interpolation may introduce artifacts into the output image, and with two stages of motion compensated interpolation, as suggested above, such artifacts may prove to be unacceptable.

OBJECT AND SUMMARY OF THE FIRST INVENTION

An aim of the first invention is to provide a conversion method which may be used in an overall system as described above, but which may also have other applications, which obviates the need for two stages of motion compensated interpolation in such a system.

In accordance with the first invention, there is provided a method of converting an input 60 field/s 2:1 interlace scan format digital video signal to an output 24 frame/s 60 field/s 3232 pulldown format digital video signal, comprising the steps of:

forming a first series of 60 frame/s progressive scan format frames from the fields of the input signal;

forming a second series of 24 frame/s progressive scan format frames from the first series of frames such that at least every other frame in the second series of frames is produced by motion compensated interpolation between a respective pair of successive frames of the first series of frames; and outputting alternately odd and even fields from the second series of frames such that one field in every five is a repeat.

Such a 3232 pulldown format, as described in United Kigdom patent application GB 9018805.3 involves producing, from each of a series of four frames of the 24 frame/s progressive scan format frames, an odd and an even field, and also producing from the first arid third frames additional odd and even fields, respectively, referred to as 'phantom fields', which may then be ignored at the end of the production process. Accordingly, four frames in the 24 frame/s progressive scan format become ten fields in the 24 frame/s 60 field/s 3232 pulldown format.

By employing the conversion method of the first invention in an overall system as described above: (a) the input 24 frame/s progressive scan format material can be converted to 24 frame/s 60 field/s 3232 pulldown format without requiring motion compensated interpolation because there is no change of frame rate; (b) the input 60 field/s 2:1 interlace scan format signal can be converted to 24 frame/s 60 field/s 3232 pulldown format using the method according to the first invention and employing motion compensated interpolation as required; (c) the production system can operate on the two 24 frame/s 60 field/s 3232 pulldown format signals; and (d) the output signal from the production system in 24 frame/s 60 field/s 3232 pulldown format can be converted to 24 frame/s progressive scan format employing a drop field technique which drops the phantom fields but which does not require motion compensated interpolation because there is no change in frame rate. Accordingly between the two sources and the primary output there is only one stage of motion compensated interpolation.

In one example of the first invention alternate frames of the second series are produced by motion compensated interpolation equally between a respective successive pair of frames of the first series, and the remaining frames of the second series are not produced by motion interpolated compensation. Accordingly, alternate frames of the second series are equally temporally offset between pairs of frames of the first series, and the other frames of the second series are temporally aligned with frames of the first series.

In one form, the output fields are output at a rate of 5/2 times the rate of production of the frames in the second series of frames. This enables the required order of the output fields to equate with the order of their production.

In an alternative form, the. frames in the second series are stored at the same rate as they are produced, and the output fields are produced from the stored frames such that one field in every five is a repeat. This requires some re-ordering of the output fields, but may require less storage space to be used than in other examples.

In a preferred example of the first invention each input field is repeated with a repeat rate 4R (where R is an integer, for example 2) times, a frame is produced in the first series for every 4R repeated input fields, a frame is produced in the second series for every 10R repeated input fields, and each frame in the second series is repeated with a repeat rate of 5R times. This causes the conversion process to be slowed down to less than real-time rate, as may be required by the computational intensity of the conversion and interpolation methods.

An embodiment of the first invention is described particularly with reference to FIGS. 49 to 51 and 66 of the accompanying drawings.

Description of the Prior Art Relevant to the Second Invention

In the case of integration of input 30 frame/s progressive scan format material with input 60 field/s 2:1 interlace scan format material to produce output: material primarily in 24 or 30 frame/s progressive scan format, it would seem appropriate: (a) to convert the input 30 frame/s progressive scan format to 60 field/s 2:1 interlace scan format; (b) for the product ion system to operate on the two 60 field/s 2:1 interlace scan format signals to produce a combined 60 field/s 2:1 interlace scan format signal, because currently available post-production equipment requires the video signals to be interlaced; and (c) to convert the combined signal to 24 or 30 frame/s progressive scan format. Preferably, the latter conversion 'c', in the case of 24 frame/s output, should employ motion compensated interpolation, as described in the aforesaid patent application GB 2231228A in view of the change of frame rate. Also, the former conversion 'a' from 30 frame/s progressive scan format to 60 field/s 2:1 interlace scan format should employ motion compensated interpolation, if such is possible, again in view of the change of frame rate. However, there is a risk that motion compensated interpolation may introduce artifacts into the output: image, and with two stages of motion compensated interpolation, as suggested above, such artifacts may prove to be unacceptable.

OBJECT AND SUMMARY OF THE SECOND INVENTION

An aim of the second invention is to provide a conversion method which may be used in an overall system as described above, but which may also have other applications, which obviates the need for two stages of motion compensated interpolation in such a system.

In accordance with the second invention, there is provided a method of converting an input 60 field/s 2:1 interlace format digital video signal into an out. put 30 frame/s progressive scan format digital video signal, comprising the steps of:

forming a series of progressive scan format frames from the input fields; and forming the output. frames by motion compensated interpolation between respective pairs of successive frames of the series of progressive scan format frames.

By employing the conversion method of the second invention in an overall system as described above: (a) the input 30 frame/s progressive scan format material needs no conversion; (b) the input 60 field/s 2:1 interlace scan format signal can be converted to 30 frame/s progressive scan format using the method according to the invention and employing motion compensated interpolation as required; (c) the production system can operate on the two 30 frame/s progressive scan format signals; and (d) the output, signal from the production system in 30 frame/s progressive scan format can be directly used or can be converted to 24 frame/s progressive scan format employing motion compensated interpolation.

A production system which can operate on progressive scan format signals is described in the aforesaid patent application GB 9018805.3, the content of which is incorporated herein by reference.

Although, using the conversion method of the second invention in a system as described above employs motion compensated in step 'b' and also in step 'd' for 24 frame/s progressive scan format output, the method of the invention preferably also includes the step of selecting whether to form the output frames by motion compensated interpolation between respective pairs of successive frames of said series, or whether to form the output frames directly from alternate frames in said series. This is because when the source picture is noisy or there is an incorrect assessment in the formation of the progressive scan format frames, the picture will lose vertical detail and alias components will be present. However, when these problems do not arise, deselection of motion compensated interpolation will provide a satisfactory output image and in this case there will be no stages of motion compensated interpolation for 30 frame/s progressive scan format output, and only one stage for 24 frame/s progressive scan format output.

In the method of the second invention, preferably each output frame is interpolated half-way between the respective frames in said series of progressive scan format frames, and preferably a respective progressive scan format frame is formed in said series for each input field.

Also, the progressive format frames in said series are preferably formed using motion adaptive interpolation to produce each frame by intrafield interpolation within a respective input field and/or by interframe interpolation between successive input frames.

An embodiment of the second invention is described particularly with reference to FIGS. 57 to 60 and 67 to 70 of the accompanying drawings.

Description of the Prior Art Relevant to the Third Invention

In the case of integration of input 30 frame/s progressive scan format material with input 60 field/s 2:1 interlace scan format material to produce output material primarily in 60 field/s 2:1 interlace scan format, it would seem appropriate: (a) to convert the input 30 frame/s progressive scan format to 60 field/s 2:1 interlace scan format; and (b) for the production system to operate on the two 60 field/s 2:1 interlace scan format signals to produce a combined 60 field/s 2:1 interlace scan format signal.

The conversion from 30 frame/s progressive scan format to 60 field/s 2:1 interlace scan format involves a change in field rate, and if the conversion is carried out by forming pairs of output fields from the same input frame, then defects will arise in the output picture, such as judder.

OBJECT AND SUMMARY OF THE THIRD INVENTION

In order to deal with this problem, the third invention provides a method of converting an input 60 field/s 2:1 interlace scan format digital video signal in which the fields of each field pair in the input signal represent respective temporally identical portions of the input image into an output 60 field/s 2:1 interlace scan format digital video signal in which the fields of each field pair in the output signal represent respective temporally offset portions of the output image, comprising the steps of:

forming a series of progressive scan format frames from the field pairs of the input signal; and forming the output fields from the progressive scan format frames such that at least every other output field is produced by motion compensated interpolation between a respective pair of successive frames of the series of progressive scan format frames.

As mentioned before, motion compensated interpolation is described in patent application GB2231228A, but the method described therein relates only to interpolation in the case where the field rate is decreased, that is from 60 field/s 2:1 interlace scan format to 24 frame/s progressive scan format. In the method of the third invention, the field rate is increased, and this requires more complex techniques of motion compensated interpolation.

Preferably, every output field is produced by motion compensated interpolation between a respective pail of successive frames of the series of progressive scan format frames. By virtue of this feature, noise modulation in the output image is reduced. Specifically, the method preferably provides that:

one field of every output field pair is produced by motion interpolated compensation one-quarter of the way between a respective pair of successive frames of the series of progressive scan format frames; and the other field of every output field pair is produced by motion interpolated compensation three-quarters of the way between that pair of successive frames of the series of progressive scan format frames.

By virtue of this feature, the interpolated spatial response of the field pairs is evened out.

The method may further comprise the steps of:

repeating each input field at a repeat rate of N times (where N is greater than 1);

producing a respective frame of the series of progressive scan format frames for every 2N repeated input fields;

using each progressive scan format frame in contributing to four interlace scan format fields;

repeating each interlace scan format field at a repeat rate of N times; and outputting one in every N interlace scan format fields as a respective output field.

This feature causes the conversion process to be slowed clown to less than real-time rate, as may be required by the computational intensity of the conversion and interpolation processes.

The method may further comprise the step of generating the input 60 field/s 2:1 interlace scan format digital video signal from source material in 30 frame/s format such that the fields of each field pair of the input signal are produced from the same respective frame of the source material.

An embodiment of the third invention is described particularly with reference to FIGS. 52 to 54 and 68 to 70 of the accompanying drawings.

Description of the Piror Art Relevant to the Fourth Invention

In the case of integration of input 24 frame/s progressive scan format material with input 60 field/s 2:1 interlace scan format material to produce output material primarily in 60 field/s 2:1 interlace scan format, it would seem appropriate: (a) to convert the input 24 frame/s progressive scan format to 60 field/s 2:1 interlace scan format; and (b) for the production system to operate on the two 60 field/s 2:1 interlace scan format signals to produce a combined 60 field/s 2:1 interlace scan format signal. Also, in the case of integration of 24 frame/s progressive scan format material with 30 frame/s progressive scan format material to produce 30 frame/s progressive scan format material, it would seem appropriate: (a) to convert the input 24 frame/s progressive scan format to 30 frame/s progressive scan format material; and (b) for the production system to operate on the two 30 frame/s progressive scan format signals to produce a combined 30 frame/s progressive scan format signal.

The conversions from 24 frame/s progressive scan format to 60 field/s 2:1 interlace scan format or 30 frame/s progressive scan format involve a change in frame rate, and if the conversion is carried out by forming each output field or frame from the input frame which is temporally closest to that output field or frame, then defects will arise in the output picture, such as judder.

OBJECT AND SUMMARY OF THE FOURTH INVENTION

In order to deal with this problem, one aspect of the present invention provides a method of converting an input 24 frame/s progressive scan format digital video signal into an output 30 frame/s progressive scan format digital video signal, comprising the steps of forming the output frames from the input frames such that at least four of every five output frames are produced by motion compensated interpolation between successive pairs of the input frames.

Another aspect of the present invention provides a method of converting an input 24 frame/s progressive scan format digital video signal into an output 30 frame/s progressive scan format digital video signal, comprising the steps of forming the output frames from the input frames such that at least four of every five output frames are produced by motion compensated interpolation between successive pairs of the input frames.

As mentioned above, motion compensated interpolation is described in patent application GB2231228A, but the method described therein relates only to interpolation in the case where the frame rate is decreased, that is from 60 field/s 2:1 interlace scan formal to 24 frame/s progressive scan format. In the methods of the first and second aspects of the fourth invention, the frame rate is increased, and this requires more complex techniques of motion compensated interpolation.

Specifically, in the method of the first aspect of the fourth invention, preferably a series of five successive output fields are produced from a series of three successive input frames such that:

a) the first output field is produced from the first input frame not necessarily with motion compensated interpolation;

b) the second output: field is produced by motion compensated interpolation two-fifths of the way between the first and second input frames;

c) the third output field is produced by motion compensated interpolation four-fifths of the way between the first and second input frames;
d) the fourth output field is produced by motion compensated interpolation one-fifth of the way between the second and third input frames; and
e) the fifth output field is produced by motion compensated interpolation three-fifths of the way between the second and third input frames.

Alternatively, in the method of the second aspect of the fourth invention, preferably a series of five successive output frames are produced from a series of five successive input frames such that:
a) the first output frame is produced from the first input frame not necessarily with motion compensated interpolation;
b) the second output frame is produced by motion compensated interpolation four-fifths of the way between the first and second input frames;
c) the third output frame is produced by motion compensated interpolation three-fifths of the way between the second and third input frames;
d) the fourth output frame i s produced by mot ion compensated interpolation two-fifths of the way between the third and fourth input frames; and
e) the fifth output frame is produced by motion compensated interpolation one-fifth of the way between the fourth and fifth input frames.

Either method may further comprise the steps of repeating in a first series each input frame 5R times (where R is an integer such as 5), producing a new frame in a second series in the 60 field/s 2:1 interlace format for every 4R repeated input frames, repeating each new frame in the second series with a repeat rate of 4R times, and outputting one in every 4R fields of the second series of frames as a respective output field. This causes the conversion process to be slowed down to less than real-time rate, as may be required by the computational intensity of the conversion and interpolation methods.

In the case where the input frames are provided as 2:1 interlace field pairs in which the fields of each pair represent respective temporally identical portions of time input image, time fields of each input field pair are preferably each repeated with a repeat rate 5R times, an intermediate series of progressive scan format frames being produced from the input fields with each progressive scan format frame being produced from a respective pair of the fields, and the output fields being formed from the progressive scan format frames.

In the case of the method of the first aspect of the fourth invention, if the input frames are provided in 60 field/s 2:1 interlaced 3232 pulldown format (as described in the aforementioned patent application GB 9018805.3), the method may further comprise the steps of repeating in a first series each input field 4R times, producing once for every 10R repeated input fields a new progressive scan format frame in an intermediate series from pairs of successive non-repeat input fields, producing from the intermediate series a new frame in a second series in the 60 field/s 2:1 interlace format for every 4R repeated input frames, repeating each new frame in the second series with a repeat rate of 4R times, and outputting one in every 4R fields of the second series of frames as a respective output field.

An embodiment of the fourth invention is described particularly with reference to FIGS. 55, 56 and 67 of the accompanying drawings.

OBJECT AND SLiMMARY OF THE FIFTH INVENTION

In accordance with the fifth invention, there is provided a method of integrating input 24 frame/s format material with an input 60 field/s 2:1 interlace scan format digital video signal to produce an output 60 field/s 2:1 interlace scan format digital video signal, comprising the steps of:
(a) producing from the input 24 frame/s format material a 24 frame/s progressive scan format digital video signal;
(b) converting the 24 frame/s progressive scan format digital signal to a 60 field/s 2:1 interlace scan format digital video signal; and
(c) combining the signal so produced with the input 60 field/s interlace scan format digital video signal to produce a combined digital video signal.

Preferably, in conversion step 'b', at least some of the fields of the converted signal are produced using motion compensated interpolation between successive frames of the 24 frame/s progressive scan format digital video signal.

As mentioned above, moLlon compensated interpolation is described in patent application GB2231228A, but the method described therein relates only to interpolation in the case where the frame rate is decreased, that is from 60 field/s 2:1 interlace scan format to 24 frame/s progressive scan format. In the methods of the fifth invention, the frame rate is increased, and this requires more complex techniques of motion compensated interpolation.

Preferably, production step 'a' comprises the step of scanning 24 frame/s source material to produce the 24 frame/s progressive scan format digital video signal.

The method may further comprise the step of converting the combined 60 field/s 2:1 interlace scan format digital video signal to 30 frame/s progressive scan format. In this case, in the conversion to 30 frame/s progressive scan format, preferably none of the frames of the converted signal are produced using motion compensated interpolation between successive fields of the combined 60 field/s 2:1 interlace scan format digital video signal. Thus, two stages of motion compensated interpolation between a primary source and output are avoided. This example of the method may further comprise the steps of:
digital-to-analogue converting the 30 frame/s progressive scan format digital video signal to form a 30 frame/s progressive scan format analogue video signal; and
supplying the analogue video signal to a photographic recorder to record the content of the analogue video signal on photographic film in 30 frame/s format.

The method may further comprise the step of converting the combined 60 field/s 2:1 interlace scan format digital video signal to 24 frame/s progressive scan format. In this case, in the conversion to 24 frame/s progressive scan format, at least some of the frames of the converted signal may be produced using motion compensated interpoiation between successive fields of the combined 60 field/s 2:1 interlace scan format digital video signal. This example of the method may further comprise the steps of:
digital-to-analogue converting the 24 frame/s progressive scan format digital video signal to form a 24 frame/s progressive scan format analogue video signal; and supplying the analogue video signal to a photographic recorder to record the content of the analogue video signal on photographic film in 24 frame/s format.

The method may further comprise the step of converting the combined 60 field/s 2:1 interlace scan format digital video signal to at least one of the following formats:
NTSC format;
50 frame/s 1250-lines progressive scan format;
50 field/s 1250-lines 2:1 interlace scan format; and
50 field/s 625-lines 2:1 interlace scan format.

In this case, a further step may be provided of converting the 1250-lines format signal to 50 field/s 625-lines 2:1 interlace scan format.

An embodiment of the fifth invention is described particularly with reference to FIGS. 55, 56 and 67 of the accompanying drawings.

Description of the Prior Art Relevant to the Sixth Invention

In the case of integration of input 24 frame/s progressive scan format material (which may be derived from 24 frame/s format photographic film) with input 60 field/s 2:1 interlace scan format material to produce output material primarily in 24 frame/s progressive scan format, it would seem appropriate: (a) to convert the input 24 frame/s progressive scan format to 60 field/s 2:1 interlace scan format; (b) for the production system to operate on the two 60 field/s 2:1 interlace scan format signals to produce a combined 60 field/s 2:1 interlace scan format signal; and (c) to convert the combined signal to 24 frame/s progressive scan format. Preferably, the latter conversion 'c' should employ motion compensated interpolation, as described in the aforesaid patent application GB2231228A in view of the change of frame rate. Also, the former conversion 'a' from 24 frame/s progressive scan format to 60 field/s 2:1 interlace scan format should employ motion compensated interpolation, if such is possible, again in view of the change of frame rate. However, there is a risk that motion compensated interpolation may introduce artifacts into the output image, and with two stages of motion compensated interpolation, as suggested above, such artifacts may prove to be unacceptable.

OBJECT AND SUMMARY OF THE SIXTH INVENTION

An aim of the sixth invention is to provide a method which obviates the need for two stages of motion compensated interpolation.

In accordance with the sixth invention, there is provided a method of integrating input 24 frame/s progressive scan format material with an input 60 field/s 2:1 interlace scan format digital video signal to produce output 24 frame/s progressive scan format material, comprising the steps of:
(a) producing from the input progressive scan material a 60 field/s pulldown format digital video signal with phantom fields;
(b) converting the input 2:1 interlace scan format video signal to the 60 field/s pulldown format with phantom fields;
(c) combining the two video signals in 60 field/s pulldown format to produce a combined digital video signal; and
(d) producing the output progressive scan material from the nonphantom fields of the combined digital video signal.

The pulldown format may be a 3232 pulldown format, as described in the aforementioned patent application GB 9018805.3. This involves producing, from each of a series of four frames of the 24 frame/s progressive scan format frames, an odd and an even field, and also producing from the first and third frames additional odd and even fields, respectively, referred to as 'phantom fields', which may then be ignored at the end of the production process. Accordingly, four frames in the 24 frame/s progressive scan format become ten fields in the 24 frame/s 60 field/s 3232 pulldown format.

By employing the met hod of the sixth invention as described above: (a) the input 24 frame/s progressive scan format material can be converted to 24 frame/s 60 field/s pulldown format without requiring motion compensated interpolation because there is no change of frame rate; (b) the input 60 field/s 2:1 interlace scan format signal can be converted to 24 frame/s 60 field/s pulldown format using the method according to the sixth invention and employing motion compensated interpolation as required; (c) the production system can operate on the two 24 frame/s 60 field/s pulldown format signals; and (d) the output signal from the production system in 24 frame/s 60 field/s pulldown format can be converted to 24 frame/s progressive scan format employing a drop field technique which drops the phantom fields but which does not require motion compensated interpolation because there is no change in frame rate. Accordingly between the two sources and the primary output there is only one stage of motion compensated interpolation.

Production step 'a' may comprise the steps of:
scanning 24 frame/s format source material film to produce a 24 frame/s progressive scan format digital video signal; and
producing from the 24 frame/s progressive scan format digital signal the 60 field/s pulldown format video signal having pairs of fields representing portions of the same frame and the phantom fields.

Production step 'd' may comprise the steps of:
dropping the phantom fields from the combined digital signal and combining pairs of fields of the resultant signal to produce a 24 frame/s progressive scan format digital video signal;
digital-to-analogue converting the 24 frame/s progressive scan format digital video signal to form a 24 frame/s progressive scan format analogue video signal; and
supplying the analogue video signal to a photographic recorder to record the content of the analogue video signal on photographic film.

In this case, the method may further comprise the step of converting the 24 frame/s progressive scan format digital video signal to at least one of the following formats:
pseudo-50 field/s 625-lines 2:1 interlace scan format;
pseudo-50 frame/s progressive scan high-definition format; and
pseudo-50 field/s 2:1 interlace scan format.

If desired for any purpose, the method may further comprise the step of outputting the combined pulldown format digital video signal.

The method may further comprise the step of converting the combined pulldown format digital video signal to at least one of the following formats:

NTSC format; and 60 field/s 2:1 interlace scan high-definition digital video format.

In this case, the method may further comprise the step of converting the 60 field/s 2:1 interlace scan high-definition format digital video signal to NTSC format.

An embodiment of the sixth invention is described particularly with reference to FIGS. 49 to 51 and 66 of the accompanying drawings.

OBJECT AND SUMMARY OF THE SEVENTH INVENTION

In accordance with the seventh invention there is provided a method of integrating input 30 frame/s format material and a 60 field/s 2:1 interlace scan format digital video signal to produce an output 60 field/s 2:1 interlace scan format digital video signal, comprising the steps of:

(a) producing from the input 30 frame/s format material a 30 frame/s progressive scan format digital video signal;

(b) converting the 30 frame/s progressive scan format digital signal to a 60 field/s 2:1 interlace scan format digital video signal; and (c) combining the converted signal with the input 60 field/s interlace scan format digital video signal to produce a combined digital video signal.

The conversion from 30 frame/s progressive scan format to 60 field/s 2:1 interlace scan format involves a change in field rate, and if the conversion is carried out by forming pairs of output fields from the same input frame, then defects will arise in the output picture, such as judder.

In order to deal with this problem, in conversion step 'b', at least some of the fields of the converted signal are produced using motion compensated interpolation between successive frames of the 30 frame/s progressive scan format digital video signal.

In one example of the method, production step 'a' comprises the step of scanning 30 frame/s format source material to produce the 30 frame/s progressive scan format digital video signal.

The method according to the seventh invention may also be used to integrate input 60 frame/s format material and the 60 field/s 2:1 interlace scan format dig tal video signal to produce the output 60 field/s 2:1 interlace scan format digital video signal, and in this case further comprises the steps of:

producing from the input 60 frame/s format material a 60 frame/s progressive scan format digital video signal;

converting the 60 frame/s progressive scan format digital signal to a 60 field/s 2:1 interlace scan format digital video signal by a pull-down every field technique; and combining the converted signal with the input 60 field/s interlace scan format dig tal video signal to produce the combined digital video signal.

The method may optionally comprise the step of converting the combined 60 field/s 2:1 interlace scan format digital video signal to 30 frame/s progressive scan format. In this case, in the conversion to 30 frame/s progressive scan format, preferably none of the frames of the converted signal are produced using motion compensated interpolation between successive fields of the combined 60 field/s 2:1 interlace scan format digital video signal. This example of the method may further comprise the steps of:

digital-to-analogue converting the 30 frame/s progressive scan format digital video signal to form a 30 frame/s progressive scan format analogue video signal; and supplying the analogue video signal to a photographic recorder to record the content of the analogue video signal on photographic film in 30 frame/s format.

The method may further comprise the step of converting the combined 60 field/s 2:1 interlace scan format digital video signal to 24 frame/s progressive scan format. In this case, in the conversion to 24 frame/s progressive scan format, at least some of the frames of the converted signal are preferably produced using motion compensated interpolation between successive fields of the combined 60 field/s 2:1 interlace scan format digital video signal. This example of the method may further comprise the steps of:

digital-to-analogue converting the 24 frame/s progressive scan format digital video signal to form a 24 frame/s progressive scan format analogue video signal; and supplying the analogue video signal to a photographic recorder to record the content of the analogue video signal on photographic film in 24 frame/s format.

The method may further comprise the step of converting the combined 60 field/s 2:1 interlace scan format digital video signal to at least one of the following formats:

NTSC format;

50 frame/s 1250-1ines progressive scan format;

50 field/s 1250-lines interlace scan format; and 50 field/s 625-lines 2:1 interlace scan format.

In this case the method may further comprise the step of converting the 1250-lines format signal to 50 field/s 625-1ines 2:1 interlace scan format.

An embodiment of the seventh invention is described particularly with reference to FIGS. 52 to 54 and 69 of the accompanying drawings.

Description of the Prior Art Relevant to the Eighth Invention

In the case of integration of input 30 frame/s progressive scan format material with input 30 frame/s progressive scan format: video signals and optionally with input 60 field/s 2:1 interlace scan format material to produce output material primarily in 30 frame/s progressive scan format, it would seem appropriate: (a) to convert the input 30 frame/s progressive scan format signals to 60 field/s 2:1 interlace scan format; (b) for the production system to operate on the 60 field/s 2:1 interlace scan format signals to produce a combined 60 field/s 2:1 interlace scan format signal, because currently available postproduction equipment requires the video signals to be interlaced; and (c) to convert the combined signal to 30 frame/s progressive scan format. The former conversion 'a' from 30 frame/s progressive scan format to 60 field/s 2:1 interlace scan format should employ motion compensated interpolation, if such is possible, in view of the change of field rate. However, there is a risk that motion compensated interpolation may introduce artifacts into the output image.

OBJECT AND SUMMARY OF THE EIGHTH INVENTION

An aim of the eighth invention is to provide a method generally as described above, which obviates the need for motion compensated interpolation between the primary sources and output.

In accordance with the eighth invention, there is provided a method of integrating input 30 frame/s progressive scan format material with an input 30 frame/s progressive scan format digital video signal to produce output 30 frame/s progressive scan format material, comprising the steps of:
(a) producing from the input progressive scan material a 30 frame/s progressive scan format digital video signal;
(b) combining the 30 frame/s progressive scan format signal with the input 30 frame/s progressive scan format signal to produce a combined 30 frame/s progressive scan format digital video signal; and
(c) producing the output progressive scan material from the combined digital video signal.

By employing this method: (a) the input 30 frame/s progressive scan format material needs no conversion; (b) any optional input 60 field/s 2:1 interlace scan format signal can be converted to 30 frame/s progressive scan format using a methoot which does not necessarily require motion compensated interpolation; (c) the production system can operate on the two 30 frame/s progressive scan format signals; and (d) the output signal from the production system in 30 frame/s progressive scan format can be directly used.

A production system which can operate on progressive scan format signals is described in the aforementioned patent application GB 9018805.3.

In view of the above, the method optionally includes the step of converting an input 60 field/s 2:1 interiace scan format digital video signal to 30 frame/s progressive scan format to form the or an input 30 frame/s progressive scan format digital video signal. In this case, in the conversion from the 60 field/s 2:1 interlace scan format signal to the 30 frame/s progressive scan format signal, preferably none of the frames of the converted signal are produced using motion compensated interpolation between successive fields of the input 60 field/s 2:1 interlace scan format signal.

Production step 'c' may comprise the step of scanning 30 frame/s format source material to produce the 30 frame/s progressive scan format digital video signal.

Production step 'c' may comprise the steps of:
digital-to-analogue converting the 30 frame/s progressive scan format digital video signal to form a 30 frame/s progressive scan format analogue video signal; and
supplying the analogue video signal to a photographic recorder to record the content of the analogue video signal on photographic film.

The method may further comprise the step of converting the combined 30 frame/s progressive scan format signal to a 60 field/s 2:1 interlace scan format signal. In this case, at least some of the fields of the 60 field/s 2:1 interlace scan format signal may be produced using motion compensated interpolation between successive frames of the combined 30 frame/s progressive scan format signal. Furthermore, this example of the method may further comprise the step of converting the combined 60 field/s 2:1 interlace scan format digital video signal to 24 frame/s progressive scan format. In this case, in the conversion to 24 frame/s progressive scan format, at least some of the frames of the converted signal may be produced using motion compensated interpolation between successive fields of the combined 60 field/s 2:1 interlace scan format digital video signal. The method may further comprise the steps of:
digital-to-analogue converting the 24 frame/s progressive scan format digital video signal to form a 24 frame/s progressive scan format analogue video signal; and
supplying the analogue video signal to a photographic recorder to record the content of the analogue video signal on photographic film in 24 frame/s format.

If a conversion to 60 field/s 2:1 interlace scan format is provided, the method may further comprise the step of converting the combined 60 field/s 2:1 interlace scan format digital video signal to at least one of the following formats:
NTSC format;
50 frame/s 1250-lines progressive scan format;
50 field/s 1250-1ines 2:1 interlace scan format; and
50 field/s 625-lines 2:1 interlace scan format.

In this case, the method may furtimer comprise the step of converting the 1250-lines format signal to 50 field/s 625-lines 2:1 interlace scan format.

An embodiment of the eighth invention is described particularly with reference to FIGS. 57, 58 and 68 of the accompanying drawings.

Description of the Prior Art Relevant to the Ninth Invention

In the case of integration of input 30 frame/s progressive scan format material (such as photographic film) with input 30 frame/s progressive scan format material to produce output material primarily in 24 frame/s progressive scan formaL, it would seem appropriate: (a) to convert the input 30 frame/s progressive scan formats to 60 field/s 2:1 interlace scan format; (b) for the production system to operate on the two 60 field/s 2:1 interlace scan format signals to produce a combined 60 field/s 2:1 interlace scan formal signal, because currently available post-production equipment requires the video signals to be interlaced; and (c) to convert the combined signal to 24 frame/s progressive scan format. Preferably, the latter conversion 'c', in the case of 24 frame/s output, would employ motion compensated interpolation, as described in the aforementioned patent application GB2231228A in view of the change of frame rate. Also, the former conversion 'a' from 30 frame/s progressive scan format to 60 field/s 2:1 interlace scan format should employ motion compensated interpolation, if such is possible, again in view of the change of frame rate. However, there is a risk that motion compensated interpolation may introduce artifacts into the output image, and with two stages of motion compensated interpolation, as suggested above, such artifacts may prove to be unacceptable.

OBJECT AND SUMMARY OF THE NINTH INVENTION

An aim of the ninth invention is to provide a method generally as described above, which obviates the need for two stages of motion compensated interpolation.

In accordance with the ninth present invention, there is provided a method of integrating input 30 frame/s progressive scan format material with an input 30 frame/s progressive scan format digital video signal to produce output 24 frame/s progressive scan format material, comprising the steps of:

(a) producing from the input progressive scan material a 30 frame/s progressive scan format digital video signal;
(b) combining the 30 frame/s progressive scan format signal with the input 30 frame/s progressive scan format signal to produce a combined 30 frame/s progressive scan format digital video signal;
(c) converting the combined 30 frame/s progressive scan format video signal to a 24 frame/s progressive scan format digital video signal employing motion compensated interpolation; and
(d) producing the output 24 frame/s progressive scan material from the combined digital video signal.

By this method: (a) the input 30 frame/s progressive scan format signals need no format conversion; (b) the production system operates on the two 30 frame/s progressive scan format signals; and (c) the output signal from the production system in 30 frame/s progressive scan format is converted to 24 frame/s progressive scan format employing motion compensated interpolation. Thus, there is only one stage of motion compensated interpolation between the primary inputs and outputs.

As mentioned above, a production system which can operate on progressive scan format signals is described in patent application GB 9018805.3, the content of which is incorporated herein by reference.

The method may further comprise the step of converting an input 60 field/s 2:1 interlace scan format digital video signal to 30 frame/s progressive scan format to form the input 30 frame/s progressive scan format digital video signal. In this case, in the conversion from the 60 field/s 2:1 interlace scan format signal to the 30 frame/s progressive scan format signal, preferably none of the frames of the converted signal are produced using motion compensated interpolation between successive fields of the input 60 field/s 2:1 interlace scan format signal.

Production step 'a' may comprise the step of scanning 30 frame/s format source material to produce the 30 frame/s progressive scan format digital video signal.

Production step 'd' may comprise the steps of:
digital-to-analogue converting the 24 frame/s progressive scan format digital video signal to form a 24 frame/s progressive scan format analogue video signal; and
supplying the analogue video signal to a photographic recorder to record the content of the analogue video signal on photographic film in 24 frame/s format.

The method may further comprise the steps of:
digital-to-analogue converting the 30 frame/s progressive scan format digital video signal to form a 30 frame/s progressive scan format analogue video signal; and
supplying the analogue video signal to a photographic recorder to record the content of the analogue video signal on photographic film in 30 frame/s format.

The method may also t urther comprise the step of converting the combined 30 frame/s progressive scan format signal to a 60 field/s 2:1 interlace scan format signal. In this case, at least some of the fields of the 60 field/s 2:1 interlace scan format signal are preferably produced using motion compensated interpolation between successive frames of the combined 30 frame/s progressive scan format signal. Also, the method may further comprise the step of converting the combined 60 field/s 2:1 interlace scan format digital video signal to at least one of the following formats:
NTSC format;
50 frame/s 1250-lines progressive scan format;
50 field/s 1250-lines 2:1 interlace scan format; and
50 field/s 625-lines 2:1 interlace scan format.

In this case, the method may further comprise the step of converting the 1250-lines format signal to 50 field/s 625-lines interlace scan format.

An embodiment of the ninth invention is described particularly with reference to FIGS. 70 of the accompanying drawings.

Description of the Prior Art Relevant to the Tenth Invention

Aforementioned patent application GB2231228A describes an arrangement in which a VTR plays at one-eighth speed into a standards converter, and the standards converter provides ten repeats of each output frame. A frame recorder stores one in every ten of the repeated output frames until it is full, and the stored frames are then output at normal speed to a VTR which records at normal speed. The material is therefore converted in segments, entailing starting, stopping and cuing of both of the VTRs. In order to convert one hour of source material using a frame recorder with a capacity of 256 frames, it is necessary to start, stop and cue each of the recorders 338 times, and it will be realised that this can cause considerable wear of both recorders. Furthermore, the operations of alternately reading from the input VTR and then recording on the output VTR, with cuing of both recorders results in the conversion process being slow. Indeed, in the example given above, although the standards converter processes at one-eighth speed, the conversion of one hour of material would take not 8 hours, but almost 11 hours. With smaller capacity frame recorders, the wasted the would be increased.

OBJECT AND SUMMARY OF THE TENTH INVENTION

An aim of a first aspect of the tentim invention is to increase the conversion rate of the arrangement described above.

In accordance with the first aspect of the tenth invention, there is provided a signal processing apparatus, comprising:
source means for outputting at a first signal rate a first signal having a second inherent signal rate which is faster than the first signal rate;
processing means for processing the first signal at the first rate and outputting at the first signal rate a second processed signal having a third inherent signal rate which is faster than the first signal rate;
post-processing storage means for temporarily storing the second signal at said first signal rate and for outputting the stored signal as a third signal at the faster third signal rate; and
recording means for recording the third signal at the third signal rate;
wherein the storage means is operable to store the second signal continuously and to output: the third signal intermittently and at the same the as storing the second signal.

It can therefore be arranged that the source means and the processing means operate non-stop.

In one embodiment, the storage means comprises:
at least two sub-storage means; and control means for controlling the sub-storage means such that portions of the second signal are stored alternately in the sub-storage means, and such that, while a portion of the second signal is being stored in one of the sub-storage means, a portion of the third signal can be output from the other, or one of the other, sub-storage means.

However, in another embodimenL the storage means is operable:

to store the second signal continuously at storage locations which are cycled continuously in the storage means;

to output the third signal at the same time as the second signal is being stored and intermittently such that no portion of the stored signal is overwritten before it is output as a portion of the third signal.

This latter embodiment requires less storage capacity in the storage means.

The arrangement described in GB2231228A requires a VTR capable of providing a slow-motion output. An aim of a second aspect of the tenth invention is to obviate the need for a slow-motion VTR, or like source.

In accordance with the second aspect of the tenth invention, there is provided a signal processing apparatus, comprising:

source means for intermittently outputting a fourtim signal at a second signal rate inherent to the fourth signal;

pre-processing storage means for temporarily storing the fourth signal at the second signal rate and for repeatedly outputting elements of the stored signal as a first signal at a slower first signal rate; and processing means for processing the first signal at the first rate and for outputting at the first signal rate a second processed signal having a third inherent signal rate which is faster than the first signal rate; and recording means for recording the second signal.

Accordingly, the source means can operate at normal speed intermittently, and the pre-process ing storage means can provide the slow-motion output to the processing means.

In one embodiment, the pre-processing storage means may comprise:

at least two sub-storage means; and control means for controlling the sub-storage means such that portions of the fourth signal are stored intermittently and alternately in the sub-storage means, such that, while a portion of the fourtim signal is being stored in one of the sub-storage means, a portion of the first signal is output from the other, or one of the other, substorage means, and such that the first signal is output continuously.

However, in another embodiment, the pre-processing storage means is operable:

to store the fourth signal intermittently at storage locations which are cycled continuously in the storage means;

to output the first signal continuously; and to store the fourth signal such that no portion of the stored signal is overwritten before it is output as a portion of the first signal.

In either of these embodiments, the processing means can operate continuously, and in the latter embodiment, less storage space is required.

It will be appreciated that a single apparatus may be provided embodying both the first aspect and the second aspect of the tenth invention.

An aim of a third aspect of the tenth invention is to reduce the amount of starting and stopping of the video tape recorders, or other input and output devices, and thus reduce wear.

In accordance with this third aspect of the tenth invention, there is provided a signal processing method for continuously recording in order on a medium a signal which is supplied in repeated or intermittent portions (each of which may be a field or frame of a digital video signal) in which the the between the start of one portion and the next: is R times the duration of each portion, comprising:

a first phase in which the portions are recorded on an intermediate medium in a scrambled order; and a second phase in which the scrambled portions are recorded on the final medium in the originally supplied order;

(1) the first phase comprising the steps of:

(1a) recording a group of the supplied signal portions on the intermediate medium with a spacing of R portions between the start of one portion and the next and with the first of the portions being recorded at a predetermined starting location on the intermediate medium; and (1b) repeating the recording step a number of times until all of the signal portions have been recorded and with the predetermined starting location on the intermediate medium of each succeeding group being between the recording locations of a pair of recorded portions of a preceding group and offset so that no recorded portion is overrecorded; and (2) the second phase comprising the steps of:

(2a) playing back the intermediate medium and temporarily storing every Rth portion starting at a predetermined location on the intermediate medium until C portions have been stored;

(2b) recording the C stored portions continuously on the final medium starting at a predetermined location on the final medium, while the intermediate medium is still advancing;

(2c) playing back the intermediate medium and temporarily storing every Rth portion until a further C portions have been stored, while the final medium is still advancing;

(2d) recording the C stored portions continuously on the final medium, while the intermediate medium is still advancing;

(2e) repeating steps '2c' and '2d' until the end of the recording on the intermediate medium is reached;

(2f) repeating steps '2a' to '2e' until all of the portions have been recorded on the final medium and with different predetermined starting locations such that the portions are recorded in order on the final medium.

Preferably, the offset between successive predetermined starting locations in steps '1a' and '1b' is C(R+1).

Preferably, the offset between the locations on the intermediate and final media in steps '2b' to '2f' is C(PR+R−P), where P is the number of times the intermediate medium has been played back, starting counting at zero.

Preferably, the value of C and R satisfy the conditions that C modulo R is non-zero, and C modulo R and R do not have a common factor.

An embodiment of the tenth invention is described particularly with reference to FIGS. 71 to 74 of the accompanying drawings.

Description of the Prior Art Relevant to the Eleventh Invention

Patent Application GB2231228A describes an arrangement for converting 60 field/s 2:1 interlace HDVS to 24 Hz 1:1 film format. In that arrangement, the output frames are either temporally aligned with respective input frames or temporally offset by one half of an input field period (1/120s). In the case of temporal alignment, an output frame is based upon a respective progressive format frame developed from an input field and temporally adjacent input fields, whereas in the case of a temporal offset, each pixel in the output frame is ½:½ interpolated between pixels or pixel patches in preceding and succeeding progressive format frames, with spatial offset between the pixels or patches in the source frames and the pixel in the output frame being dependent upon a motion vector which is developed for that pixel.

In the case where there is no temporal offset and a pixel at location (x,y) in the output frame has a motion vector (m,n), this pixel is derived from the pixel at location (x,y) or a patch centred on (x,y) in an input frame 1 to an interpolator, and the motion vector and the content of an input frame 2 are not employed. Also, in the case where there is a half field period temporal offset and an even motion vector (m,n) for an output pixel at location (x,y), the value of this pixel is derived by equal interpolation between the pixel at (or patch centred on) location (x,y)−½(m,n) in input frame 1 and the pixel/patch at location (x,y)+½(m,n) in input frame 2. However, in the case where either of the components of the motion vector (m,n) is an odd integer, the required pixels or patches in the input frames 1 and 2 will be at locations which are half-way between actual pixel positions in the input frames.

In order to acquire the required pixel values from the input frames, a two-dimensional patch may be used around the required pixel location, and there will therefore be an offset of (0,0), (½,0), (0, ½), or (½,½) between the centre pixel of the patch and the pixel location determined by the interpolator depending upon whether neither, one or the other, or each of the motion vector components is odd. To determine the value of the required pixel, spatial interpolation coefficients are applied to the pixels in the patch, and the sets of coefficients may be chosen to be slightly different for the four possible offsets, although the coefficients for the cases of offset (½,0) and (0, ½) may be symmetrical about the x=y diagonal of the patch.

A problem which can arise with such an arrangement is that the magnitude responses for the four different sets of spatial interpolation coefficients can be different and produce modulation of the picture detail as the different responses are cycled.

OBJECT AND SUMMARY OF THE ELEVENTH INVENTION

One aspect of the eleventh invention aims to deal with this problem of undesirable picture detail modulation.

In accordance with said one aspect of the eleventh invention, there is provided a method of forming an output image by motion compensated interpolation between a pair of input images, comprising the steps, for each pixel location in the output image, of:
producing a respective motion vector;
determining respective source locations in the input images in dependence upon the respective motion vector; and
calculating the value of the respective pixel in the output image from respective values derived for the pixels at the source locations in the input images;
wherein the source locations are displaced from the location in the output image by amounts proportional to the respective motion vector plus a constant amount. In an ideal case, the constant amount is one quarter of a pixel location spacing in each dimension and this will result in the possible offsets being (+or −¼, or −¼).

Therefore, all of the possible offsets are rotationally symmetrically, and thus picture detail modulation can be reduced or obviated. This method is of particular advantage when the output image is to be interpolated half-way between the input images, and in this case the constants of proportionally are preferably chosen to be equal in magnitude and opposite in sign for the respective two source locations.

In the arrangement described in GB2231228A, with conversion from 60 field/s 2:1 interlace HDVS to 24 Hz 1:1 film format, every other output frame from the interpolator 48 is produced from one of the progressive frames input to the interpolator, and the alternate output frames are produced by motion compensation between two progressive frames input to the interpolator. This can result in (a) perspective changes not being satisfactorily merged, (b) alias effects when the progressive scan conversion fails due to noise, and (c) noise level modulation when the input image is noisy. As regards point (b), when progressive scan conversion fails due to noise, the progressive scan frames are produced by intrafield interpolation. Of such a frame is directly output by the interpolator, stationary images would appear heavily aliased.

A second aspect of the eleventh invention aims to deal with this problem, an in accordance with said second aspect, there is provided a method of forming a series of output images from a series of input images in which some of the output images are temporally aligned with respective input images and some of the output images are temporally offset from the input images, comprising the steps of:
producing a respective motion vector for each pixel location in each output image;
in the case of a temporally offset output image, determining, for each pixel location therein, respective source locations in the temporally preceding and temporally succeeding input images which are displaced from the pixel location in the output image by amounts dependent upon the respective motion vector and the temporal offset;
in the case of a temporally aligned output image, determining, for each pixel location therein, a respective source location in the temporally aligned input image, and a respective source location in the preceding or succeeding input image which is displaced from the pixel location in the output image hy an amount dependent upon the respective motion vector; and
calculating for each pixel location in each output image the value of the pixel from respective values derived for the pixels at the two source locations in the respective input images.

By producing each pixel in the output frame from two input frames, whether or not there is a temporal offset between the output frame and the input frames, alias is removed, because the frame 2 alias will always be in antiphase to the frame 1 alias as long as the interfield motion is an exact multiple of lines. As synthesised lines are mixed with non-synthesised lines in this scheme, an improved vertical response is also produced. A further advantage is that if there is noise in the input image, the noise will not be modulated, unlike the case where every other output frame is derived from only one of the input frames.

It will be appreciated that the methods of both aspects of the invention may be combined in the same method.

In the case of either method, or the combined method, the values derived for the pixels at the source locations are preferably derived by spatial interpolation between a set of pixel values around the source location.

An embodiment of the eleventh invention is described particularly with reference to FIGS. 61 to 65 of the accompanying drawings.

Description of the Prior Art Relevant to the Twelfth Invention

The aforementioned patent application GB2231228A describes a method of motion compensated interpolation of an output image between a pair of input images comprises the steps of:

developing at least one local motion vector for each pixel in the output image area indicative of estimated motion of that pixel in the output image;

determining, as at least one global motion vector, at least the most frequently occurring local motion vector for the whole output image area;

selecting, for each pixel, an output motion vector from the respective local motion vector or vectors, and the global motion vector or vectors; and determining, for each pixel in the output image, the value thereof by interpolation between pixels in the input images displaced from the location of the pixel in the output image by amounts determined by the selected output motion vector.

In the system described in that application only a small number of motion vectors can be tested on a pixel-by-pixel basis. For optimum operation of the system it is important that the best vectors are preselected for testing by a motion vector selector. Techniques using global motion vectors only have proved to be good for many types of picture and techniques using only locally derived motion vectors have proved good for certain material. Neither is good for all material.

OBJECT AND SUMMARY OF THE TWELFTH INVENTION

In accordance with the twelfth invention, there is provided a method of motion compensated interpolation of an output image between a pair of input images, comprising the steps of:

developing at least one local motion vector for each pixel in the output image area indicative of estimated motion of that pixel in the output image;

determining, as at least one global motion vector, at least the most frequently occurring local motion vector for the whole output image area;

determining, for all least one intermediate portion of the output image area, as at least one respective intermediate motion vector, at least the most frequently occurring local motion vector for pixels in that intermediate area portion;

selecting, for each pixel, an output motion vector from the respective local motion vector or vectors, the intermediate motion vector or vectors for at least one intermediate area related to the position of that pixel, and the global motion vector or vectors; and determining, for each pixel in the output image, the value thereof by interpolation between pixels in the input images displaced from the location of the pixel in the output image by amounts determined by the selected output motion vector.

This technique therefore combines good points from both of the approaches described in the earlier application.

In one example the, or at least some of the, intermediate area portions are predefined, and there may be a plurality of such intermediate area portions. In this case, at least some of the intermediate area portions may be in a contiguous array, and/or at least some of the intermediate area portions may be in an overlapping array, and there may be a plurality of such arrays.

In an example of the method at least one of such intermediate area portions is determined to be related to such a pixel position if the pixel position is within that intermediate area portion, or if the pixel position is within a respective area of application larger than and including that intermediate area portion, or if the pixel position is within a respective area of application smaller than and within that intermediate area portion.

An embodiment of the twelfth invention is described particularly with reference to FIGS. 75 to 79 of the accompanying drawings.

Other objects, features and advantages of the present twelve inventions will become apparent upon consideration of the following detailed description of preferred embodiments thereof, especially when considered with the accompanying drawings in which like reference numerals are employed to designate the same or similar components in the different figures.

BRIEF DESCRIPTION OF THE DRAWINGS

FIG. 5 shows diagramatically progressive scan conversion;

FIGS. 6 to 9 show diagramatically sequences of lines in sequences of fields explaining progressive scan conversion;

FIGS. 38 and 39 show diagrammatically how a threshold is established during the motion vector selection;

FIG. 40 shows diagrammatically a second stage in motion vector selection;

FIGS. 41 to 47 show arrays of pixels with associated motion vectors, used in explaining motion vector post-processing;

FIG. 48 shows diagrammatically the operation of an interpolator.

FIG. 52 is a diagram illustrating a basic correlation between frames of a 30 Hz 1:1 format signal and fields of a 60 field/s 2:1 interlace format signal with interpolation of alternate output fields only;

FIGS. 53A–53C-3 show a modification to FIG. 52 with interpolation of all output fields;

FIG. 58 is a diagram illustrating the signal conversion of FIG. 57;

FIG. 61A-1 to 61C-3 show three examples of the relation between a pixel in an output frame and the respective source pixels in two input frames of the motion compensation interpolator of FIG. 48;

FIGS. 63A-1 to 63C-3 are similar to FIGS. 61A-1 to 61C-3 respectively, but showing the case where a global offset: of ($-\frac{1}{4}$ pixel , $-\frac{1}{4}$ pixel) is applied;

DETAILED DESCRIPTION OF THE PREFERRED EMBODIMENTS

The embodiment of apparatus for video signal to photographic film conversion to be described is particularly intended for use in the conversion of a high definition video signal (HDVS) having 1125 lines per frame, 60 fields per second, to 24 frames per second 35 mm film. However, it will be understood that the invention is not limited in this respect, and that it can readily be adapted to effect conversion from other input video signals.

Figure 1:
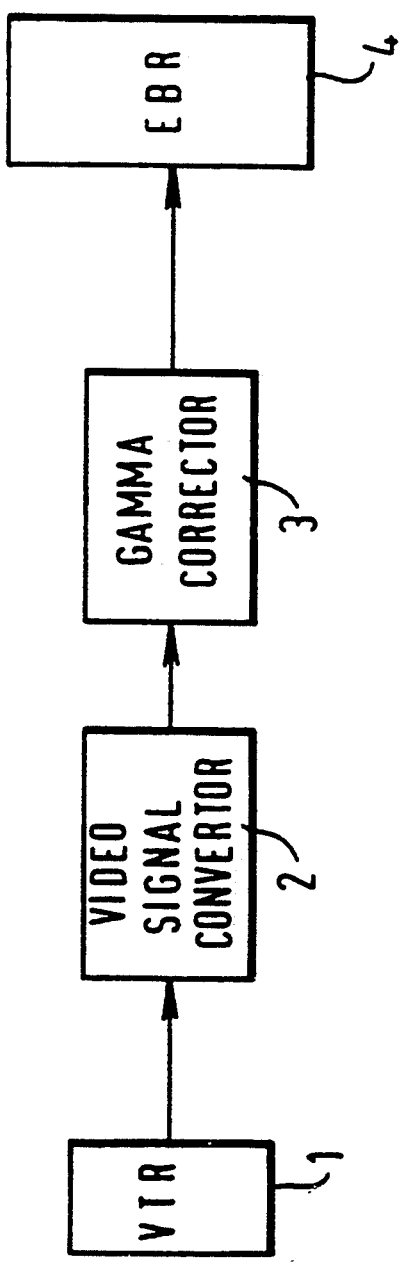
FIG. 1 is a block diagram of a previously proposed apparatus for video signal to photographic film conversion.
Figure 2:
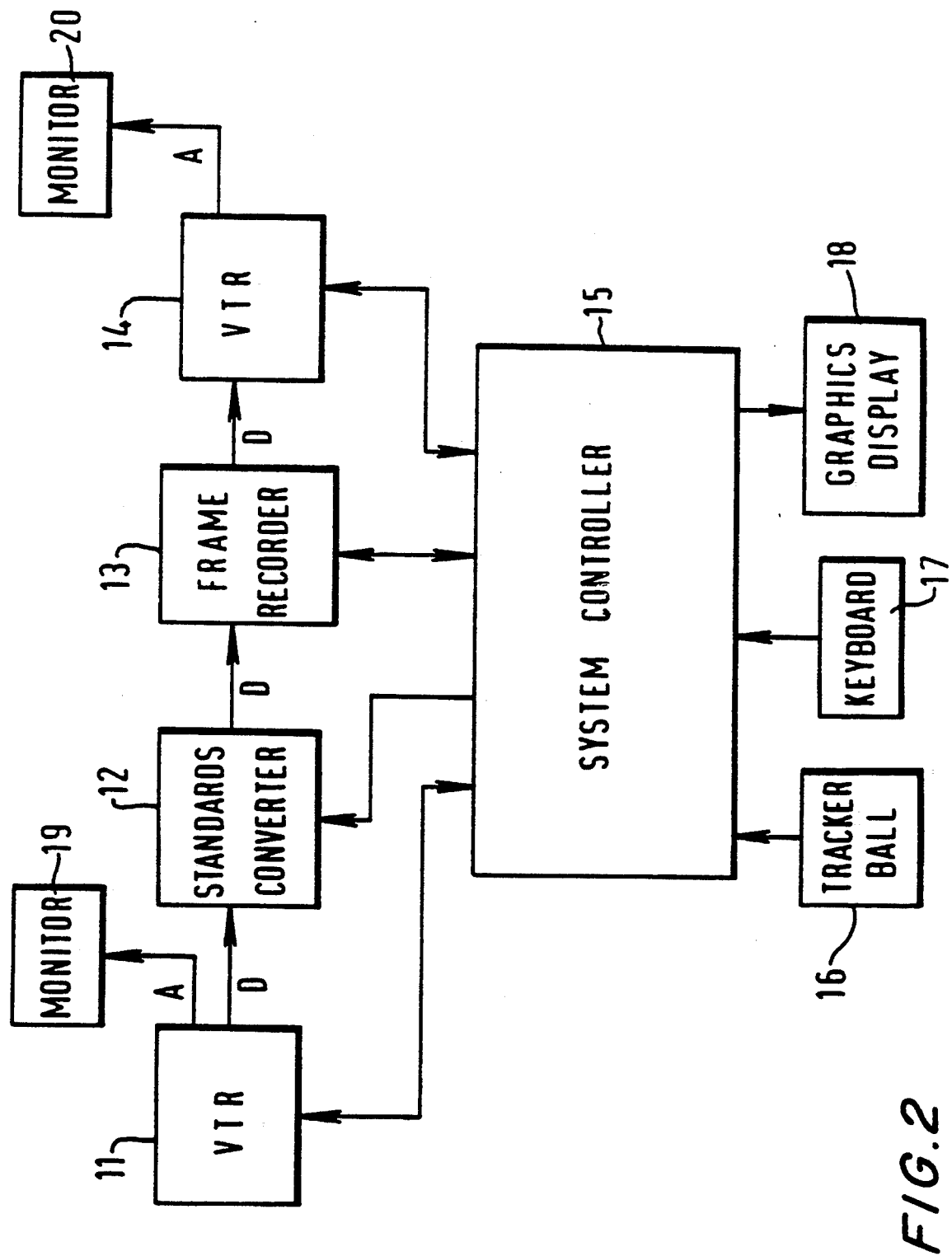
FIG. 2 is a block diagram of part of an embodiment of apparatus for video signal to photographic film conversion according to the present invention.
Figure 3:
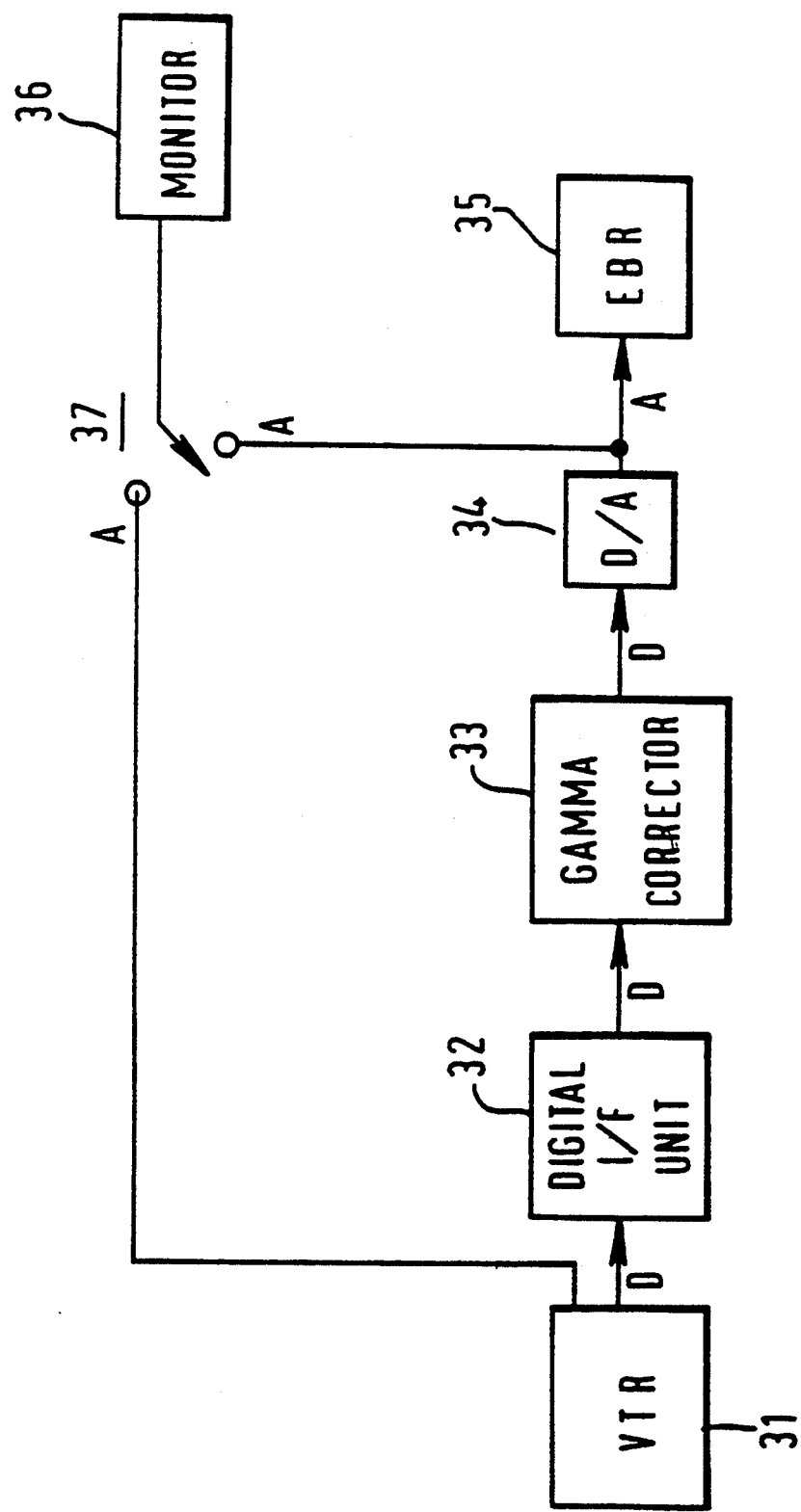
FIG. 3 is a block diagram of another part of the embodiment.

The apparatus can conveniently be considered in two parts; the first part, shown in FIG. 2, effects the conversion of the input HDVS to a progressive scan digital video signal corresponding to 24 frames per second which is recorded on a VTR; and the second part, shown in FIG. 3, reproduces the recorded video signal and transfers it to photographic film.

The part of the apparatus shown in FIG. 2 comprises a high definition digital VTR 11, a television standards converter 12, a frame recorder 13 which can record up to say one second of video signal, a second high definition digital VTR 14, a system controller 15 having associated with it a tracker ball control 16, a keyboard 17 and a graphics display 18, and television monitors 19 and 20, interconnected as shown, and operating as will be described below.

The second part of the apparatus, shown in FIG. 3, comprises a high definition digital VTR 31, a digital interface (I/F) unit 32, a gamma corrector 33, a digital-to-analogue converter 34, an electron beam recorder 35, a television monitor 36 and a switch 37, interconnected as shown, and operating as will be described below.

Referring again to FIG. 2, the video signal connect. ions D are digital connections, that is carrying Y, U/V s i gnals, and the video signal connections A are analogue connections carrying R, G, B signals. The input video signal which is to be transferred to film, and which may have been derived from a high definition video camera, is recorded on a magnetic tape reproduced by the digital VTR 11. The digital VTR 11 is capable of reproducing the recorded video signal at: ⅛ speed, as this is a convenient speed of operation for the subsequence circuitry, and in particular the standards converter 12. The elements 11 to 14, 19 and 20 are under control of the system controller 15, the system controller 15 being in turn controllable by inputs from the tracker bail control 16 and the keyboard 17, and having associated with it the graphics display 18 on which is displayed information relating to the progress of the conversion.

A portion of the input HDVS is reproduced from the digital VTR 11 and supplied to the standards converter 12. This operates, as described in detail below, to derive from the input video signal, which is a 60 fields per second interlace scanned video signal, firstly, a motion adapted progressive scan digital video signal at 60 frames per second, and then from this the required motion compensated progressive scan digital video signal corresponding to 24 frames per second, but not necessarily at that rate. This video signal is recorded by the digital VTR 14, and if the digital VTR 14 is capable of recording in slow motion, that is at the reproduction rate of the digital VTR 11, then in theory the frame recorder 13 is not required. In practice, however, the frame recorder 13 may in any case be a useful addition to the apparatus, as it more readily permits intermittent operation to be effected. Such intermittent operation is generally required for video signal to film conversion, because of the need to check at frequent intervals that the conversion is proceeding satisfactorily. Thus depending on the content of the video signal to be converted, adjustment of the parameters, in particular those of the standards converter 12, need to be made, and the results evaluated before proceeding. The monitors 19 and 20 are provided as further means for checking the video signal at respective points in the apparatus.

In the second part of the apparatus, shown in FIG. 3, the motion compensated progressive scan digital video signal recorded by the digital VTR 14 (FIG. 2) is reproduced by the digital VTR 31 and passed by way of the digital I/F unit 32 to the gamma corrector 33, the purpose of which is to match the gamma characteristics of the video signal to the gamma characteristics of the film being used. The separated operat ion permitted by the recording of the motion compensated progressive scan digital video signal by the digital VTR 14 (FIG. 2), for subsequent reproduction by the digital VTR 31, enables the gamma correction to be set accurately by the gamma corrector 33, because intermittent and repeated operation is possible so that various different mappings of the generally non-linear gamma characteristics of the video signal from the digital VTR 31 to the generally linear gamma characteristics of the film can be tested. This gamma setting may, for example, involve the use of a step wedge. The gamma corrected digital video signal is then converted to an analogue signal by the digital-to-analogue converter 34 and supplied to the electron beam recorder 35 to be recorded on photographic film. This recording may, for example, be in the form of three monochrome frames for each frame of the video signal, the three frames corresponding respectively to red, green and blue. The further television monitor 36 can be selectively connected by way of the switch 37 to the output of the digital VTR 31 or to the output of the digital-to-analogue converter 34, or alternatively of course two separate television monitors can be provided.

The characteristics of the apparatus are such that it produces sharp, clear pictures with good motion portrayal on the film, and in particular it produces pictures without motion blur and without introducing any additional judder components. Moreover, the separated operation permitted by the recording of the motion compensated progressive scan digital video signal on the digital VTR 14, in turn permits easy and frequent checking of the parameters of the apparatus, to ensure the quality of the pictures obtained on the film. Iterative operation is perfectly possible, so that the results can rapidly be evaluated and conversion repealed with any flaws corrected by adjustment of the parameters. To obtain higher speed operation, it is of course possible for the first part of the apparatus, that is the part shown in FIG. 2 to be replicated a number of times, to provide additional inputs to the digital VTR 31, so permitting a more intensive use of the part of the apparatus shown in FIG. 3, and hence a higher overall conversion speed.

Figure 4:
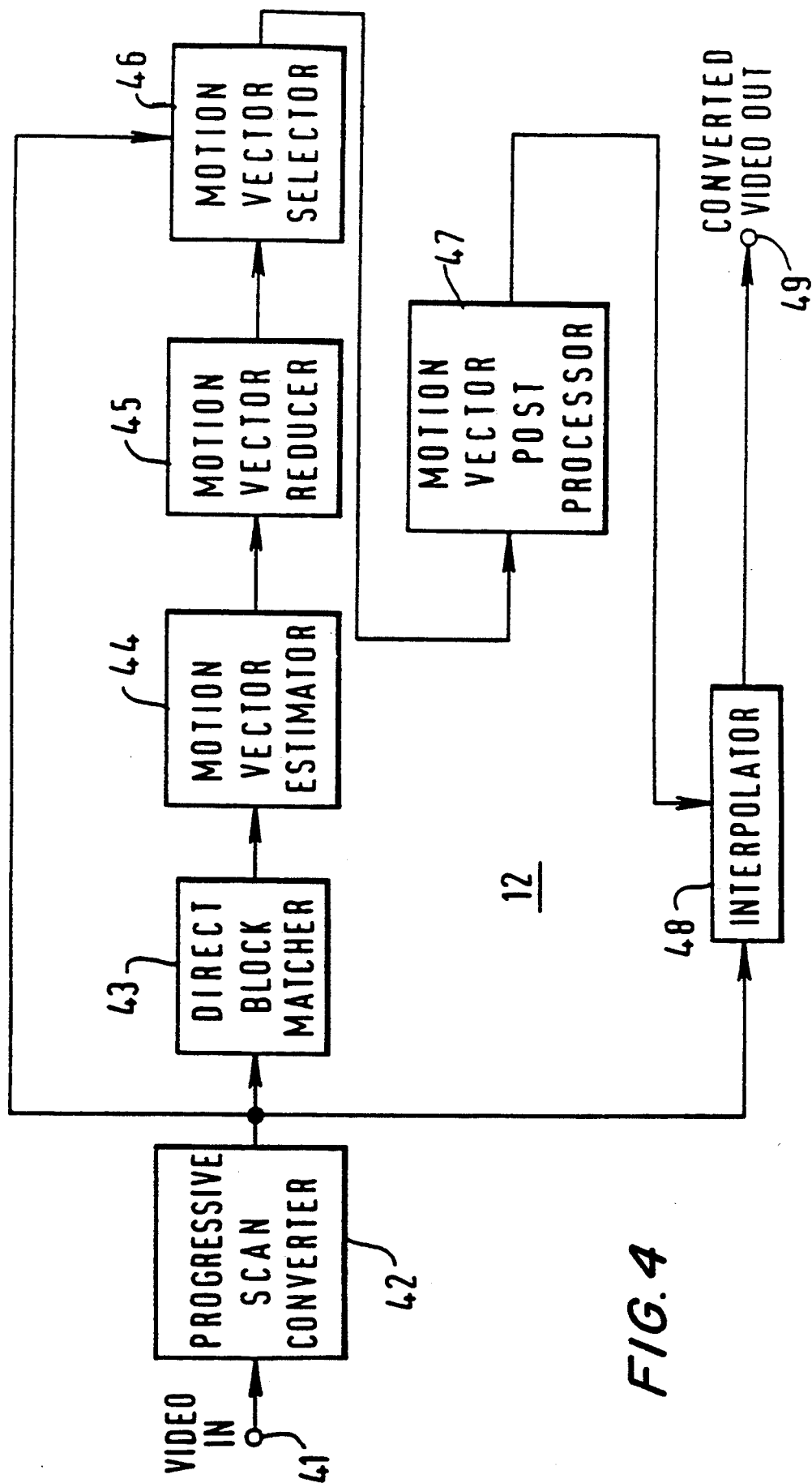
FIG. 4 is a more detailed block diagram of part of the embodiment.

FIG. 4 is a block diagram of the standards converter 12 which will now be described in more detail. The standards converter 12 comprises an input terminal 41 to which an input video signal is supplied. The input terminal is connected to a progressive scan converter 42 in which the input video fields are converted into video frames which are suppl led to a direct block marcher 43 wherein correlation surfaces are created. These correlation surfaces are analysed by a motion vector estimator 44, which derives and supplies motion vectors to a motion vector reducer 45, wherein the number of motion vectors for each pixel is reduced, before they are supplied to a motion vector selector 46, which also receives an output from the progressive scan converter 42. Any irregularity in the selection of the motion vectors by the motion vector selector 46 is removed by a motion vector post processor 47, from which the processed motion vectors are supplied to and control an interpolator 48 which also receives an input from the progressive scan converter 42. The output of the interpolator 48, which is a standards-converted and motion-compensated video signal is supplied to an output terminal 49. Each part of the standards converter 12 and the operation thereof will be described in more detail below.

The progressive scan converter 42 produces output frames at the same rate as the input fields. Thus, referring to FIG. 5 which shows a sequence of consecutive lines in a sequence of consecutive fields, the crosses representing lines present in the input fields and the squares representing interpolated lines, each output frame will contain twice the number of lines as an input field, the lines alternating between lines from the input video signal and lines which have been interpolated by one of the methods to be described below. The interpolated lines can be regarded as an interpolated field of the opposite polarity to the input field, but in the same temporal position.

Progressive scan conversion is preferably carried out, for two main reasons; firstly, to make the following direct block matching process easier, and secondly in consideration of the final output video format. These two reasons will now be considered in more detail.

Direct block matching is used to obtain an accurate estimation of the horizontal and vertical motion between two successive video fields, as described in more detail below. However, due to the interlaced structure of the video signal on which direct block matching is performed, problems can arise.

Figures 8, 9:
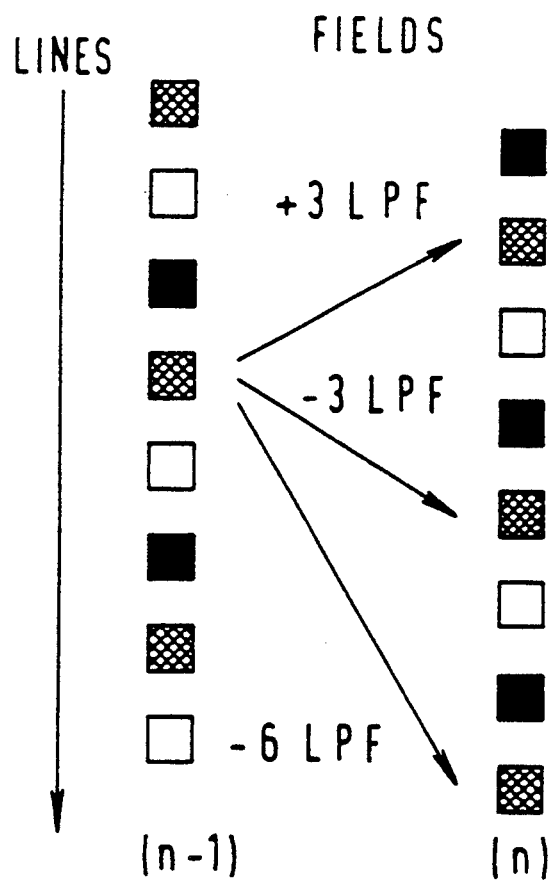

Consider the image represented by FIG. 6, which indicates a sequence of successive lines in a sequence of successive fields, the open squares representing white pixels, the black squares representing black pixels, and the hatched squares representing grey pixels. This, therefore, represents a static picture with a high vertical frequency component which in a HDVS would be 1125/3 cycles per picture height. As this image has been sampled by the usual interlace scanning procedure, each field appears to contain a static vertical frequency luminance component Y of 1125/6 cph, as indicated in FIG. 7. However, the frequency components in each field are seen to be in antiphase. Attempts to perform direct block matching between these two fields will lead to a number of different values for the vertical motion component, all of which are incorrect. This is indicated in FIG. 8, in which the abbreviation LPF means lines per field. From FIG. 8 it is clear that direct block matching will not give the correct answer for the vertical motion component, which component should in fact be zero. This is because the direct block matching is in fact tracking the alias component of tire video signal rather than the actual motion.

Consider now FIG. 9, which depicts the same static image as FIG. 6, except that now each input field has been progressive scan converted to form a frame, the triangles representing interpolated pixels. It can be seen that each frame now contains the same static vertical frequency component as the original input fields, that is 1125/3 cph. Thus, eli feet block matching between two successive frames can now give the correct value for the vertical motion, that is, zero, and the tracking of the vertical alias has been avoided. Moreover, there is the point that direct block matching on progressive scan converted frames will result in a more accurate vertical motion estimate, because the direct block matching is being performed on frames which have twice the number of lines.

Concerning consideration of the final output video format, in the case of the present embodiment, the converteel video is supplied via tape to an electron beam recorder, and needs to consist of frames corresponding to the motion picture film rate of 24 frames per second. For this reason, therefore, the production of progressive scan converted frames is necessary, and moreover the progressive scan converted frames can also be used as a fall-back in the case where motion compensated standards conversion is deemed to be producing unacceptable results, for example, where the motion is too diverse to be analysed satisfactorily. In that case the use of the nearest progressive scan converted frame as the required output frame can produce reasonably acceptable results.

Figure 10:
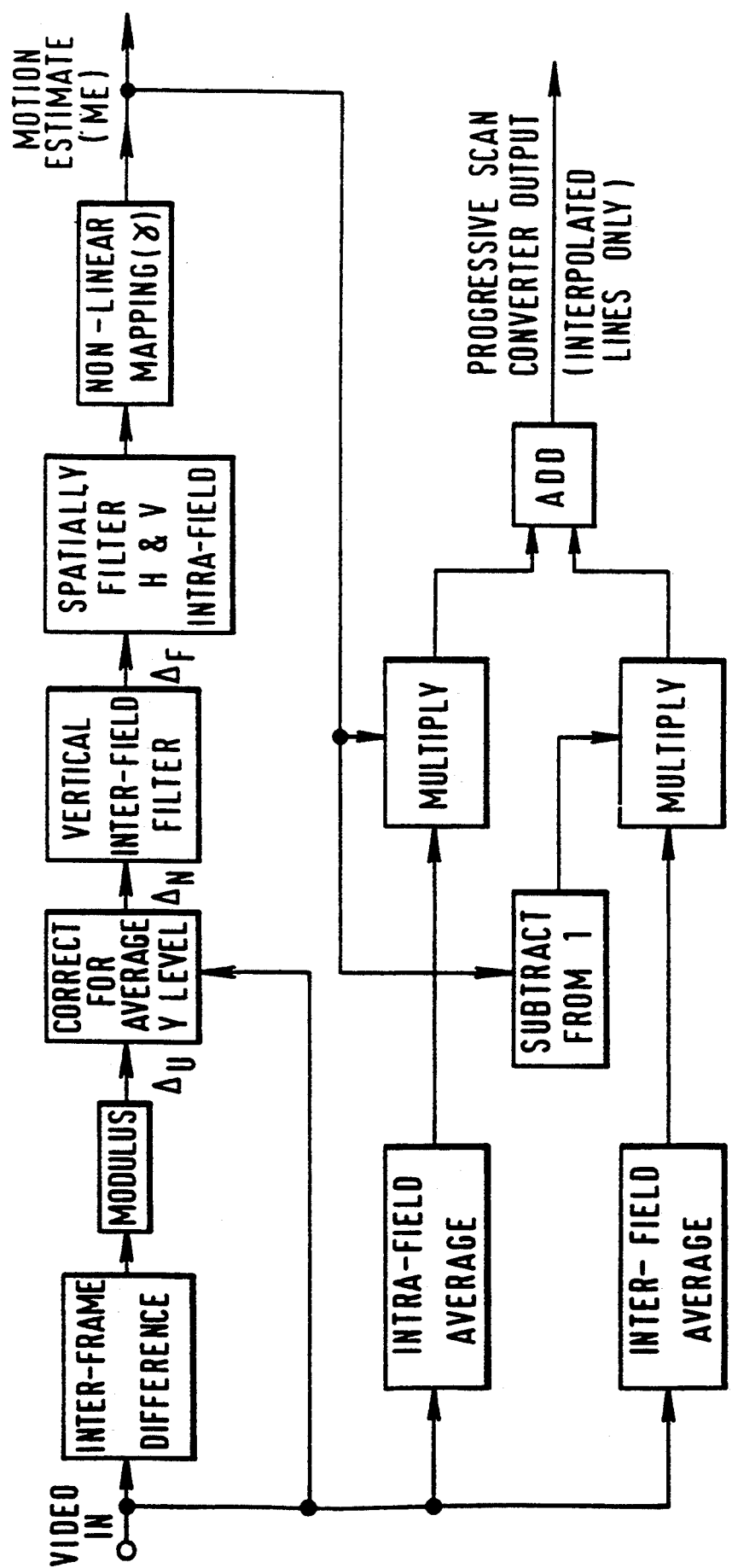
FIG. 10 is a block diagram showing the steps in motion adaptive progressive scan conversion.

Progressive scan conversion can be carried out in a number of ways, such as by previous field replacement, median filtering in which three spatally consecutive lines are examined (temporally these three lines will come from two consecutive fields), or a motion compensated technique which utilizes multi-gradient motion detection followed by multi-direction linear interpolation. However, in the present embodiment the preferred method is motion adaptive progressive scan conversion, the steps of which are indicated in the block diagram of FIG. 10. The concept is to use inter-field interpolation in wholly static picture areas to retain as much vertical information as possible, and to use intra-field interpolation when significant motion is present. This also aids smooth portrayal of motion. In scenes where the motion is somewhere between these two extremes, an estimate of the local motion present in the picture is made, and this is then used to mix together different proportions of inter- and intra-field interpolation.

Figure 11:
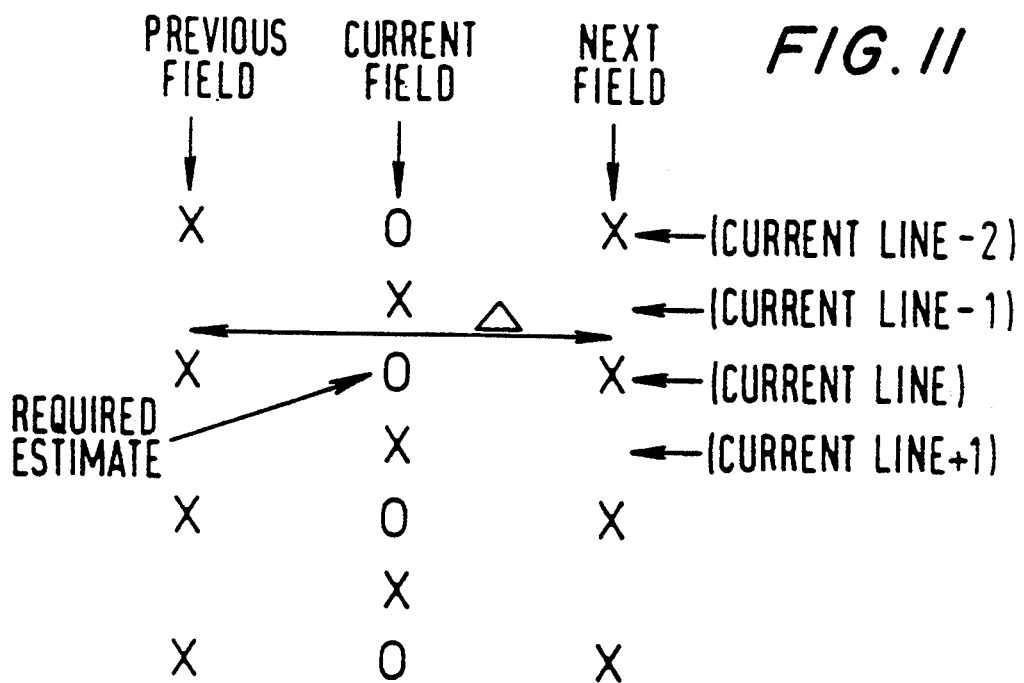
FIG. 11 shows diagrammatically progressive scanning, in particular the required estimate and difference value between successive fields.

In more detail, the modulus of the frame difference between previous and next fields is first generated, this being indicated in FIG. 11. To generate the required estimates, the modulus inter-frame difference array from the previous and the next fields is generated at each point:

$\Delta_U$(pixel, current line, current field) =

| $Y$(pixel, current line, next field) −

$Y$(pixel, current line, previous field)| where:
  $\Delta_U$ is the unnormalized modulus difference array, and
  Y is the luminarice array corresponding to the 3D picture.

The modulus of difference is then normalized to adjust for the significance of changes in lower luminance areas:

$\Delta_N$(pixel, current line, current field) =

Figure 12:
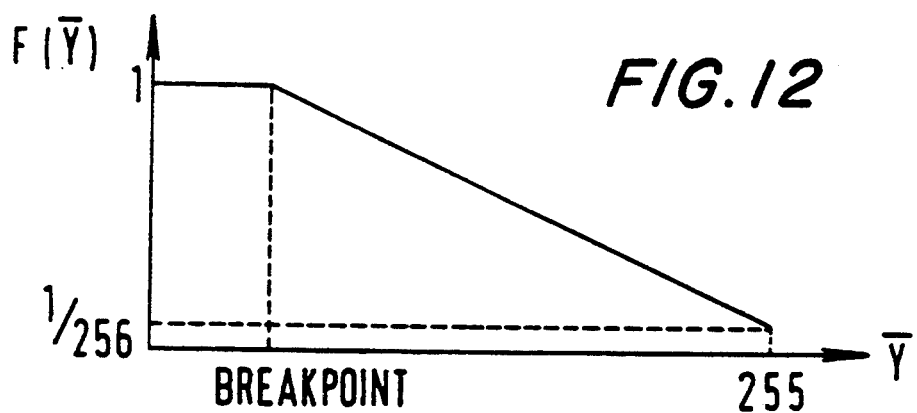
FIGS. 12 and 13 are diagrams used in explaining the technique of FIG. 11 in more detail, FIG. 12 showing a progressive scan normalizing function and FIG. 13 showing a progress ive scan nonlinear function.

$F(\overline{Y}$(pixel, current line)) * $\Delta_U$(pixel, current line, current field)

where:
  $\Delta_N$ is the normalized modulus difference array
  $\overline{Y}$ is the inter-frame average luminanee value $\overline{Y}$ (pixel, current line)=(Y (pixel, current line, previous field)+Y(pixel, current line, next field) )/2, and F($\overline{Y}$) (the normalizing function) is derived as indicated in FIG. 12.

The difference array $\Delta$ is then vertically filtered together with the previous field difference by a three-tap filter (examples of coefficients are a quarter, a half, a quarter or zero, unity, zero) to reduce vertical alias problems, and in particular to minimize the problems encountered with temporal alias. Thus:

$\Delta_F$(pixel, current line, current field) =

$\Delta_N$(pixel, current line −1, previous field)*$C_1$ +

$\Delta_N$(pixel, current line, current field)*$C_2$ +

$\Delta_N$(pixel, current line + 1, previous field)*$C_1$ where:

$\Delta_F$ is the filtered normalized difference array, and $C_1$ and $C_2$ are filter coefficients, and $2C_1+C_2=1$ so that unity dc gain is maintained.

A vertical and horizontal intra-field filter of up to five Laps by fifteen taps is then used to smooth the difference values within the current field. In practice, a filter of three taps by three taps is satisfactory. Finally, in order to produce the actual motion estimation, a non-linear mapping function is applied using a function to provide the motion estimate (ME):

ME (pixel, current line)=$\gamma$(spatially filtered $\Delta_F$ (pixel, current line) )

Figure 13:
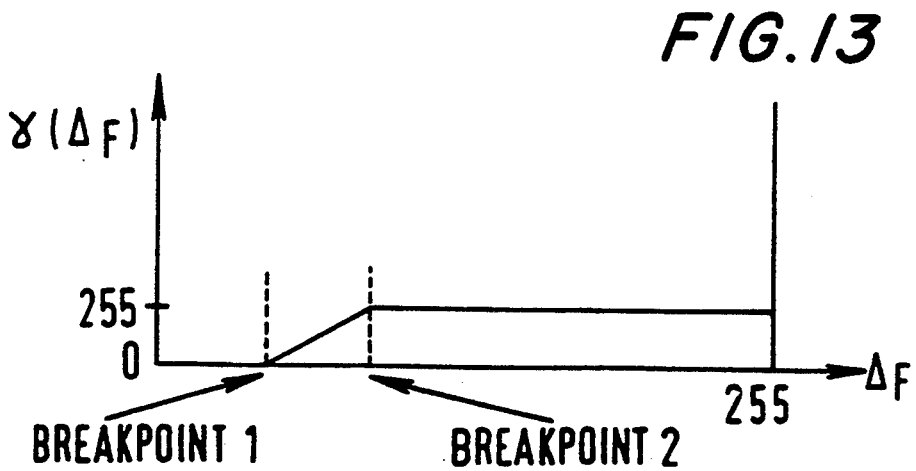

The non-linear function $\gamma$ derived as shown in FIG. 13, the static picture ME is zero, for full motion ME is one, and for intermediate motions a controlled transition occurs.

Figure 14:
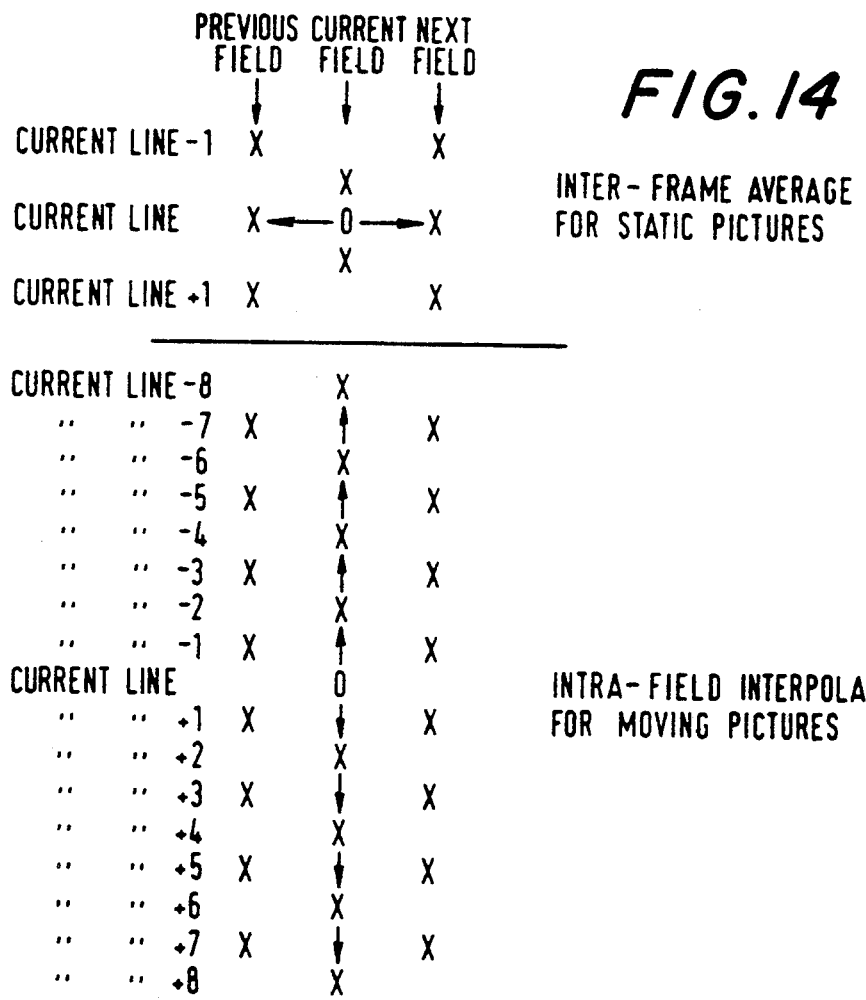
FIG. 14 shows diagrammatically the creation of pixels in missing lines in progressive scan conversion.

To produce an interpolated pixel, the pixels in the missing line are created by taking proportions of the surrounding lines as indicated in FIG. 14. The motion estimate ME is then applied to the intraframe interpolated value (generated from a two, four, six or preferably eight tap filter), and 1-ME is applied to the inter-field average (or alternatively to a more complex interpolated value), and these are summed to derive the progressive scan pixel estimate:

$Y_{out}$(pixel, current line) = ME(pixel, current line) *

$\left\{ \sum_{n=0 \text{ to } 3} (Y_{in}(\text{pixel, current line} - 1 - 2n, \text{ current field}) + Y_{in}(\text{pixel, current line} + 1 + 2n, \text{ current field}))*C_n \right\} +$ (1-ME)(pixel, current line) *

($Y_{in}$(pixel, current line, previous field) +

$Y_{in}$(pixel, current line, next field))/2 where:

$C_0$, $C_1$, $C_2$ and $C_3$ are the intra-frame filter coefficients, and $2(C_0+C_1+C_2+C_3)=1$ so that unity dc gain is maintained.

This method of progressive scan conversion is found to produce high quality frames from input fields, in particular because a moving object can be isolated and interpolated in a different manner to a stationary background.

Referring back to FIG. 4, the frames of video derived by the progressive scan converter 42 are used to derive motion vectors. Time estimation of motion vectors consists of two steps. Firstly, correlation surfaces are generated by correlating search blocks from consecutive frames. Then, having obtained these correlation surfaces, they have to be examined to determine the position or positions at which correlation is best. Several different methods of obtaining a correlation surface exist, the two main methods being phase correlation and direct block matching. There are, however, a number of problems associated with the use of phase correlation, these being very briefly problems relating to the transform mechanism, the windowing function, the block size and the variable quality of the contour of the surface produced. In the present embodiment, therefore, direct block matching is preferred.

The direct block marcher 43 operates as follows. Two blocks, respectively comprising a rectangular array of pixels from consecutive frames of the progressive scan converted video signal are correlated to produce a correlation surface from which a motion vector is derived.

Figure 15A:
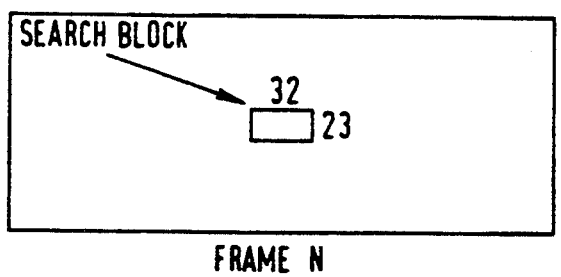
FIGS. 15A, 15B, and 16 show diagrammatically search blocks and search areas, and the relationships therebetween.
Figure 15B:
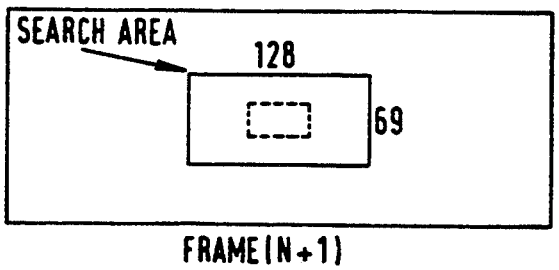
Figure 16:
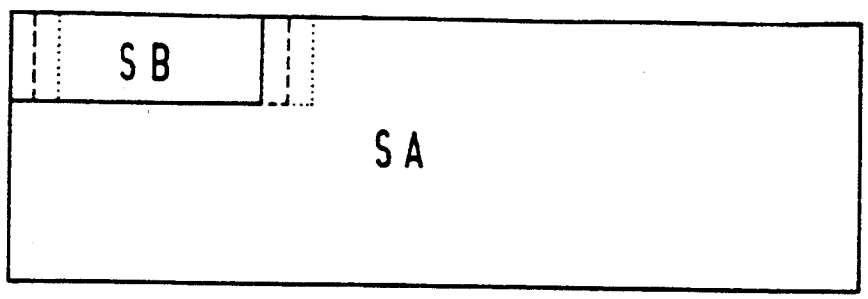
Figure 17:
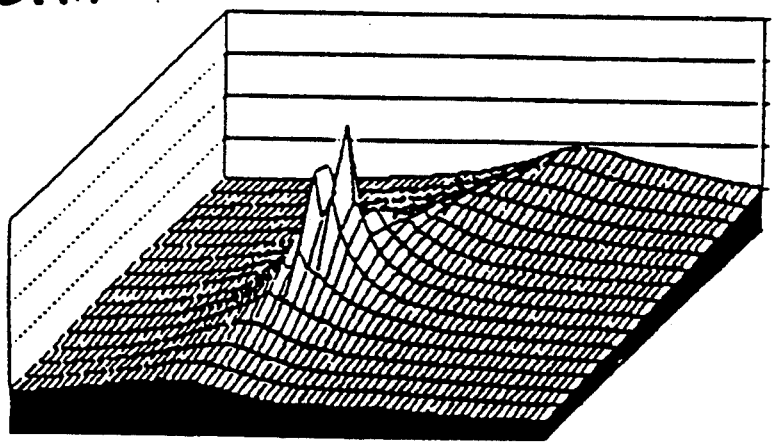
FIGS. 17 shows a correlation surface.

Referring to FIG. 15, firstly a small block called a search block of size 32 pixels by 23 lines is taken from a frame as shown in FIG. 15. Then a larger block called a search area of size 128 pixels by 69 lines is taken from the next frame. The search block (SB) is then placed in each possible position in the search area (SA) as shown in FIG. 16, and for each location the sum of the absolute difference of pixel luminance levels between the two blocks is calculated. This value is then used as the height of the correlation surface at the point at which it was derived. It can then be used in conjunction with other similarly derived values for each possible location of the search block in the search area to obtain a correlation surface, an example of which is shown in FIG. 17. For clarity the surface is shown inverted, and as it is in fact the minimum that is required, the required point in FIG. 17 is the main peak.

The size of the search block is selected by examining the minimum size of an object that may require motion compensation. For PAL 625 lines per frame, 50 fields per second signals a search block of 16 pixels by 8 lines has been found suitable for tracking a small object without allowing any surrounding information not within the object, but still within the search block, to affect the tracking of the object. This approach bas therefore been adopted in the present embodiment, but modified to take account of the different numbers of active pixels per line, active lines per frame, and aspect ratio of a HDVS as compared with PAL 625/50. The comparative figures, the HDVS being put first, are as follows; 1920 (720) active pixels per line, 1035 (575) active lines per frame, 3:5.33 (3:4) aspect ratio.

It should be added that there is an argument for using a larger search block, since this means that a large object can be tracked. On the other hand, there exists an argument for using a smaller search block, to prevent a small object being over-shadowed by the effect of a large object or background area. Also, however, there is the advantage that with small search blocks there is no requirement for the derivation of more than one motion vector from each of them. Because having a single motion vector is so much easier than having more than one, the present embodiment starts with a small search block as described above, and then causes the search block to grow into a bigger search block if no satisfactory result has been obtained. This then encompasses the advantages of both a small and a large search block. The criteria for a satisfactory result is set by the motion vector estimator 44 (FIG. 4) referred to in more detail below and which determines the motion vector from a given correlation surface.

Figure 18:
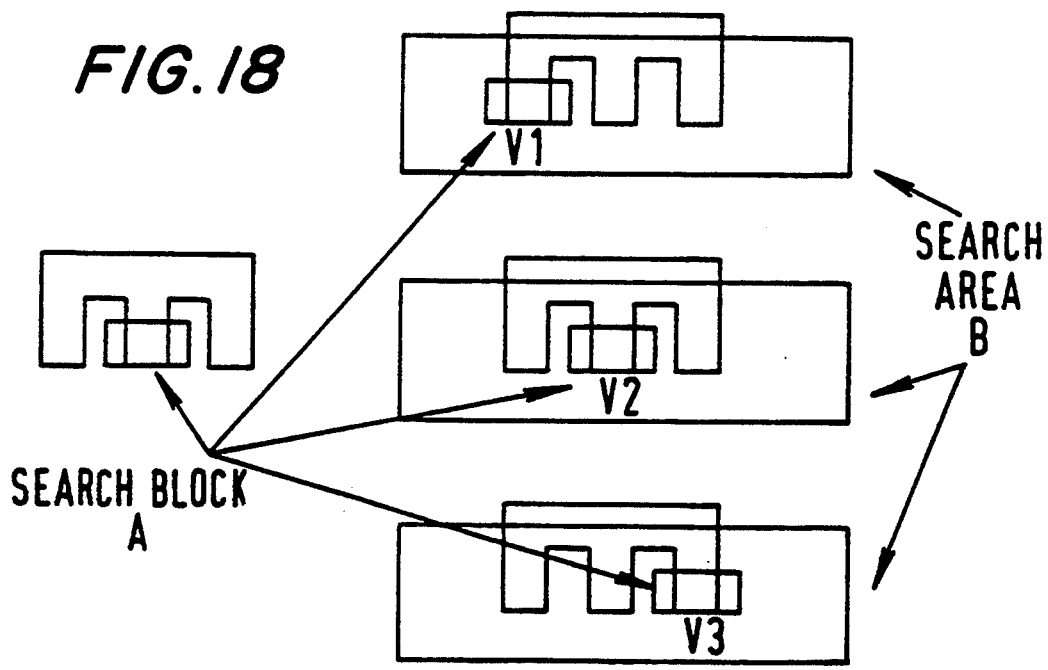
FIGS. 18, 19A and 19B show diagrammatically how a search block is grown.
Figure 19A:
Figure 19B:
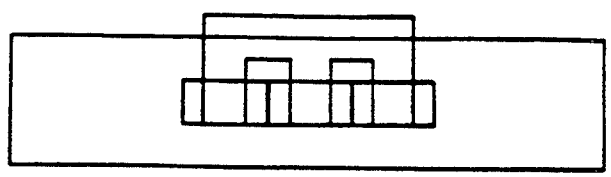

This technique of causing the search block to grow is not only advantageous for tracking large objects. It can also help to track the movement of an object having the shape of a regular pattern of a periodic nature. Thus, consider FIG. 18 where a search block A will match up with the search area B at locations V1, V2 and V3, with each of them giving a seemingly correct measure of motion. In this case, however, the motion vector estimation, that is the process that actually analyses the correlation surface, will show that good correlation occurs in three locations which are collinear. The search block will therefore be caused to grow horizontally until it is three times its original width, this being the direction in which multiple correlation occurred in this case. The search area will also be correspondingly horizontally enlarged. As shown in FIG. 19, with the enlarged search block 3A, there is only a single correlation point, which correctly relates to the motion of the object.

In this particular case the search block and the search area both have to grow horizontally, because the direction of multiple correlation is horizontal. It is equally possible, however, for the search block and the search area to grow vertically, or indeed in both directions, if the correlation surface suggests it.

Figure 20:
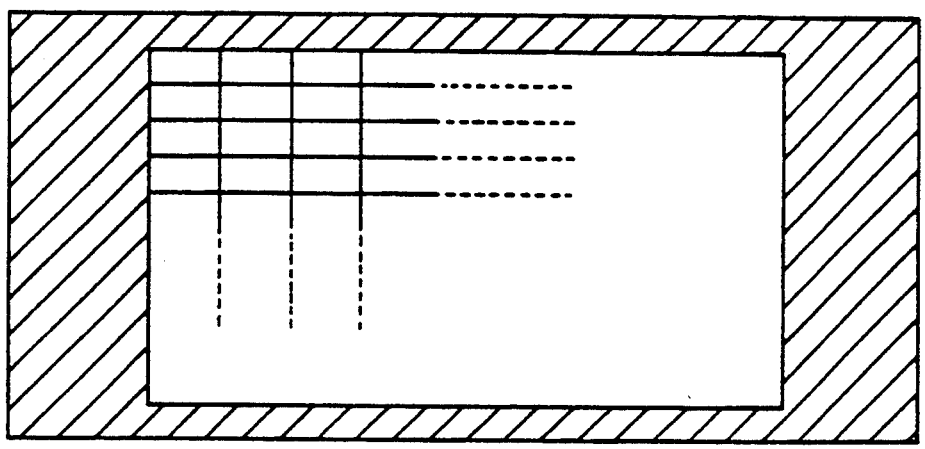
FIG. 20 shows the areas of a frame in which search block matching is not possible.

It should be noted that block matching cannot be applied to all the search blocks in the frame, because in the border area there is not enough room from which a search area can be drawn. Thus, block matching cannot be effected in the border area of the frame shown hatched in FIG. 20. This problem is dealt with by the motion vector reducer 45 (FIG. 4) described in more detail below, which attempts to supply search blocks in this hatched area with appropriate motion vectors.

From the correlation surface (FIG. 17) generated for each search block in a frame the motion vector estimator 44 (FIG. 4) deduces the likely inter-frame motion between the search block and its corresponding search area. It should again be mentioned that for clarity all diagrams of correlation surfaces are shown inverted, that is, such that a minimum is shown as a peak.

The motion vector estimator 44 (FIG. 4) uses motion vector estimation algorithms to detect the minimum point on each correlation surface. This represents the point of maximum correlation between the search block and the search area, and hence indicates the probable motion between them. The displacement of this minimum on the correlation surface with respect to the origin, in this case the centre of the surface, is a direct measurement, in terms of pixels per frame, of the motion. For the simplest case, where the correlation surface contains a single, distinct minimum, the detection of the minimum point on the correlation surface is sufficient to determine accurately the motion between the search block and the search area. As previously mentioned, the use of small search blocks improves the detection of motion and the accuracy of motion estimation, but unfortunately small single search blocks are unable to detect motion in a number of circumstances which will now be described.

Figure 21A:
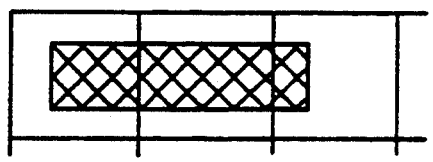
FIGS. 21A and 21B show diagrammatically a moving object straddling three search blocks.
Figure 21B:
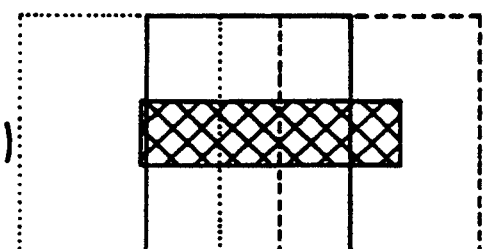
Figure 22:
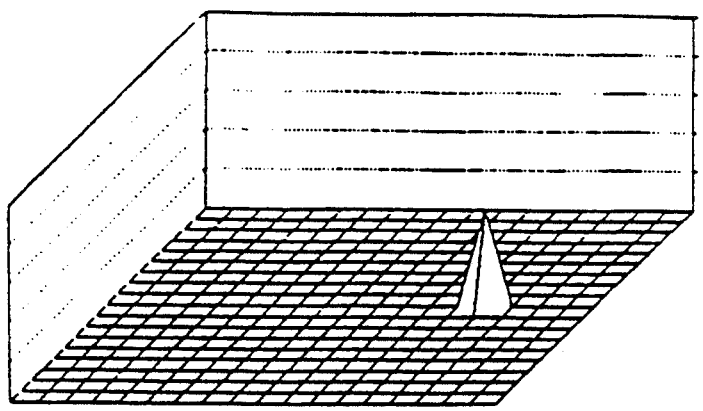
FIGS. 22 to 24 show three resulting correlation surfaces, respectively.
Figure 23:
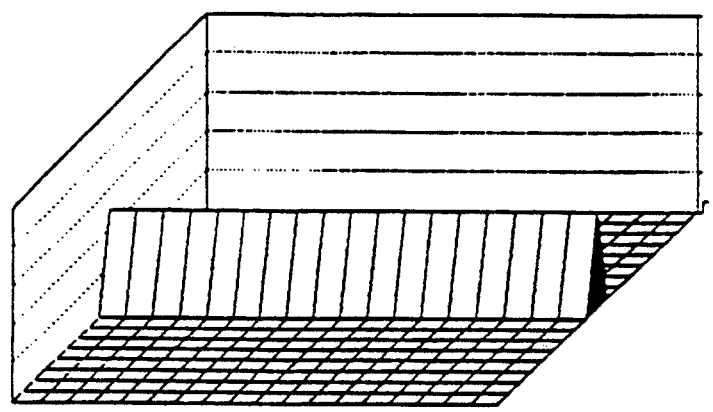

FIG. 21 shows an object with motion vectors (5, 0) straddling three search blocks 1A, 2A and 3A in a frame (t). When the search blocks 1A and 3A are correlated with respective search areas (1B and 3B) in the next frame (t+1) a correlation surface shown in FIG. 22 results showing a minimum at (5, 0). (This assumes a noiseless video source.) However, when the search block 2A is correlated with its respective search area 2B, the correlation surface shown in FIG. 23 is produced, in which the search block 2A correlates with the search area 2B at every point in the y-axis direction. There is therefore no single minimum in the correlation surface, and hence the motion between the search block 2A and the search area 2B cannot be determined.

Figure 24:
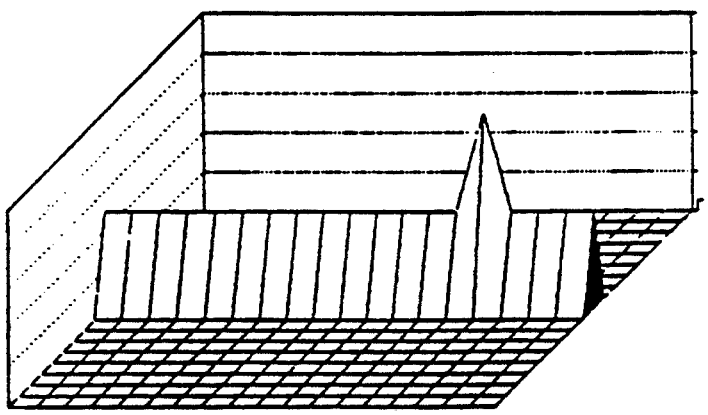

However, now consider the situation if the search block 2A is grown such that it encompasses all three of the original search blocks 1A, 2A and 3A. When the grown search block 2A is correlated with a search area covering the original search areas 1B, 2B and 3B, the resulting correlation surface is as shown in FIG. 24. This shows a single minimum at (5, 0) indicating the correct motion of the original search block 2A. This example illustrates the need for some unique feature in the source video, in order accurately to detect motion. Thus, the search blocks 1A and 3A both had unique vertical and horizontal features, that is the edges of the object, and hence motion could be determined. In contrast, the search block 2A had a unique vertical feature, but no unique horizontal feature, and hence horizontal motion could not be determined. However, by growing the search block until it encompasses a unique feature both horizontally and vertically, the complete motion for that search block can be determined. Moreover, it can be shown that growing the search block is beneficial when noise in the source video is considered.

Figure 25:
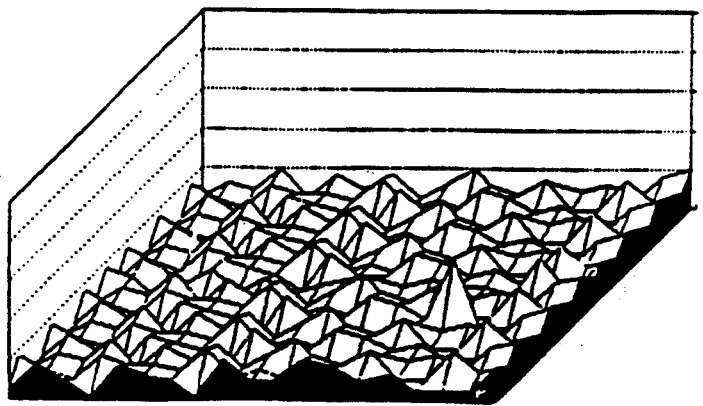
FIGS. 25 and 26 show further examples of correlation surfaces, used in describing a threshold test.
Figure 26:
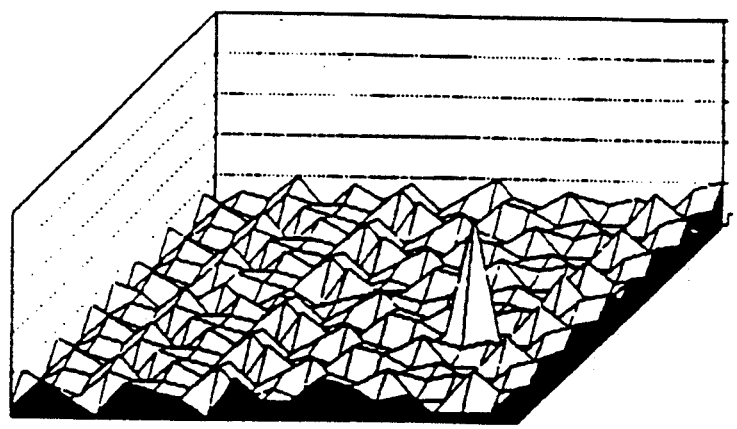

A further example will now be considered with reference to FIG. 25. This shows a correlation surface for a search block where the motion vector is (5, 3). However, due to the numerous other correlations which have taken place between the search block and the search area, the true motion is difficult to detect. An example of source video which might produce such a correlation surface would be a low contrast tree moving with the wind. It is now assumed that the search block and the search area are grown. The growing can take place in the horizontal direction, as in the previous example, or in the vertical direction, or in both directions. Assuming that the neighbouring search blocks have the same motion, the mean effect on the resulting correlation surface will be to increase the magnitude of the minima at (5, 3) by a greater proportion than the magnitude of the other correlation peaks. This is shown in FIG. 26, which indicates that it is then easier to detect the correct motion vector.

The way in which search blocks are grown will now be further considered with reference to FIG. 21. Here it was required to grow the area of the search block 2A to encompass the areas of the search blocks 1A and 3A, and to produce the resulting correlation surface. In fact, the resulting correlation surfaces are produced directly by adding together the elements of the three correlation surfaces corresponding to the search blocks 1A, 2A and 3A. In effect, if each correlation surface is considered as a matrix of point magnitudes, then the correlation surface of the enlarged search block 2A is the matrix addition of the correlation surface of the original search blocks 2A and 3A.

The area of the search block 2A could also be grown vertically by adding correlation surfaces of the search blocks above and below, whilst if the search block 2A is to be grown both horizontally and vertically, then the four neighbouring diagonal correlation surfaces have to be added as well. From this it will be seen that the actual process of growing a search block to encompass neighbouring search blocks is relatively easy, the more difficult process being to decide when growing should take place, and which neigbbouring search blocks should be encompassed. Basically, the answer is that the area of the search blocks should be grown until a good minimum or good motion vector is detected. It is therefore necessary to specify when a motion vector can be taken to be a good motion vector, and this can in fact be deduced from the examples given above.

In the example described with reference to FIGS. 21 to 24, it was necessary to grow the search block horizontally in order to encompass a unique horizontal feature of the object, and hence obtain a single minimum. This situation was characterized by a row of identical minima on the correlation surface of FIG. 23, and a single minimum on the correlation surface of FIG. 24. From this the first criteria for a good minimum can be obtained; a good minimum is the point of smallest magnitude on the correlation surface for which the difference between it and the magnitude of the next smallest point exceeds a given value. This given value is known as the threshold value, and hence this test is referred to herein as the threshold test.

It should be noted that the next smallest point is prevented from originating from within the bounds of a further test, described below, and referred to herein as the rings test. In the case of a rings test employing three rings, the next smallest point is prevented from originating from a point within three pixels of the point in question.

In the example of FIGS. 21 to 24, the correlation surface of FIG. 23 would have failed the threshold test; the search area 2A is therefore grown and, given a suitable threshold value, the correlation surface of FIG. 24 will pass the threshold test.

The threshold test can also be used to cause growing in the example described above with reference to FIGS. 25 and 26. Prior to growing the search block, the correct minimum is undetectable, due to the closely similar magnitudes of the surrounding points. Given a suitable threshold value, however, the correlation surface will fail the threshold test, and the search block will be grown. As a result, it will then be possible to detect the minimum among the other spurious points.

It will be seen that the use of a threshold is a subjective test, but the correct threshold for the correlation surface under test can be selected by normalizing the threshold as a fraction of the range of magnitudes within the correlation surface. This also lessens the effect of, for example the contrast of the video source.

Figure 27:
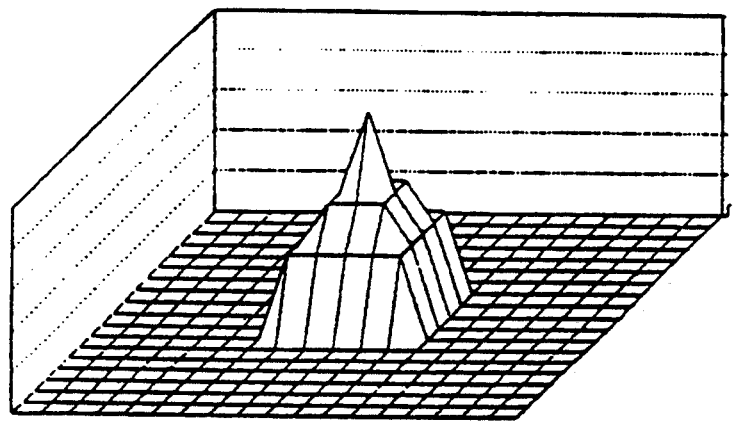
FIGS. 27 and 28 show still further examples of correlation surfaces, used in describing a rings test.
Figure 28:
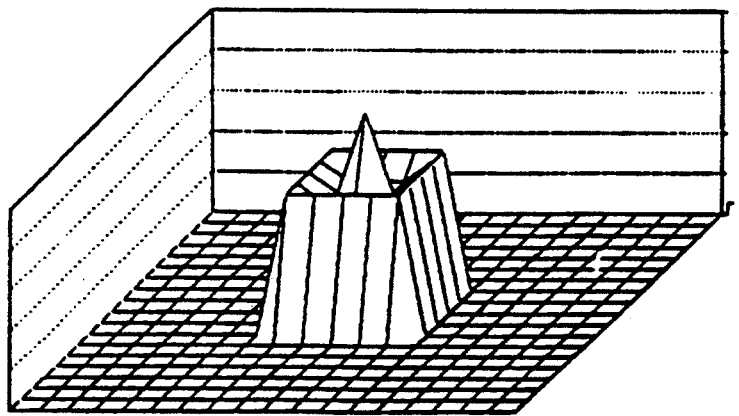

The rings test, referred to briefly above, and which is far less subjective, will now be further described. The basis of the rings test is to assume that a good minimum (or maximum) will have points of increasing (or decreasing) magnitudes surrounding it. FIG. 27 illustrates this assumption, showing a minimum at (0, 0) where the surrounding three rings of points have decreasing mean magnitude. This is as opposed to the correlation surface shown in FIG. 28, where the rings, and in particular the second inner-most ring, are not of decreasing mean magnitude.

In this case the criteria for a good minimum as defined by the rings test, is that the average slope is monotonic. Therefore for a pre-defined number of rings of points surrounding the minimum in question, the mean magnitude of each ring when moving from the innermost ring outwards, must be greater than that of the previous ring. Returning again to the example described with reference to FIGS. 21 to 24, it will be seen from FIGS. 23 and 24 that the correlation surface of FIG. 23 would have failed the rings rest, but that the correlation surface of FIG. 24 would have passed the rings test. Since the rings test compares mean, and not absolute, magnitudes, it is far less subjective than the threshold test, and indeed the only variable in the rings test is the number of rings considered.

Having described the mechanism for growing a search block, it is now necessary to consider how by examining the shape of the correlation surface it is possible to determine the most effective direction in which the search block should grow.

Referring again to FIG. 23, this correlation surface resulted where there was a unique vertical feature, but no unique horizontal feature. This is mirrored in the correlation surface by the minimum running horizontally across the correlation surface, due to the multiple correlations in this direction. From this it can be deduced that the search block should be grown horizontally. Conversely, should a line of multiple correlations run vertically, this would indicate the need to grow the search block vertically, whilst a circular collection of multiple correlations would indicate a need to grow the search block both horizontally and vertically.

Using this criteria, a quantative measure of the shape of the correlation surface is required in order to determine in which direction the search block should be grown. This measure is determined as follows. Firstly, a threshold is determined. Any point on the correlation surface below the threshold is then considered. This threshold, like that used in the threshold test, is normalized as a fraction of the range of magnitudes within the correlation surface. Using this threshold, the points on the correlation surface are examined in turn in four specific sequences. In each, the point at which the correlation surface value falls below the threshold is noted. These four sequences are illustrated diagrammatically in FIG. 29 in which the numbers 1, 2, 3 and 4 at the top, bottom, left and right refer to the four sequences, and the hatched area indicates points which fall below the threshold:

Sequence 1

Search from the top of the correlation surface down for a point
A which falls below the threshold.

Sequence 2

Search from the bottom of the correlation surface up for a point
C which falls below the threshold.

Sequence 3

Search from the left of the correlation surface to the right for a point: D which falls below the threshold.

Sequence 4

Search from the right of the correlation surface to the left for a point B which falls below the threshold.

Figure 29:
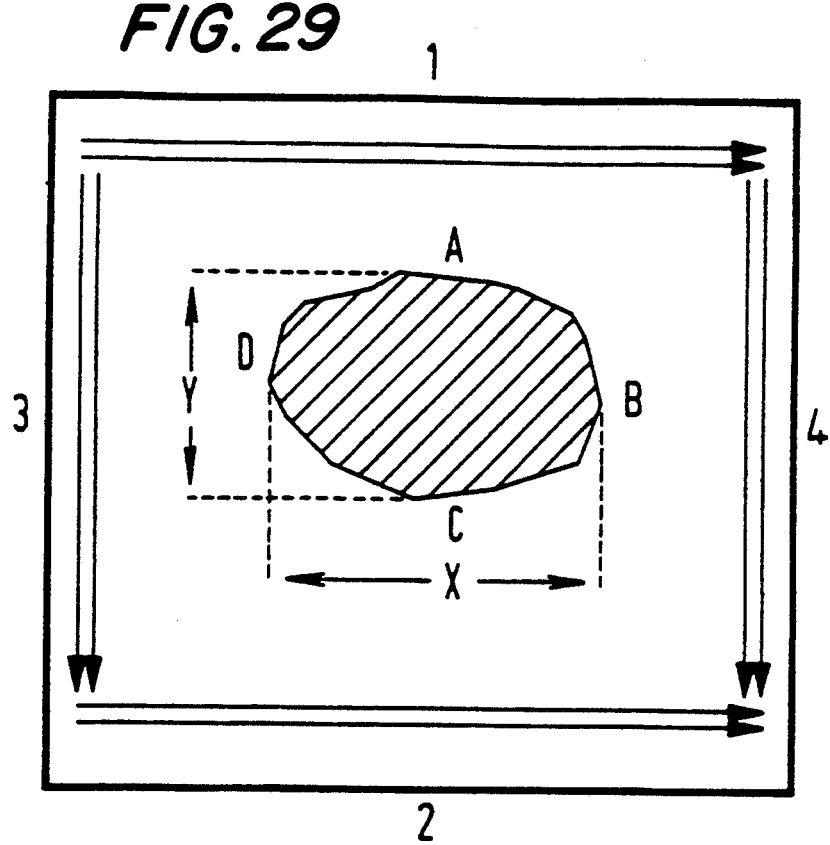
FIGS. 29 shows diagrammatically how the direction in which a search block is to grow is determined.

The locations of the four resulting points A, B, C and D are used to calculate the two dimensions X and Y indicated in FIG. 29, these dimensions X and Y indicating the size of the hatched area containing the points falling below the threshold value. Hence from the dimensions X and Y, it can be deduced whether the shape is longer in the x rather than the y direction, or vice versa, or whether the shape is approximately circular. A marginal difference of say ten percent is allowed in deducing the shape, that is, the dimension X must be a minimum of ten percent greater than the dimension Y for the shape to be considered to be longer in the x direction. Similarly for the y direction. If the dimensions X and Y are within ten percent of each other, then the shape is considered to be circular, and the search block is grown in both directions. In the example of FIG. 29 the dimension X is greater than the dimension Y, and hence the search block is grown in the x or horizontal direction.

The growing of the search block continues until one or more growth limitations is reached. These limitations are: that the minimum in the correlation surface passes both the threshold test and the rings test; that the edge of the video frame is reached; or that the search block has already been grown a predetermined number of times horizontally and vertically. This last limitation is hardware dependent. That is to say, it is limited by the amount of processing that can be done in the available the. In one specific embodiment of apparatus according to the present invention, this limit was set at twice horizontally and once vertically.

If the minimum in the correlation surface passes both the threshold rest and the rings test, then it is assumed that a good motion vector has been determined, and can be passed to the motion vector reducer 45 (FIG. 4). However, if the edge of the frame is reached or the search block has already been grown a predetermined number of times both horizontally and vertically, then it is assumed that a good motion vector has not been determined for that particular search block, and instead of attempting to determine a good motion vector, the best available motion vector is determined by weighting.

The correlation surface is weighted such that the selection of the best available motion vector is weighted towards the stationary, that is the centre, motion vector. This is for two reasons, firstly, if the search block, even after growing, is part of a large plain area of source video, it will not be possible to detect a good motion vector. towever, since the source video is of a plain area, a stationary motion vector will lead to the correct results in the suhsequent processing. Secondly, weighting is designed to reduce the possibility of a seriously wrong motion vector being passed to the motion vector reducer 45 (FIG. 4). This is done because it is assumed that when a good motion vector cannot be determined, a small incorrect motion vector is preferable to a large incorrect motion vector.

Figure 30A:
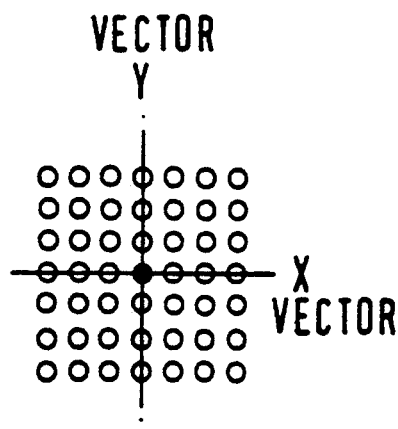
FIGS. 30A and 30B show diagrammatically how a correlation surface is weighted.
Figure 30B:
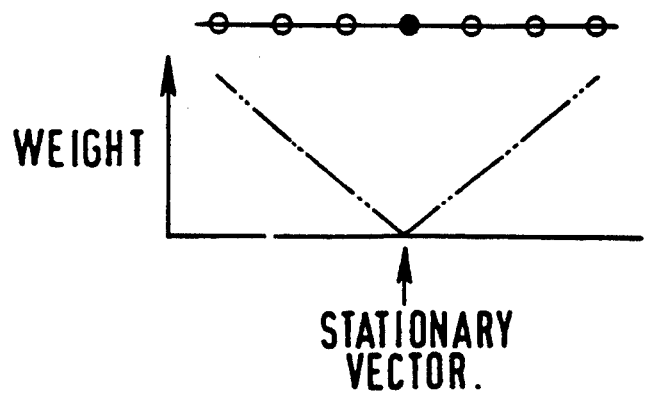

FIG. 30 shows an example of how the weighting function can be applied to the correlation surface. In this example, the weight applied to a given point on the correlation surface is directly proportional to the distance of that point from the stationary, centre motion vector. The magnitude of the point on the correlation surface is multiplied by the weighting factor. For example, the gradient of the weighting function may be such that points plus or minus 32 pixels from the centre, stationary motion vector are multiplied hy a factor of three. In other words, as shown in FIG. 30, where the centre, stationary motion vector is indicated by the black circle, the weighting function is an inverted cone which is centred on the centre, stationary motion vector.

After the correlatiou surface has been weighted, it is again passed through the threshold test and the rings test. If a minimum which passes both these tests is determined, then it is assumed that this is a good motion vector, and it is flagged to indicate that it is a good motion vector, but that weighting was used. This flag is passed, together with the motion vector to the motion vector reducer 45 (FIG. 4). If on the other hand, neither a good motion vector nor a best available motion vector can be determined, even after weighting, then a flag is set to indicate Lhat any motion vector passed to the motion vector reducer 45 (FIG. 4) for this search block is a bad motion vector. It is necessary to do this because bad motion vectors must not be used in the motion vector reduction process, but must be substituted as will be described below.

Thus, in summary, the operation of the motion vector estimator 44 (FIG. 4) is to derive from the correlation surface generated by the direct block marcher 43 (FIG. 4), the point of best correlation, that is the minimum. This minimum is then subjected to the threshold test and the rings test, both of which the minimum must pass in order for it to be considered to represent the motion of the search block. It should, incidentally, be noted that the threshold used in the threshold test and the rings test may be either absolute values or fractional values. If the minimum fails either test, then the search block is grown, a determined, and the threshold test and the new minimum is rings test re-applied. The most effective direction in which to grow the search block is determined from the shape of the correlation surface.

Referring initially to FIG. 4, the. process of motion vector reduction will now be described. Using a HDVS, each search block is assumed to be 32 pixels by 23 lines, which can be shown to lead to a possible maximum of 2451 motion vectors. The choice of the search block size is a compromise between maintaining resolution and avoiding an excessive amount of hardware. If all these motion vectors were passed to the motion vector selector 46, the task of motion vector selection would not be practicable, due to the amount of processing that would be required. To overcome this problem, the motion vector reducer 45 is provided between the motion vector estimator 44 and the motion vector selector 46. The motion vector reducer 45 takes the motion vectors that have been generated by the motion vector estimator 44 and presents the motion vector selector 46 with only, for example, four motion vectors for each search block in the frame, including those in border regions, rather than all the motion vectors derived for that frame. The effect of this is two-fold. Firstly, this makes it much easier to choose the correct motion vector, so long as it is within the group of four motion vectors passed to the motion vector selector 46. Secondly, however, it also means that if the correct motion vector is not passed as one of the four, then the motion vector selector 46 is not able to select the correct one. It is therefore necessary to try to ensure that the motion vector reducer 45 includes the correct motion vector amongst those passed to the motion vector selector 46. It should also be mentioned that although four motion vectors are passed by the motion vector reducer 45 to the motion vector selector 46, only three of these actually represent motion, the fourth motion vector always being the stationary motion vector which is included to ensure that the motion vector selector 46 is not forced into applying a motion vector representing motion to a stationary pixel. Other numbers of motion vectors can be passed to the motion vector selector 46, for example, in an alternative embodiment four motion vectors representing motion and the stationary motion vector may be passed.

Figure 31:
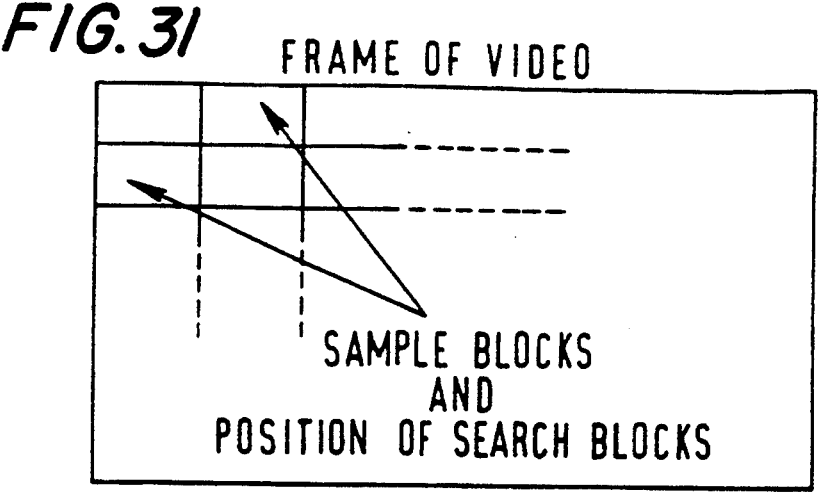
FIG. 31 shows the relationship between sample blocks and search blocks, and a frame of video.

Hereinafter the term 'sample block' refers to a block in a frame of video in which each pixel is offered the same four motion vectors by the motion vector reducer 45. Thus, a sample block is the same a.s a search block before the search block has been grown. As shown in FIG. 31, in a frame of video the initial positions of the sample blocks and the search blocks are the same.

The motion vector reducer 45 (FIG. 4) receives the motion vectors and the flags from the motion vector estimator 44 (FIG. 4) and determines the quality of the motion vectors by examining the flags. If Lbe motion vector was not derived from an ambiguous surface, that is there is a high degree of confidence in it, then it is termed a good motion vector, but if a certain amount of ambiguity exists, then the motion vector is termed a bad motion vector. In the motion vector reduction process, all motion vectors classed as bad motion vectors are ignored, because it is important that no incorrect motion vectors are ever passed to the motion vector selector 46 (FIG. 4), in case a bad motion vector is selected thereby. Such selection would generally result in a spurious dot. in the final picture, which would be highly visible.

Each of the motion vectors supplied to the motion vector reducer 45 (FIG. 4) was obtained from a particular search block, and hence a particular sample block (FIG. 31), the position of these being noted together with the motion vector. Because any motion vectors which have been classed as bad motion vectors are ignored, not all sample blocks will have a motion vector derived from the search block at that position. The motion vectors which have been classed as good motion vectors, and which relate to a particular search block, and hence a particular sample block, are called local motion vectors, because they have been derived in the area from which the sample block was obtained. In addition to this, another motion vector reduction process counts the frequency at which each good motion vector occurs, with no account taken of the actual positions of the search blocks that were used to derive them. These motion vectors are then ranked in order of decreasing frequency, and are called common motion vectors. In the worst case only three common motion vectors are available and these are combined with the stationary motion vector to make up the four motion vectors to be passed to the motion vector selector 46 (FIG. 4). However, as there are often more than three common motion vectors, the number has to be reduced to form a reduced set of common motion vectors referred to as global motion vectors.

A simple way of reducing the number of common motion vectors is to use the three most frequent common motion vectors and disregard the remainder. However, the three most frequent common motion vectors are often those three motion vectors which were initially within plus or minus one pixel motion of each other vertically and/or horizontally. In other words, these common motion vectors were all tracking the same motion with slight differences between them, and the other common motion vectors, which would have been disregarded, were actually tracking different motions.

In order to select the common motion vectors which represent all or most of the motion in a scene, it is necessary to avoid choosing global motion vectors which represent the same motion. Thus, the strategy actually adopted is first to take the three most frequently occurring common motion vectors and check to see if the least frequent among them is within plus or minus one pixel motion vertically and/or plus or minus one pixel motion horizontally of either of the other two common motion vectors. If it is, then it is rejected, and the next most frequently occurring common motion vector is chosen to replace it. This process is continued for all of the most frequently occurring conunon motion vectors until there are either three common motion vectors which are not similar to each other, or until there are three or less common motion vectors left. However, if there are more than three common motion vectors left, then the process is repeated this time checking to see if the least frequent among them is within plus or minus two pixel motion vertically and/or plus or minus two pixel motion horizontally of another, and so on at increasing distances if necessary. These three common motion vectors are the required global motion vectors, and it is important to note that they are still ranked in order of frequency.

Figure 32:
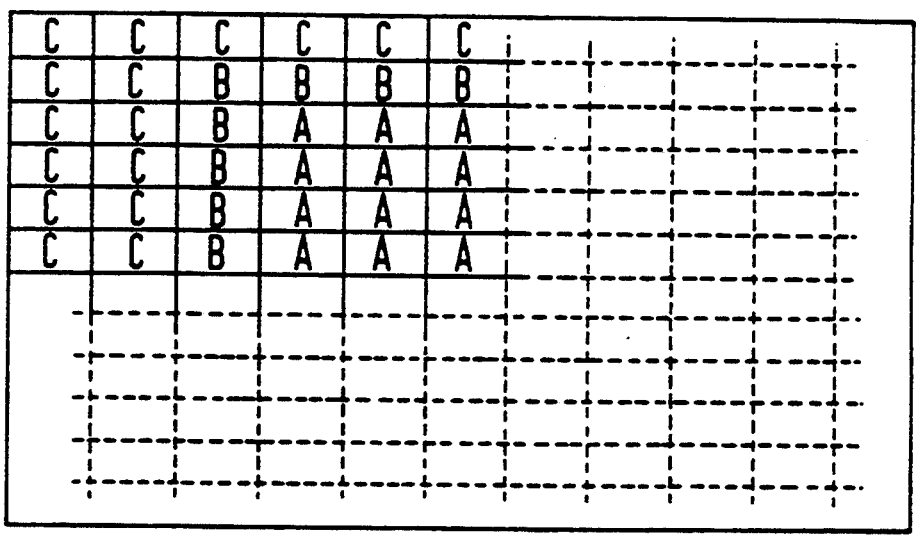
FIG. 32 shows motion vector regions in a frame of video.

When considering the motion vector reduction process and the sample blocks of a frame of video, it is necessary to look at three different types of sample blocks. These types are related to their actual position in a frame of video, and are shown in FIG. 32 as regions. Region A comprises sample blocks which are totally surrounded by other sample blocks and are not near the picture boundary. Region B contains sample blocks which are partially surrounded by other sample blocks and are not near the picture boundary. Finally, region C contains sample blocks which are near the picture boundary. The motion vector reduction algorittun to be used for each of these regions is different. These algorithms will be described below, but firstly it should be reiterated that there exist good motion vectors for some of the sample blocks in the frame of video, and additionally there are also three global motion vectors which should represent most of the predominant motion in the scene. A selection of these motion vectors is used to pass on three motion vectors together with the stationary motion vector for each sample block.

Figure 33:
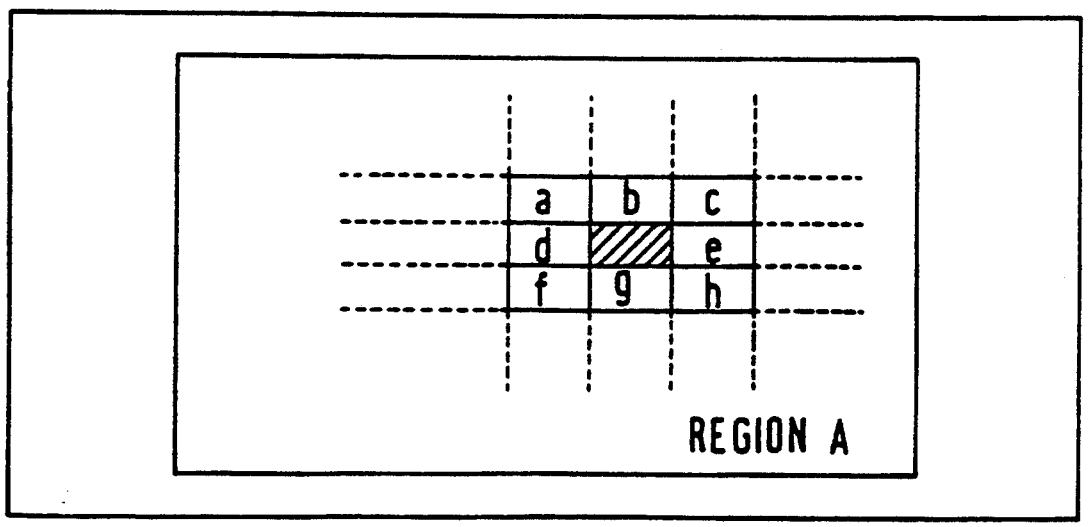
FIGS. 33 to 35 show diagrams used in explaining motion vector reduction in respective regions of a frame of video.

FIG. 33 illustrates diagrammatically motion vector reduction in the region A. This is the most complex region to deal with, because it has the largest number of motion vectors to check. FIG. 33 shows a central sample block which is hatched, surrounded by other sample blocks a to h. Firsfly, the locally derived motion vector is examined to see if it was classed as a good motion vector. If it was, and it is also not the same as the stationary motion vector, then it is passed on. However, if it fails either of these tests, it is ignored. Then the motion vector associated with the sample block d is checked to see if it was classed as a good motion vector. If it was, and if it is neither the same as any motion vector already selected, nor the same as the stationary motion vector, then it too is passed on. If it fails any of these tests then it too is ignored. This process then continues in a similar manner in the order e, b, g, a, h, c and f. As soon as three motion vectors, not including the stationary motion vector, have been obtained, then the algorithm stops, because that is all that is required for motion vector selection for that sample block. It is, however, possible for all the above checks to be carried out without three good motion vectors having been obtained. If this is the case, then the remaining spaces are filled with the global motion vectors, with priority being given to the more frequent global motion vectors.

Figure 34:
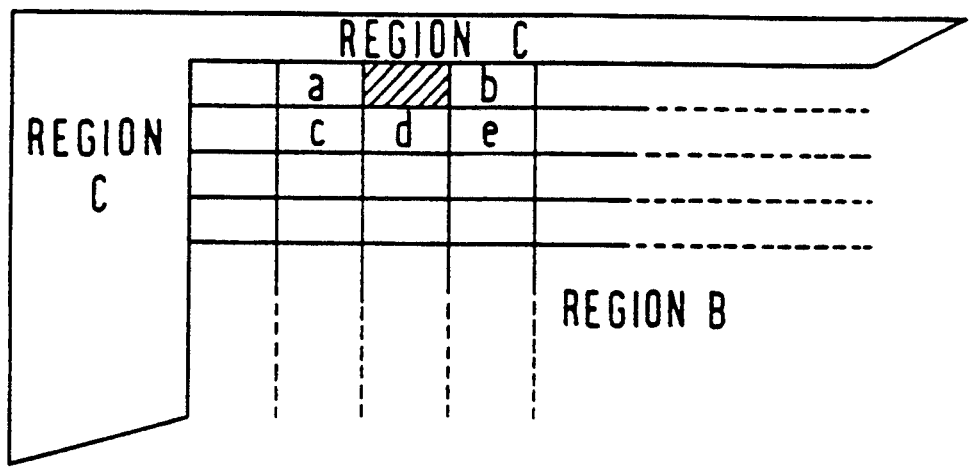

FIG. 34 illustrates motion vector reduction in the region B. Sample blocks in the region B are the same as those in the region A, except that they are not total ly surrounded by other sample blocks. Thus the process applied to these sample blocks is exactly the same as those for the region A, except that it is not possible to search in all the surrounding sample blocks. Thus as seen in FIG. 34, it is only possible to check the motion vectors for the sample blocks a to e, and any remaining spaces for motion vectors are filled, as before, with global motion vectors. Likewise, if the hatched sample block in FIG. 34 were displaced two positions to the left, then it will be seen that there would only be three adjacent surrounding blocks to be checked before resorting to global motion vectors.

Figure 35:
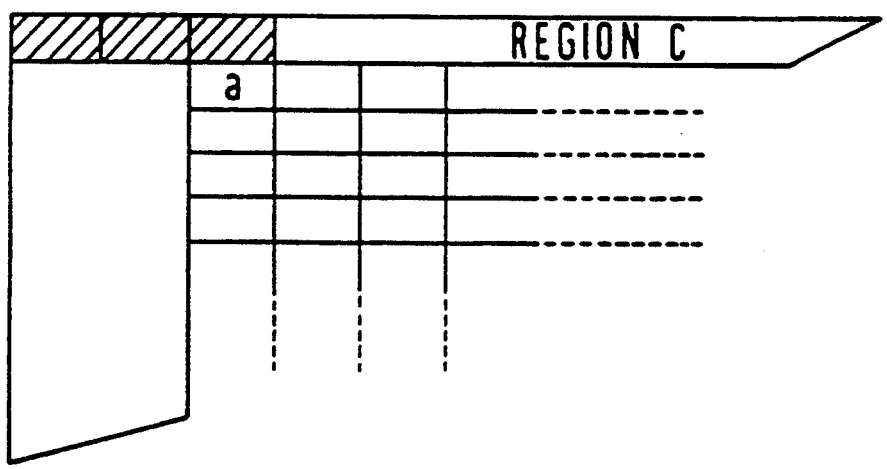

FIG. 35 illustrates motion vector reduction in the region C. This is the most severe case, because the sample blocks neither have a locally derived motion vector nor do they have many surrounding sample blocks whose motion vectors could be used. The simplest way of dealing with this problem is simply to give the sample blocks in the region C the global motion vectors together with the stationary motion vector. However, this is found to produce a block-like effect in the resulting picture, due to the sudden change in the motion vectors presented for the sample blocks in the region C compared with adjoining sample blocks in the region B. Therefore a preferred strategy is to use for the sample blocks in the region C the sample motion vectors as those used for sample blocks in the region B, as this prevents sudden changes. Preferably, each sample block in the region C is assigned the same motion vectors as that sample block in the region B which is physically nearest to it. Thus, in the example of FIG. 35, each of the hatched sample blocks in the region C would be assigned the same motion vectors as the sample block a in the region B, and this has been found to give excellent results.

Referring again to FIG. 4, the purpose of the motion vector selector 46 is to assign one of the four motion vectors supplied thereto to each individual pixel within the sample block. In this way the motion vectors can be correctly mapped to the outline of objects. The way in which this assignment is effected is particularly intended to avoid the possibility of the background surrounding fine detail from producing a better match than that produced by the correct motion vector. To achieve this the motion vector selection process is split into two main stages. In the first stage, motion vectors are produced for each pixel in the input frames. In other words, there is no attempt to determine the motion vector values for pixels at the output frame positions. The second stage uses the motion vector values produced by the first stage to determine the motion vector value for each pixel in the output frame.

Figure 36:
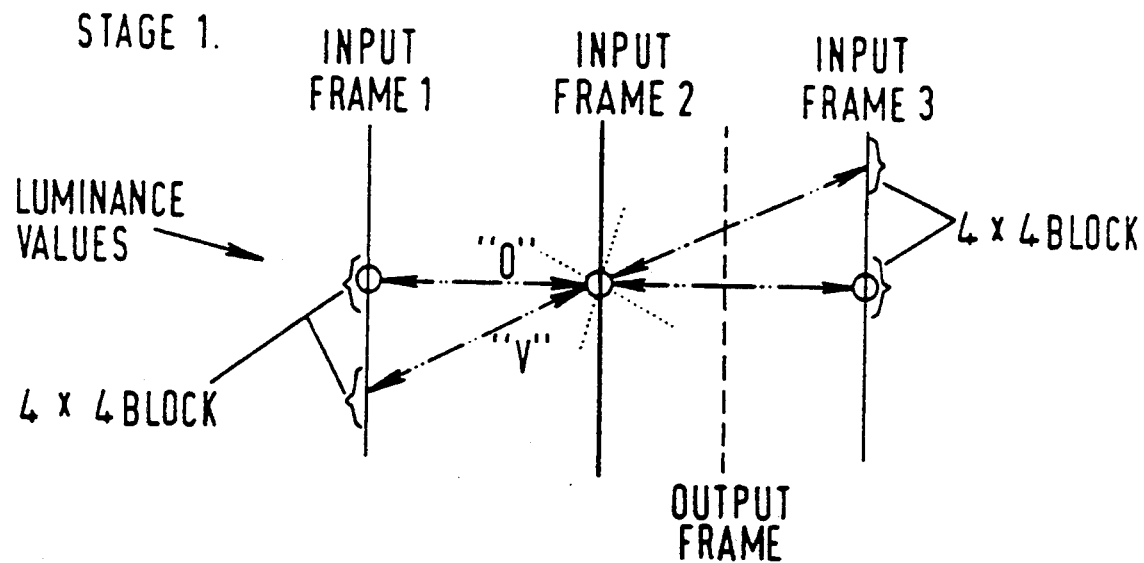
FIGS. 36 and 37 show diagrammatically a first stage in motion vector selection.

Referring now to FIG. 36, each pixel of the input frame 2 is tested for the best luminance value match with the previous and following input frames 1 and 3 of video data, using each of the four motion vectors supplied. The pixel luminanee difference is determined as:

$$\sum_{m=0}^{4} \sum_{n=0}^{4} |P1_{nm} - P2_{nm}| + \sum_{m=0}^{4} \sum_{n=0}^{4} |P2_{nm} - P3_{nm}|$$

where:

$P1_{nm}$ is the luminance value of a frame 1 pixel within a 4×4 block of pixels surrounding the pixel whose location is obtained by subtracting the coordinates of the motion vector being tested from the location of the pixel being tested in frame 2

$P2_{nm}$ is the luminanee value of a frame 2 pixel within a 4×4 block of pixels surrounding the pixel being tested $P3_{nm}$ is the luminance value of a frame 3 pixel within a 4×4 block of pixels surrounding the pixel whose location is obtained by adding the coordinates of the motion vector being tested to the location of the pixel being tested in frame 2

The minimum pixel difference then indicates the best luminance match and therefore the correct motion vector applicable to the pixel being tested. if the correct motion vector is not available, or titere are uncovered or covered areas, referred to in more detail below, then a good match may not occur.

The indication of a poor match is achieved when the average pixel difference within the block of pixels being used is above a certain threshold. This threshold is important, because high frequency detail may produce a poor match even when the correct motion vector is tested. The reason for this poor match is the possibility of a half pixel error in the motion vector estimate. To determine what threshold should indicate a poor match, it is necessary to relate the threshold to the frequency content of the picture within the block of data which surrounds the pixel for which the motion vector is required. To achieve this, an auto-threshold value is determined where the threshold value equals half the maximum horizontal or vertical pixel luminance difference abouL the pixel being tested. To ensure that the threshold value obtained is representative of the whole block of data which is compared, an average value is obtained for the four central pixels a 4×4 block used.

Figure 37:
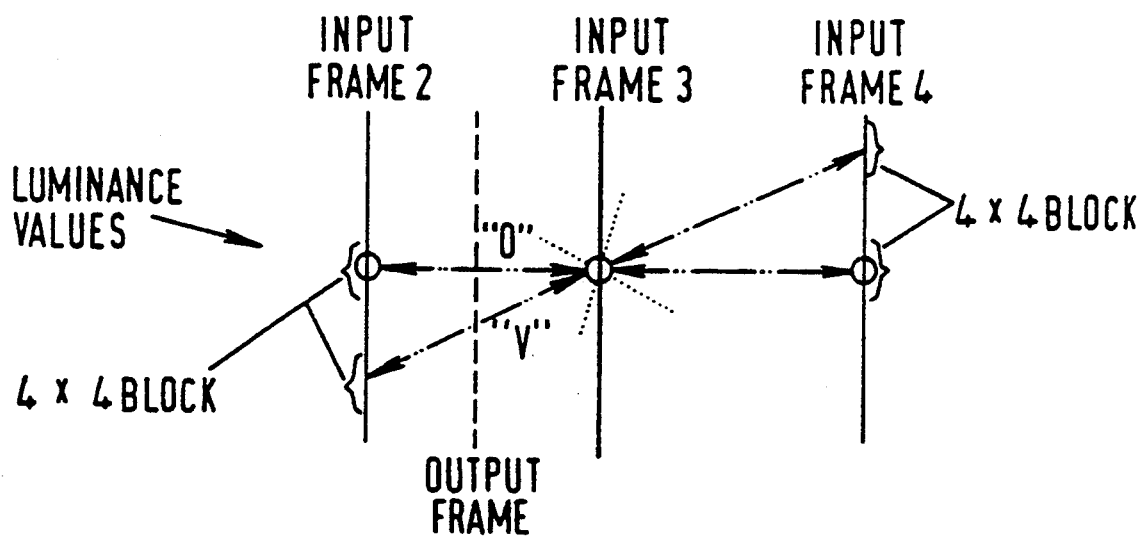

Referring to FIG. 38, which shows a 4×4 block, the required threshold value T is given by:

$$T = (T1 + T2 + T3 + T4)/8$$

where T3, for example, is determined as indicated in FIG. 39 as equal to the maximum of the four pixel luminance difference values comprising:

the two vertical differences $|B2-B3|$ and $|B4-B3|$, and the two horizontal differences $|A3|B3|$ and $|C3-B3|$ In this way a frame of motion vectors is obtained for input frame 2, and in a similar manner a frame of motion vectors is obtained for input frame 3 as indicated in FIG. 37.

Apart from scene changes, it is the phenomenon of uncovered/covered surfaces that causes a mis-match to occur in above first stage of motion vector selection. If an object, say a car, drives into a tunnel, then the car has become covered, while when it drives out, the car is uncovered. If the part of the car that was recovered in frames 1 and 2 is covered in frames 3 and 4, then the basic vector selection process is not able to determine the correct vector. Moreover, whilst the car going into the tunnel becomes covered, the road and objects behind the car are being uncovered. Likewise the car leaving the tunnel is being uncovered, but the road and obiects behind the car are being covered. In general therefore both covered and uncovered objects will exist at the same time. The end of a scene will also have a discontinuation of motion that is similar to an object becoming covered. In an attempt to determine a motion vector even in such circumstances, the luminance value block match is reduccel to a two frame match, instead of the three frame match of FIGS. 36 and 37. The frame that the motion vectors are required for (say frame 2) is block-matched individually to the previous and the next frame (frame 1 and frame 3 respectively, in the case of frame 2), using the four motion vectors supplied. The motion vector which produces the best match is chosen as the motion vector applicable to time pixel being tested. in this case, however, a flag is set to indicate that only a two frame match was used.

Particularly with integrating type television cameras, there will be situations where no match occurs. If an object moves over a detailed background, then an integrating camera will produce unique portions of picture where the leading and trailing edges of the object are mixed with the detail of the background. In such circumstances, even the two frame match could produce an average pixel difference above the threshold value. In these cases the motion vector value is set to zero, and an error flag is also set.

The second stage of motion vector selection makes use of the two frames of motion vectors, derived by the first stage. One frame of motion vectors (input frame 2) is considered to be the reference frame, and the following frame to this (input frame 3) is also used. The output frame position then exists somewhere between these two frames of motion vectors. Referring to FIG. 40, for each output pixel position the four possible motion vectors associated with the sample block of input frame 2, are tested. A line drawn through the output pixel position at the angle of the motion vector being tested will point to a position on both the input frame 2 and the input frame 3. In the case of odd value motion vectors, for example, 1, 3 and 5, a point midway between two input frame pixels would be indicated in the case where the output frame is precisely half way between the input frames 1 and 2. To allow for this inaccuracy, and also to reduce the sensitivity to individual pixels, a 3×3 block of motion vectors is acquired for each frame, centred on the closest pixel position. In effect a block-match is then performed between each of the two 3×3 blocks of motion vectors and a block containing the motion vector being tested. The motion vector difference used represents the spatial difference of the two motion vector values as given by:

$$\sqrt{((x1-x2)^2+(y1-y2)^2)}$$

where:

x1 and y1 are the Cartesian coordinates of the motion vector in one of the blocks x2 and y2 are the Cartesian coordinates of the motion vector being tested
An average vector difference per pixel is produced as a result of the block match.

A motion vecLor match is first produced as above using only motion vector values which were calculated using three input frames; that is, input frames 1, 2 and 3 for input frame 2 (FIG. 36), and input. frames 2, 3 and 4 for input frame 3 (FIG. 37), and the result is scaled accordingly. Preferably there are at least four usable motion vectors in the block of nine. When both the motion vector block of frame 2 and frame 3 can be used, the motion vector difference values are made up of half the motion vector difference value from frame 2 plus ball the motion vecLor difference value from frame 3.

Whichever motion vector produces the minimum motion vector difference value using the above technique is considered to be the motion vector applicable to the output pixel being tested. If the motion vector difference value produced by the three frame match input motion vector (FIGS. 36 and 37 is greater than unity, then a covered or uncovered surface has been detected, and the same process is repeated, but this the ignoring the error flags. That is, the motion vector values which were calculated using two input frames are used. Theoretically this is only necessary for uncovered/covered surfaces, although in fact improvements can be obtained to the picture in more general areas.

If after both of the above tests have been performed, the minimum motion vector match is greater than two, the motion vector value is set to zero, and an error flag is set for use by the motion vector post processor 47 (FIG. 4).

Following motion vector selection, there will almost certainly be in any real picture situation, some remaining spurious motion vectors associated with certain pixels. FIGS. 41 to 46 show what are taken to be spurious motion vectors, and in each of these figures the triangles represent pixels having associated therewith the same motion vectors, whilst the stars represent pixels having associated therewith motion vectors different those associated with the surrounding pixels, and the circle indicates the motion vector under test.

Figure 41:
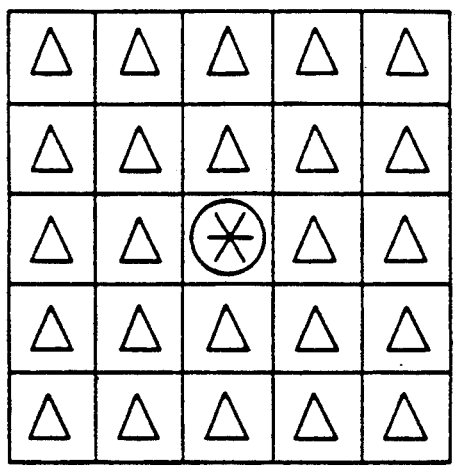

FIG. 41 shows a point singularity where a single pixel has a motion vector different from those of all the surrounding pixels.

Figure 42:
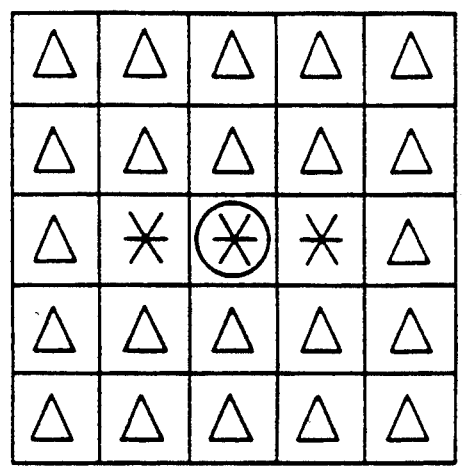

FIG. 42 shows a horizontal motion vector impulse, where three horizontally aligned pixels have a motion vector different from those of the surrounding pixels.

Figure 43:
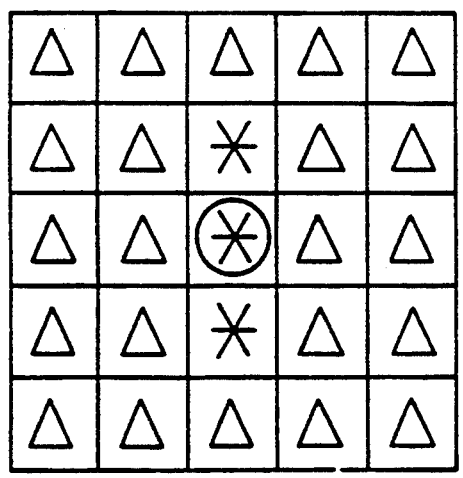

FIG. 43 shows a vertical motion vector impulse where three vertically aligned pixels have a motion vector different from those of the surrounding pixels.

Figure 44:
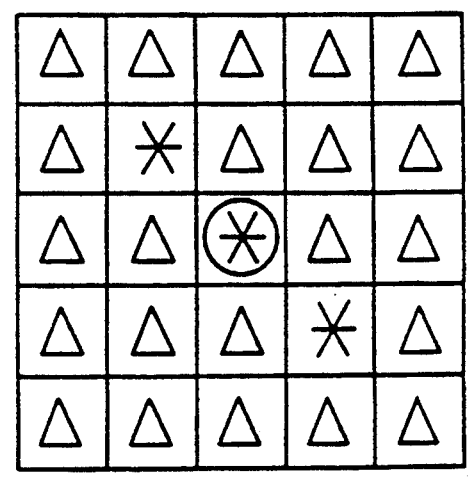

FIG. 44 shows a diagonal motion vector impulse where three diagonally aligned pixels have a motion vector different from those of all the surrounding pixels.

FIG. 45 shows a horizontal plus vertical motion vector impulse, where five pixels disposed in an upright cross have a motion vector different from those of all the surrounding pixels.

FIG. 46 shows a two-diagonal motion vector impulse where five pixels arranged in a diagonal cross have a motion vector different from those of all the surrounding pixels.

It is assumed float pixel motion vectors which fall into any of the above six categories do not actually belong to a real picture, and are a direct result in of an incorrect motion vector selection. If such motion vectors were used cturing the interpolation process, then they would be Iikely to cause dots on the final output picture, and it is therefore preferable that such motion vectors be identified and eliminated. This is done using an algorithm which will detect and flag all of the above motion vector groupings.

The algorithm uses a two-pass process, with each pass being identical. The need for two passes will become apparent. FIG. 47, to which reference is made, shows an array of pixels, all those marked with a triangle having the same motion vector* associated therewith. The block of nine pixels in the centre has motion vectors designated vector 1 to vector 9 associated therewith, which motion vectors may or may not be the same. Vector 5 is the motion vector under test.

In the first pass, vector 5 is checked to determine whether it is the same as, or within a predetermined tolerance of:
firstly
vector 1 or vector 3 or vector 7 vector 9
and secondly
vector 2 or vector 4 or vector 6 or vector 8
This checks to see if vector 5 is the same as at least one of its horizontal or vertical neighbouts, and tire same as at least one of its diagonal neighbouts. If this is not the case, then a flag to set to indicate that pixel 5 is bad.

The first pass will flag as bad those motion vectors relating to point singularities, horizontal motion vector impulses, vertical motion vector impulses, diagonal motion vector impulses and two diagonal motion vector impulses (FIGS. 41 to 44 and 46), but not the motion vectors corresponding to horizontal plus vertical motion vector impulses (FIG. 45) for which pass 2 is required. The second pass checks for exactly the same conditions as in the first pass, but in this case motion vectors which have already been flagged as bad are not included in the calculation. Thus, referring to FIG. 45, after the first pass only the centre motion vector is flagged as bad, but after the second pass all five of the motion vectors disposed in the upright cross are flagged as bad.

Having identified the bad motion vectors, it is then necessary to repair them, this also being effected by the motion vector post processor 47 (FIG. 4). Although various methods such as interpolation or majority replacement can be used, it is has been found that in practice simple replacement gives good results. This is effected as follows (and it should be noted that the 'equals' signs mean not only exactly equal to, but also being within a predetermined tolerance of):
If vector 5 is flagged as bad then it is replaced with:
vector 4 if (vector 4 equals vector 6)
else which vector 2 if (vector 2 equals vector 8)
else with vector 1 if (vector 1 equals vector 9)
else with vector 3 if (vector 3 equals vector 7)
else do nothing Referring again to FIG. 4, the finally selected motion vector for each pixel is supplied by the motion vector post processor 47 to the interpolator 48, together with the progressive scan converted frames at 60 frames per second from the progressive scan converter 42. The interpolator 48 is of relatively simple form using only two progressive scan converted frames, as indicated in FIG. 48. Using the temporal position of the output frame relative to successive input frames, frame 1 and frame 2, and the motion vector for the pixel in the output frame, the interpolator 48 determines in known manner which part of the first frame should be combined with which part of the second frame and witlx what weighting to produce the correct output pixel value. In other words, the interpolator 48 actaptively interpolates along the direction of movement in dependence on the motion vectors to produce motion compensated progressive scan frames corresponding to 24 frames per second. Although the motion vectors have been derived using only luminance values of the pixels, the same motion vectors are used for deriving the required output pixel chrominance values. An 8×8 array of pixels are used from each frame to produce the required output. Thus the interpolator 48 is a two-dimensional, vertical/horizontal, interpolator and the coefficients used for the interpolator 48 may be derived using the Remez exchange algorithm which can be found fully explained in 'Theory and application of digital signal processing', Lawrence R Rabiner, Bernard Gold. Prentice-Hall Inc., pages 136 to 140 and 227.

FIG. 48 shows diagrammatically the interpolation performed by the interpolator 48 (FIG. 4) for three different cases. The first case, shown on the left, is where there are no uncovered or covered surfaces, the second case, shown in the centre, is where there is a covered surface, and the third case, shown on the right, is where there is an uncovered surface. in the case of a covered surface, the interpolation uses only frame 1, whilst in the case of an uncovered surface, the interpolation uses only frame 2.

Provision can be made in the interpolator 48 to default to non-motion compensated interpolation, in which case the temporally nearest progressive scan converted frame is used.

In the arrangement described above, particularly with reference to FIG. 2, a 60 field/s, 30 frame/s, 2:1 interlaced format signal is converted to 24 frame/s 1:1 progressive format by:
a) supplying the interlaced signal to the standards converter at one-eighth speed with each input field repeated eight times;
b) developing, for each input field, a progressive format frame in the progressive scan converter 42;
c) for each ten repeated input frames, developing an output frame by appropriate interpolation in the interpolator 48 between the two currently developed progressive formal frames in dependence upon the supplied motion vector, with the developed output frame being repeated ten times; and
d) recording one in every ten output frames.

It will therefore be appreciated that the standards converter operates at one-eighth of real-time, and that, for every five input interlaced frames, four output frames will be produced, thus giving the 30 frame/s to 24 frame/s conversion.

In some applications, for example where further processing is to be carried out on the 24 frame/s 1:1 format signal, or where it is desired to record the 24 frame/s format signal on standard HDVS recording equipment and replay it, it is beneficial to use a modified 24 frame/s format employing a "3232 pulldown" sequence. For further description of the 3232 pulldown sequence, reference is directed to patent application GB 9018805.3, the content of which is incorporated herein by reference.

Figure 49:
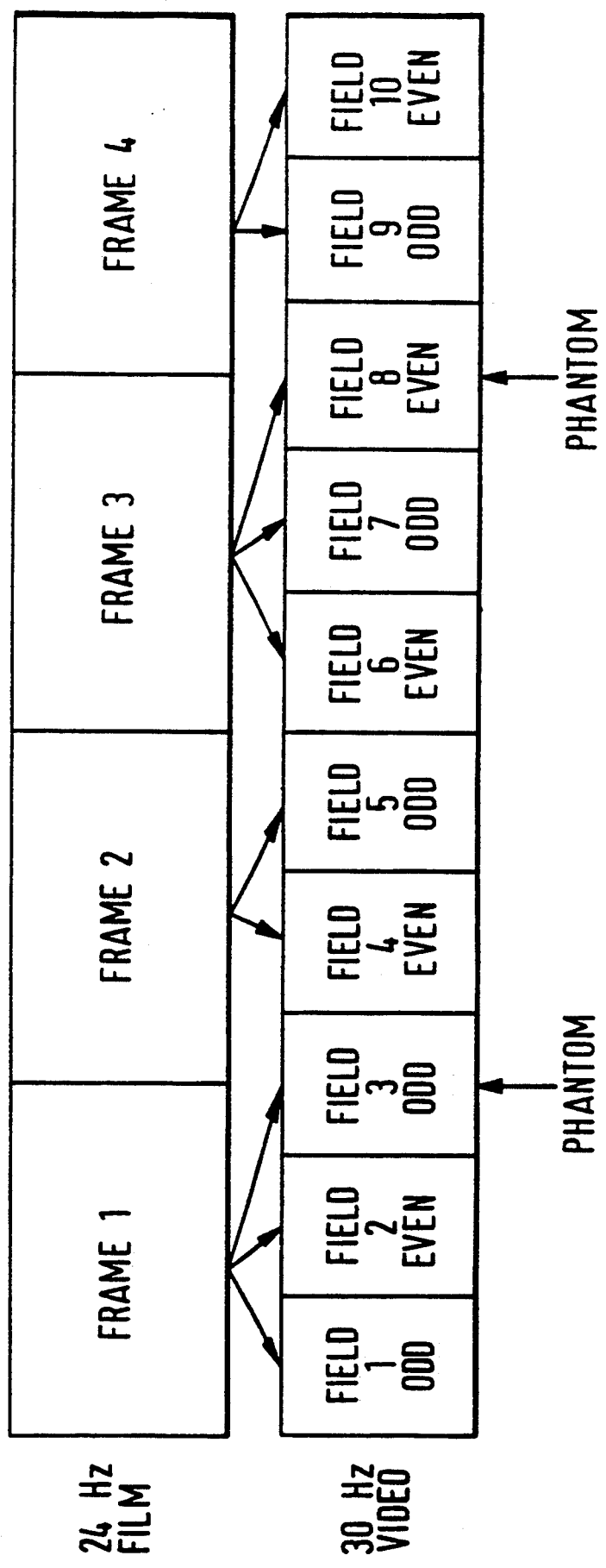
FIG. 49 is a diagram illustrating the correlation between frames of a 24 Hz 1:1 format signal and a 60 field/s 3232 pulldown format signal.

The correlation between a series of four frames of a 24 frame/s 1:1 format signal and a 30 frame/s, 60 field/s, 3232 pulldown format signal is shown in FIG. 49. The first frame 1 is used to produce the first three fields, with odd field 3 being a phantom field. Frame 2 proctuces the next two fields 4 and 5. Frame 3 produces the next three field 6 to 8, with even field 8 being a phantom field, and the last frame 4 in the sequence produces the last two field is 9 and 10.

It is desirable to modify the system described with reference to FIGS. 1 to 48 so that it can convert a 60 field/s, 30 frame/s 2:1 interlaced video signal to a 60 field/s 3232 pulldown sequence with motion compensation, and this can be achieved in a remarkably simple way by operating the frame recorder 13 and VTR 14 of FIG. 2 at one-eighth speed, rather than one-tenth speed (while still maintaining the ten-frame repeat of the output from the standards converter 12) with the period between recorded fields being 9, 7, 9, 7 ... field periods.

Figure 50:
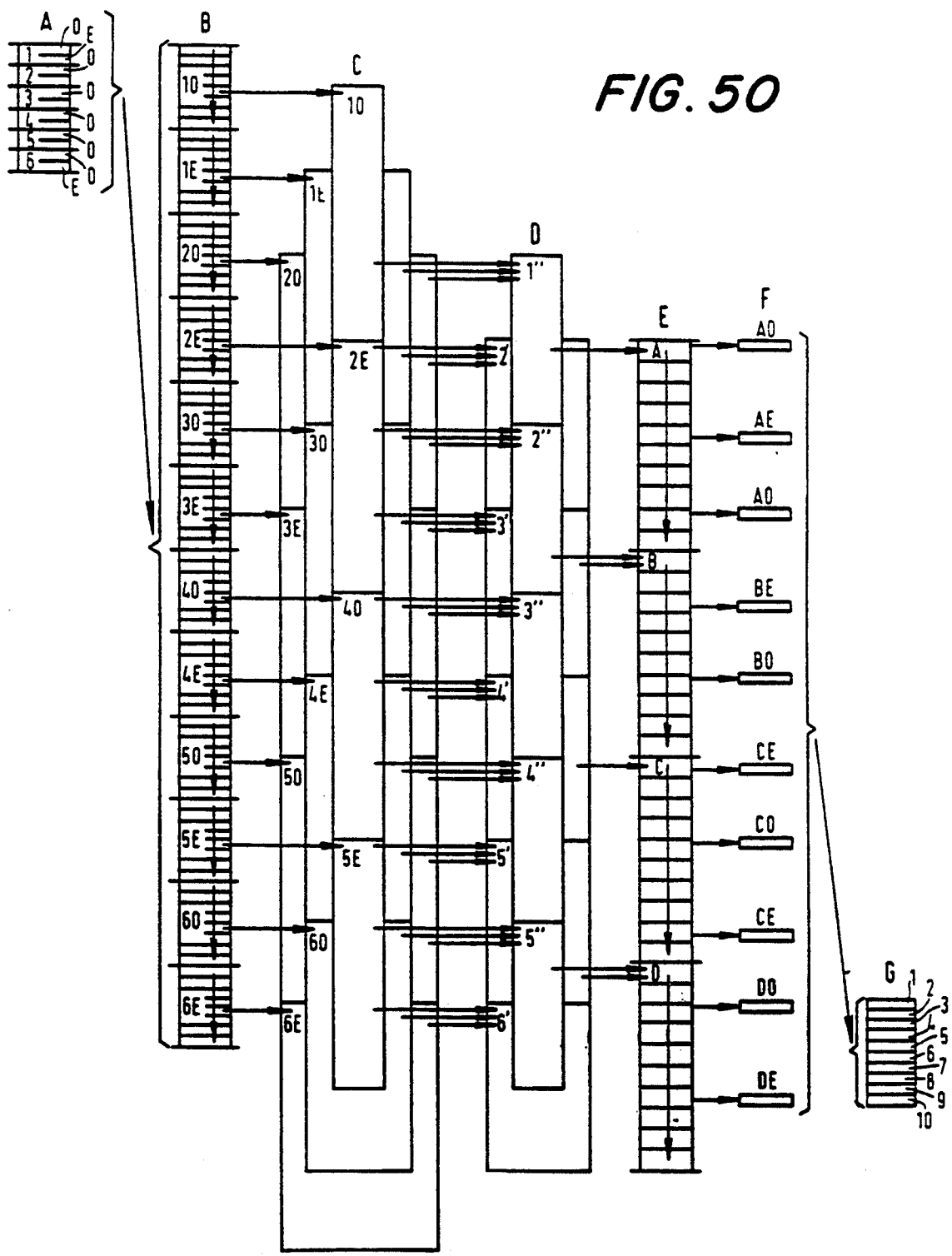
FIG. 50 is a diagram illustrating signal conversion from 60 field/s 2:1 interlace format to 60 field/s 3232 pulldown format.

This scheme is illustrated in FIG. 50 for five input frames.

As shown in columns A and B of FIG. 50, the two fields O/E of each of six input frames 1 to 6 are repeated eight times. Certain of these input fields then used by the progressive scan converter 42 to produce respective progressive scan frames as shown in column D, the progressive scan frames being stored alternately in a pair of frame stores. Certain of the stored progressive scan frames are then used alone or in pairs by the interpolator 48 to produce four fields, each of which is output by the interpolator 48 ten times as shown in column E. A field is then recorded by the frame recorder 13 from every fourth frame of column E, the recorded fields being alternately odd and even with the period between recorded fields being alternately 9/60s and 7/60s, as shown in column F, and these fields are then recorded on the VTR 14. Thus, when the recording is played back at normal speed, the sequence shown in the column G of FIG. 50 is produced, with the ten recorded fields in 3232 pulldown format 1 odd, 1 even, 2 odd, 2 even ... 5 even being derived from frame A, repeats 1, 5 and 9; frame 3, repeats 3 and 7; frame C, repeats 1, 5 and 9; and frame D, repeats 3 and 7 of the 24 Hz 1:1 format sequence.

Figure 51:
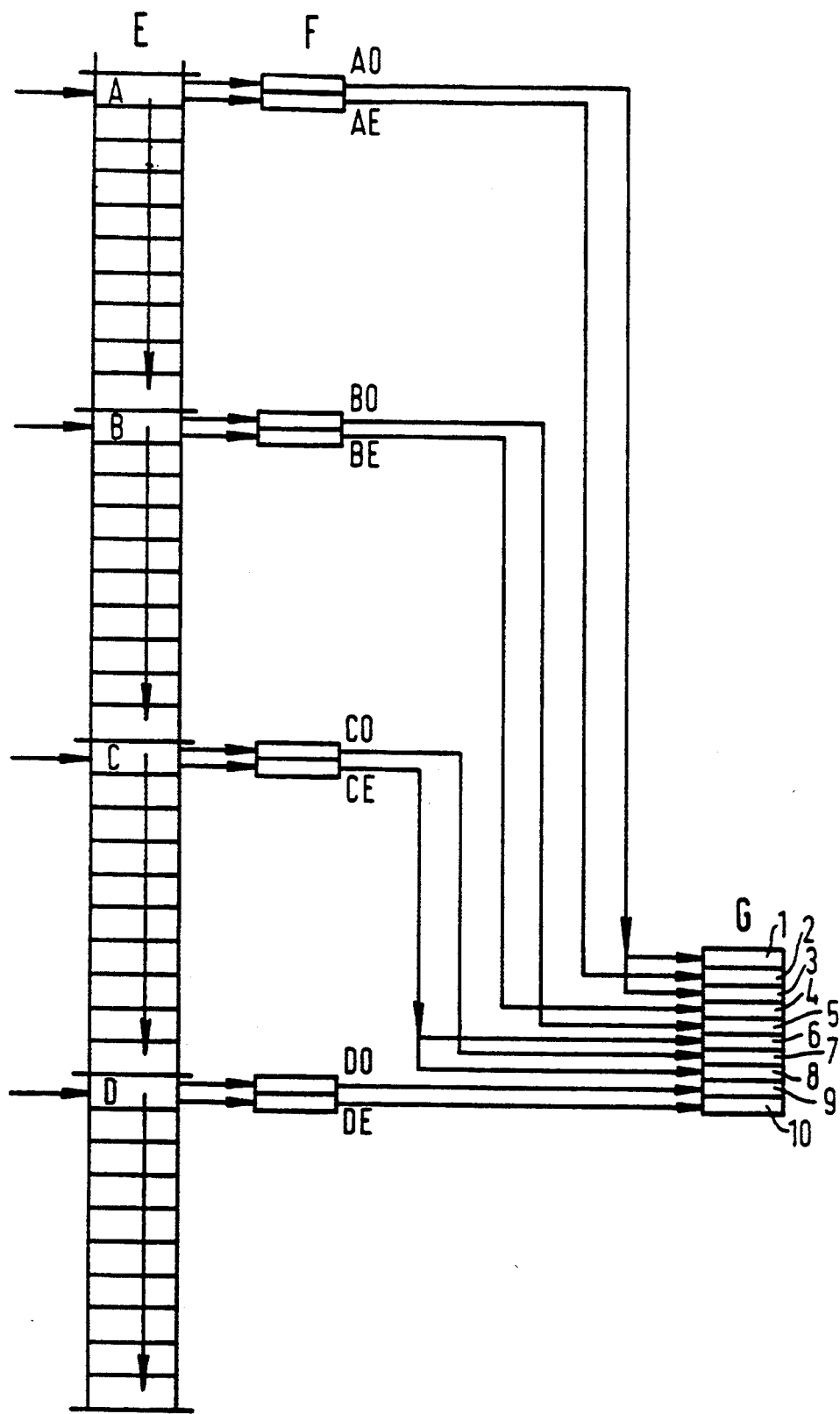
FIG. 51 shows a modification to part of FIG. 50.

As an alternative to the increased recording speed (one-eighth, rather than one-tenth) modification for producing the 3232 pull down sequence, the progressive scan frames may be written into the frame recorder 13 at one-tenth speed and then read out in 3232 sequence for supply to the VTR 14. This modification is illustrated in FIG. 51. Column E corresponds to column E described above with reference FIG. 50. One repeat of each progressive scan frame is written to the recorder 13, as shown in column F. Odd and even fields of these frames are then read out from the recorder 13 and recorded by the VTR 14 in the following sequence 1 odd, 1 even, 1 odd, 2 even, 2 odd, 3 even, 3 odd, 3 even, 4 odd, 4 even, as shown in column G, to produce fields odd, 2 even, 3 odd, 4 even ... 9 odd, 10 even of the 3232 pulldown sequence, where 3 and 8 are the phantom fielets. This modification has an advantage over that described with reference to FIG. 50 in that less storage space is used in the recorder 13, and also conversions will require fewer stops and starts of the VTR 14.

It is desirable also to he able to use the system described above to convert 30 Hz 1:1 format fiim material into 60 field/s 2:1 interlaced HDVS format using motion compensated interpolation. This could be achieved, as shown in FIG. 52, by producing the odd fields of converted signal directly from the input frames, anct by producing the even fields of the converted signal by motion compensated interpolation between successive fields with equal temporal offsets. However, it is considered that such a scheme would cause uneven spatial response of the field pairs and noise level modulation in the case of noisy source material because the directly produced output fields would contain the source noise, but the interpolated output fields would have reduced noise due to the interpolator action. In order to avoid these problems, a temporal interpolation scheme, as shown in FIG. 53A, is adopted, in which the odd fields are temporally interpolated one-quarter of the way between a preceding and a succeeding frame of the source material and the even fields are temporally interpolated three-quarters of the way between those two frames.

Thus, referring to FIG. 53B, if a pixel in an odd output field AO between input frames 1,2 has a position (x,y) and a motion vector (m,n), the value of that pixel is obtained by averaging the value of the pixel (or patch) in input: frame 1 at location $(x-(m/4), y-(n/4))$ with the value of the pixel (or patch) in input frame 2 at location $(x+(3m/4), y+(3n/4))$. On the other hand, for the corresponding even output field At, the output pixel value is obtained by averaging the value of the pixel (or patch) in input frame 1 at $(x-(3m/4), y-(3n/4))$ with the value of the pixel (or patch) in input frame 2 at $(x-(m/4), y+(n/4))$, as shown in FIG. 53C.

In order to achieve this, the arrangement described with reference to FIGS. 1 to 48 is modified or used in the manner which will now be described with reference to FIG. 54.

Figure 54:
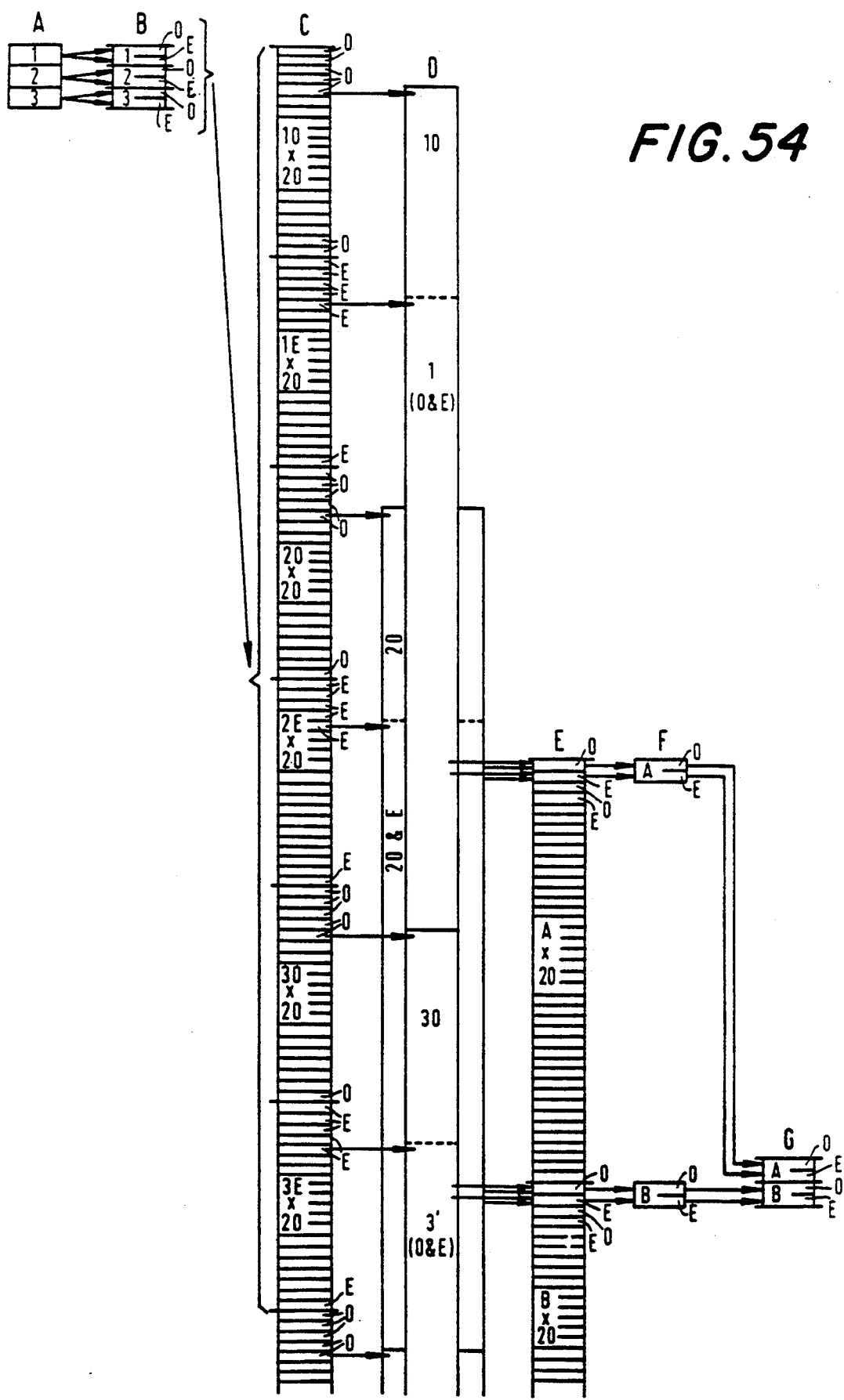
FIG. 54 is a diagram illustrating signal conversion from 30 Hz 1:1 format to 60 field/s 2:1 interlace format.

The frames of the 30 Hz 1:1 format film, three of which are shown in column A in FIG. 54, are captured by an HD film scanner and converted to video format on tape, as shown in column B. Altbough odd "0" and even "E" fields are shown for each frame 1, 2, 3 in column B, it should be remembered that the image data in the two fields of each frame are not temporally offset in tire source image. The tape is then played back at one-twentieth speed by the VTR 11 (FIG. 2) with the two fields of each frame repeated twenty times, as shown by column C. Because the two fields of each frame are derived from a progressive format source, there is no temporal offset between them, and therefore the progressive scan converter 42 (FIG. 4) is bypassed or operated in a previous field replacement mode, in order to reconstruct the original frames, so that two consecutive frames are available at a time, as shown in column D. The frames which are input to the direct block marcher 43 and interpolator 48 are thus a direct combination of the respective two fields. In order to produce a pixel in an odd output field, the interpolator temporally interpolates in the ratio $\frac{3}{4}:\frac{1}{4}$ between the previous frame (e.g. 1) and tire current frame (e.g. 2). However, for pixels in an even field, the interpolation is in the ratio $\frac{1}{4}:\frac{3}{4}$ between the previous frame 1 and the current frame 2, and the interpolated frames are each repeated twenty times as shown in column E. Every twentieth frame is written to the frame recorder 13 (FIG. 2) as represented in column F of FIG. 54 and is then recorded by the VTR 14, so that when the recording is played back a 60 field/s 2:1 format signal is produced at normal speed, as represented by column G in FIG. 54.

Figure 55A:
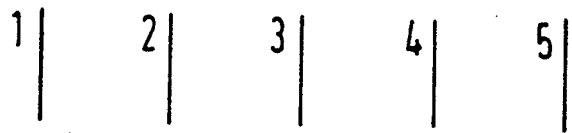
FIGS. 55A and 55B are diagrams illustrating a correlation between frames of a 24 Hz 1:1 format signal and fields of a 60 field/s 2:1 interlace format signal.

It is also desirable to be able to use the system described above to convert 24 Hz 1:1 format film material to 60 field/s 2:1 interlaced HDVS format. In order to do this, firstly the 24 Hz 1:1 format frames are captured by an HD film scanner and converted to video format on tape. The temporal interpolation scheme which is then used is shown in FIG. 55A, It will be noted that the interpolation sequence repeats after every 4 frames (1 to 4) of the 24 Hz 1:1 format signal and after every 5 frames, or 10 fields (A/odd to E/even), of the 60 field/s 2:1 interlaced HDVS signal.

If a pixel in all output field has a moLion vector (m,n), then the offsets between the location of that pixel in the output field and the locations in the respective two input frames of the pixels (or patches) used to derive the value of the output pixel are as follows for each of the ten output frames in the series:

| Output Frame/Field | First Input Frame and Offset | Second Input Frame and Offset |
| --- | --- | --- |
| A/odd | 1 (0, 0) | |
| A/even | 1 (−0.4m, −0.4n) | 2 (0.6m, ).6n) |
| B/odd | 1 (−0.8m, −0.8n) | 2 (0.2m, 0.2n) |
| B/even | 2 (−0.2m, −0.2n) | 3 (0.8m, 0.8n) |
| C/odd | 2 (−0.6m, −0.6n) | 3 (0.4m, 0.4n) |
| C/even | 3 (0, 0) | |
| D/odd | 3 (−0.4m, −0.4n) | 4 (0.6m, 0.6n) |
| D/even | 3 (−0.8m, −0.8n) | 4 (0.2m, 0.2n) |
| E/even | 4 (−0.2m, −0.2n) | 5 (0.8m, 0.8n) |
| E/even | 4 (−0.6m, −0.6n) | 5 (0.4m, 0.4n) |

Figure 56:
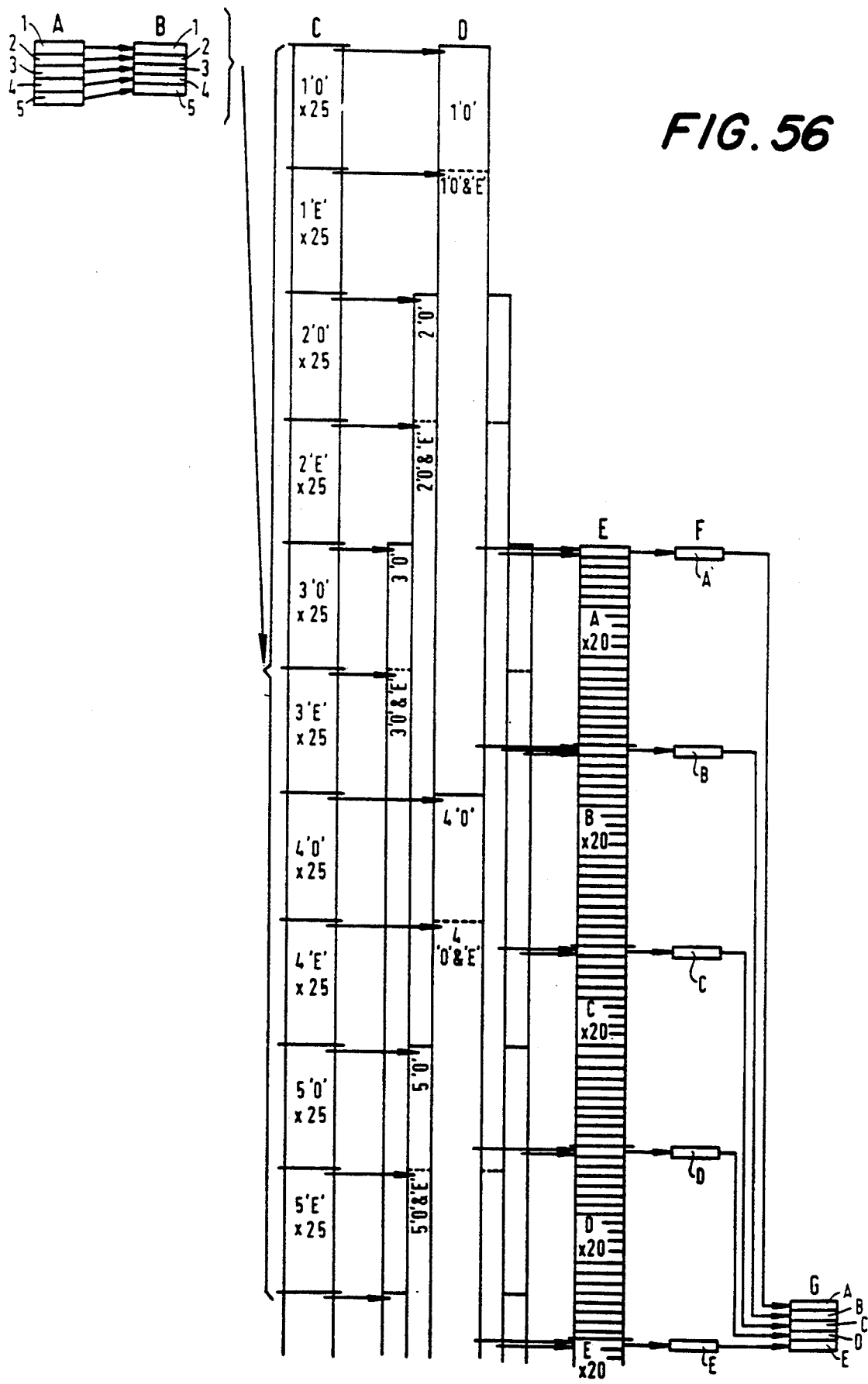
FIG. 56 is a diagram illustrating signal conversion from 24 Hz 1:1 format to 60 field/s 2:1 interlace format.

In order to achieve such an interpolation sequence, the system described above with reference to FIGS. 53 and 54 is modified as follows, referring to FIG. 56. In FIG. 56, for clarity, the separate fields of frames are not shown. The 24 Hz 1:1 format frames (five of which are shown in column A of FIG. 56), after capturing by the HD scanner (column B) are reproduced at one-twentyfifth speed by the VTR 11 (FIG. 2) with the two fields of each frame being repeated twenty-five times, as shown in colunn C. As described with reference to FIG. 54, the progressive scan converter 42 is operated in a previous field replacement mode to reconstruct the original frames, and so that three frames are available at a time, as shown in column D. The interpolator 48 then performs the necessary interpolation to produce the frames A to E, as shown in column E. It will be noted from the table above, that input frames 1 and 2 are required to produce the two fields of output frame A; input frames 1, 2 and 3 are required for the fields of output frame B; input frames 2 and 3 are required for the fields of output frame C; input frames 3 and 4 are required for the fields of output frame D; and input frames 4 and 5 are required for the fields of output frame E. The frames thus formed by the interpolator are repeated twenty times, as shown in column E. One in every twenty interpolated frames is written to the frame recorder 13, as represented by column F, and recorded in tape by the VTR 14 so that when the tape is played back at normal speed, a 60 field/s 2:1 interlaced HDVS is produced at normal speed, as represented by column G.

The system should also desirably be able to handle 24 Hz 1:1 material provided in 3232 pulldown format. in order to do this, the arrangement of FIG. 56 is utilised except that the input tape from the VTR 11 is run at one-twentieth speed, rather than 1/25 speed, and the input frames/fields are repeated twenty times, rather than twenty-five times before the next field is input. The frames of column D are still produced one for every 50 repeated input fields, and therefore the phantom fields of the 3232 pulldown format can be ignored. Accordingly, the system operates somewhat similarly to that described with reference to FIG. 54 relating to conversion of 30 Hz 1:1 format film material to a 60 field/s 2:1 interlace format HDVS.

Figure 55B:
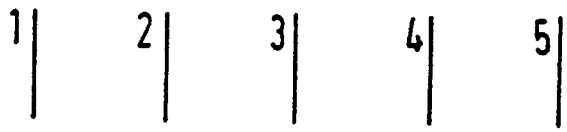

A modification may be made to the arrangement described with reference to FIGS. 55A and 56 so that it can convert to 30 Hz 1:1 format, rather than 60 field/s 2:1 interface format. With this modification, the output frames are derived from the input frames as shown in FIG. 55B. In order to achieve this modification, the only change necessary to make the scheme: of FIG. 56 is to modify the action of the interpolator so that, for a pixel in an output frame having a motion vector (m,n), the offsets between the location of that pixel in the output frame and the locations in the respective two input frames of the pixels (or patches) used to tierre the value of the output pixel are as follows for each of the five output frames in the series:

| Output Frame | First Input Frame and Offset | Second Input Frame and Offset |
| --- | --- | --- |
| A | 1 (0, 0) | |
| B | 1 (−0.8m, −0.8n) | 2 (0.2m, 0.2n) |
| C | 2 (−0.6m, −0.6n) | 3 (0.4m, 0.4n) |
| D | 3 (−0.4m, −0.4n) | 4 (0.6m, 0.6n) |
| E | 4 (−0.2m, −0.2n) | 5 (0.8m, 0.8n) |

It, is also desirable that the system described above should be able to convert a 60 field/s 2:1 interlace HDVS format signal to a 30 Hz 1:1 progressive formal for use by the EBR 35 (FIG. 3) in producing 30 Hz film from the video signal. Such a 30 Hz signal could be produced by compositing each frame from two adjacent fields in the HDVS, but this would have the effect of producing double-imaging in the 30 Hz signal, due to the temporal offset between the two fields making up each frame.

The progressive scan arrangement described above with reference to FIGS. 4 to 14 can be employed to good effect, to blend different proportions of interframe and intrafield interpolated images depending on the amount of motion locally in the image, and thus provide a motion adapted 30 Hz signal. However, when the source image is noisy or there is an incorrect assessment. by the motion adaptive process, the output image will tend to be intrafield interpolated more than is necessary, and thus will lose vertcal detail and have more alias components present. In these circumstances, it is possible that the output image quality will be improved by additionally using the motion compensation technique described above with reference to FIGS. 15 to 48. This will allow two adjacent 30 Hz 1:1 frames to be combined via temporal interpolation and provide cancellation of vertical alias components in static or horizontally moving parts of the image.

Figure 57:
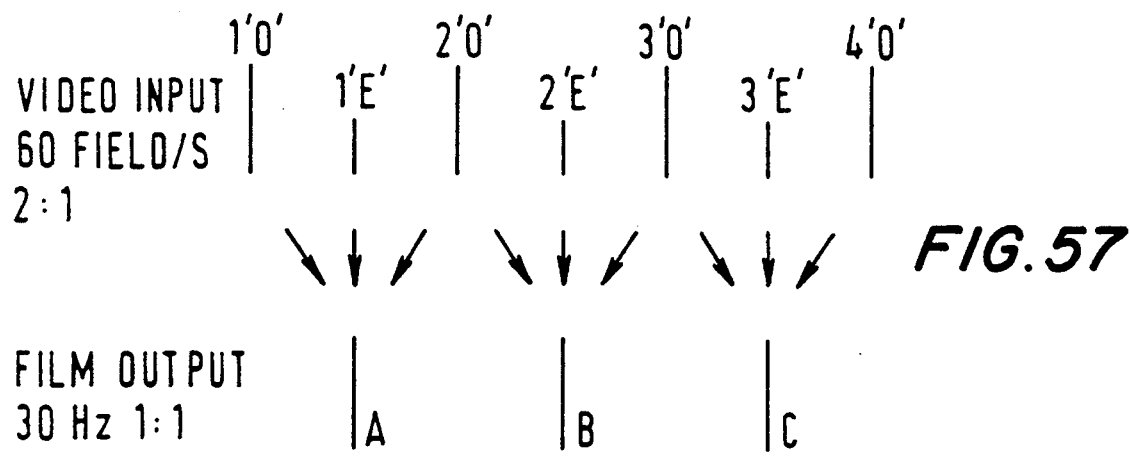
FIG. 57 is a diagram illustrating the source fields of a 60 field/s 2:1 interlace format signal used to produce each frame of a 30 Hz 1:1 format signal with motion adaptive progressive scan conversion only.

The technique using the motion adaptive technique only, is shown in FIGS. 57 and 58. Referring firstly to FIG. 57, and as described above, each frame A, B, C in the output format is produced by different proportions of three fields (e.g. 1′0′, 1′E′, 2′0′; 2′0′, 2′E′, 3′0′; 3′0′, 3′E′, 4′0′) in the input format. Referring now to FIG. 58, the 60 field/s 2:1 HDVS format signal (column A) is reproduced at one-eighth normal speed by the VTR 11 (FIG. 2), and each frame/field is repeated eight times, as shown in column B. The progressive scan converter 42 (FIG. 4) loads fields into its frame stores so that three consecutive fields are available at a the, as shown in column C. The progressive format frames are formed from the triplets of input fields, as shown in column D, and these progressive format frames are each repeated eight thes. Every eighth frame (column E) is recorded by the frame recorder 13 and then by the VTR 14 (FIG. 2) and thus the recorded signal, when reproctuced at normal speed is in 30 Hz 1:1 format (column F). In this motion adaptive mode, the progressive scan converter 42 (FIG. 4) is employed, but the motion compensation components 43 to 48 are not. Therefore, the interpolator 48 is set to provide no temporal offset between its input and output frames.

Figure 59:
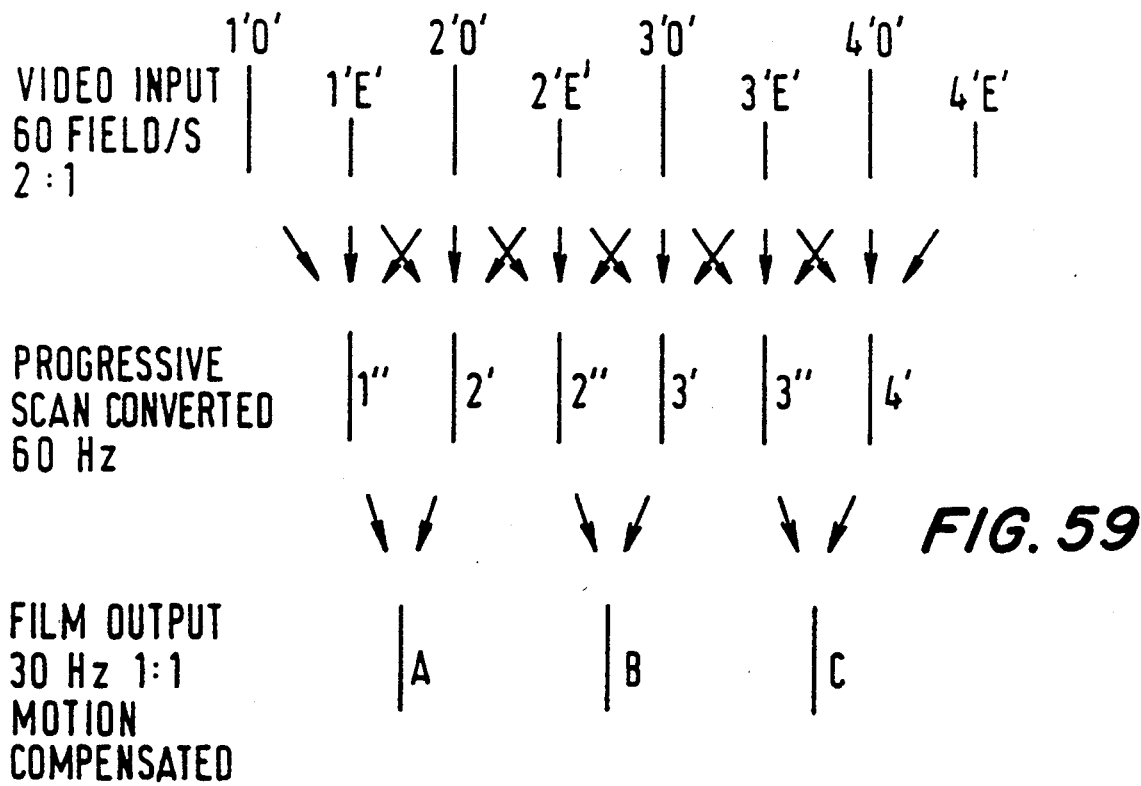
FIG. 59 shows a modification to FIG. 57 with motion compensation interpolation also.
Figure 60:
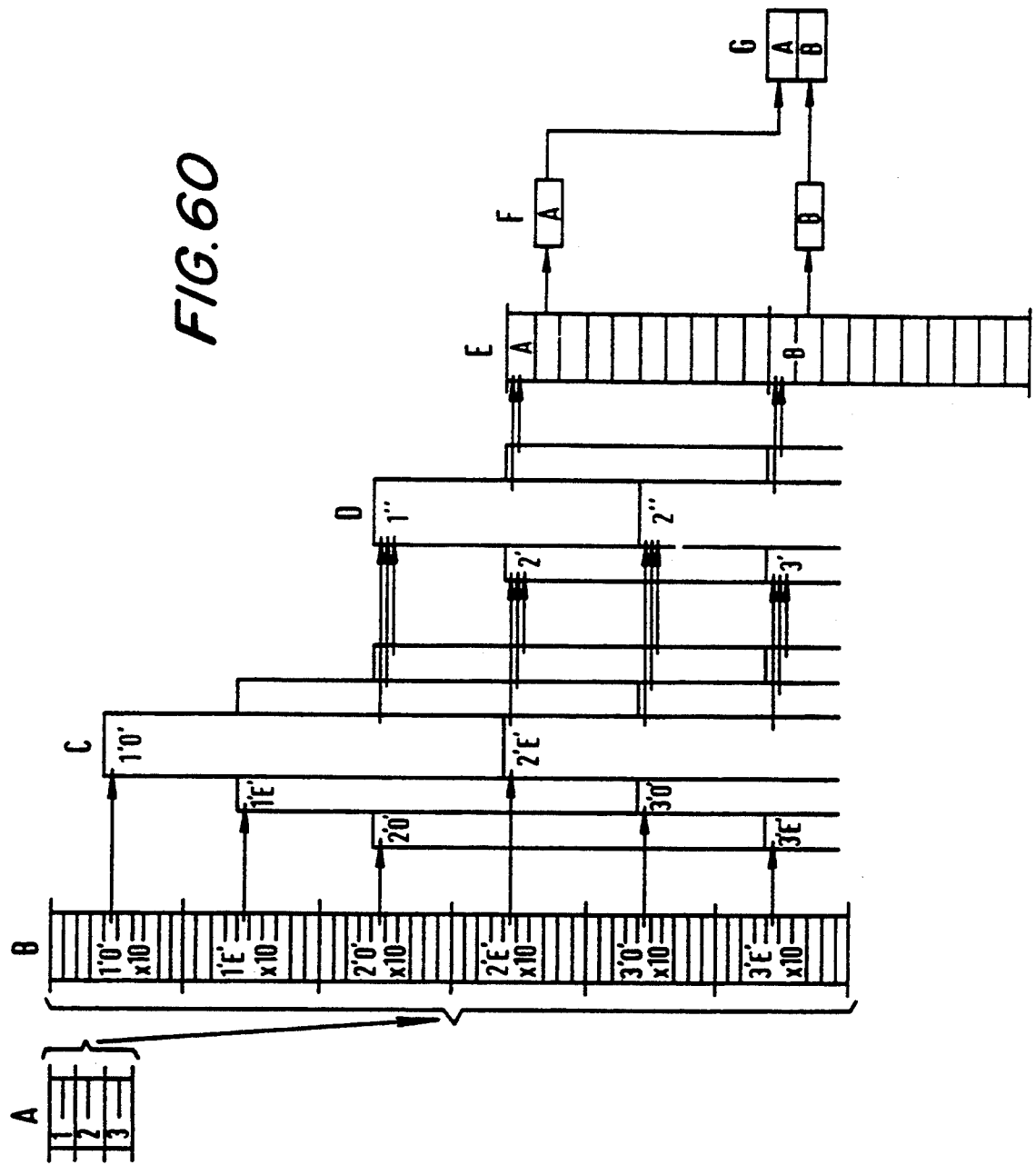
FIG. 60 is a diagram illustrating the signal conversion of FIG. 59.
Figure 62A:
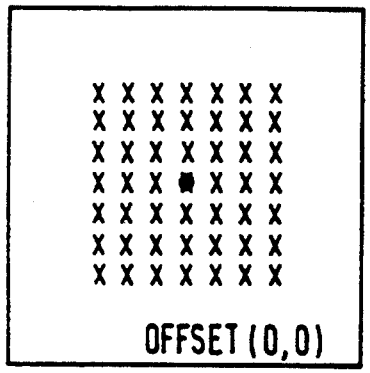
FIGS. 62A to 62D show the different four possible offsets between the location of a required pixel in a input frame shown in FIGS. 61A-1 to 61C-3 and the actual pixel positions in the input frame.
Figure 62B:
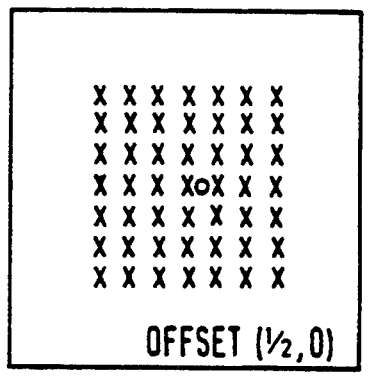
Figure 62C:
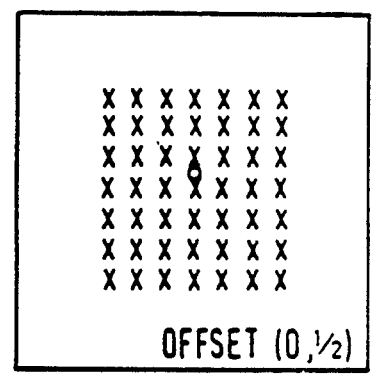
Figure 62D:
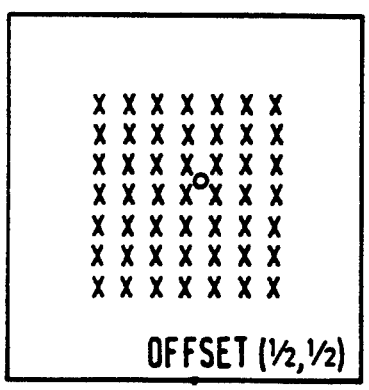

When motion compensation is selected, the operation is as shown in FIGS. 59 and 60. The upper part of FIG. 59 is similar to FIG. 57, except that twice as many progressive format frames are produced. The frames so formed then undergo the motion compensation operation to form the output frames which are temporally offset by half a frame period from franms before motion compensation.

Referring in particular to FIG. 60, the 60 field/s 2:1 HDVS formal signal (column A) is reproduced at one-tenth normal speed hy the VTR 11 (FIG. 2), and each frame/field is repeated ten times, as shown in column B. As before, the progressive scan converter 42 loads fields into its frames stores so that three consecutive input fields are available at a time, as shown in column C. The progressive scan frames 1", 2', 2", 3' ... are then formed from the triplets of input fiel. ds, and are loaded into frame stores so that the interpolator 48 has available two consecutive progressive format frames at a time, as shown in column D. Temporally adjacent pairs of these progressive format frames are then used by the interpolator 48 to produce a frame which is interpolated with equal temporal offset between the two input frames. The frames produced by the interpolator 48 are repeated ten times as shown in column E, and every tenth frame (column F) is recorded by the frame recorder 13 and VTR 14 (FIG. 2), so that the thus recorded signal, when reproduced at normal speed, is in 30 Hz 1:1 format (column G).

In the arrangement described above with reference to FIGS. 1 to 48 for converting 60 field/s 2:1 interlace HDVS to 24 Hz 1:1 film formal, the ouLput frames are either temporally aligned with respective input frames or temporally offset by one half of an input field period (1/120s). In the case of temporal alignment, the output frame is based upon the respective progressive format frame output from the progressive scan converter 42 (FIG. 4), whereas in the case of a temporal offset, each pixel in the output frame is $\frac{1}{2}:\frac{1}{2}$ interpolated between pixels or pixel patches in prececiing and succeeding progressive format frames output from the progressive scan converter, with spatial offset between the pixels or patches in the source frames and the pixel in the output frame being dependent upon the motion vector supp-llied by the processor 47 (FIG. 4).

FIG. 61A shows the case where there is no temporal offset and a pixel at location (x,y) in the outpul frame has a motion vector (m,n). This pixel is derived from the pixel at location (x,y) or a patch centred on (x,y) in input frame 1 to the interpolator, and the motion vecLor and the content of input frame 2 are not employed.

FIG. 61B shows the case where there is a half field period temporal offset and a motion vector of (m,n)=(2,2) for an output pixel at location (x,y). The value of this pixel is derived by equal interpolation between the pixel at (or patch centred on) location (x,y) $-\frac{1}{2}(m,n)=(x-1,y-1)$ in input frame 1 and the pixel/-patch at location $(x,y)+\frac{1}{2}(m,n)=(x+1,y+1)$ in input frame 2.

It will be appreciated that the components of the motion vector (m,n) are integers and need not be even integers. FIG. 61C shows the case of a motion vector (2,1). The required pixels or patches in the input frames 1 and 2 are at locations $(x-q,y-\frac{1}{2}$ and $(x+1,y+2)$, respectively, which are half-way between actual pixel positions in the input frames.

In order to acqui re the required pixel values from the input frames, an 8×8 patch (as described above with reference to FIG. 48) or a 7×7 patch as shown in FIGS. 62A to D is used around the required pixel location, and there is an offset of (0,0) (FIG. 62A), $(\frac{1}{2},0)$ (FIG. 62B), $(0,\frac{1}{2})$ (FIG. 62C), or $(\frac{1}{2},\frac{1}{2})$ (FIG. 62D) between the centre pixel of the patch and the pixel location (marked "o" in FIGS. 62A to D) determined by the interpolator. To determine the value of the pixel "o", spatial interpolation coefficients are applied to the 49 pixels in the patch, the sets of coefficients being slightly different for the four cases shown in FIGS. 62A to D, although the coefficients for the cases of offset $(\frac{1}{2},0)$ and $(0,\frac{1}{2})$ may be symmetrical about the x=y diagonal of the patch.

A problem which can arise with the arrangement described above is that the magnitude responses for the four different spatial interpolation cases of FIGS. 62A to D can be different and produce modulation of the picture detail as the different responses are cycled. In order to avoid this problem, the arrangement now described with reference to FIGS. 63 and 64 may be employed. The locations of the required pixels/patches in frames 1 and 2 are derived in a similar manner to that described with reference to FIG. 61 except that an addition offsel. of $(-\frac{1}{4},-\frac{1}{4})$ is included. Thus, as shown in FIG. 63A, for example, for a temporally aligned output frame, a pixel at locations (x,y) in the output frame is based on an interpolated value of a pixel at location $(x-\frac{1}{4},y-\frac{1}{4})$ in input frame 1, rather than location (x,y). When taking into account temporally aligned and temporally offset output frames, and even and odd motion vectors, a required pixel location in an input frame can always be considered to have an offsel of $(-\frac{1}{4},-\frac{1}{4})$, $(\frac{1}{4},-\frac{1}{4})$, $(-\frac{1}{4},\frac{1}{4})$ or $(\frac{1}{4},\frac{1}{4})$ from the centre pixel of a 7×7 patch from which the value of the required pixel can be calculated by spatial interpolation, as shown in FIGS. 64A to 64D. It should be noted that these offsets are rotationally symmetrical about the centre pixel of the patch, and accordingly the four sets of spatial interpolation coefficients for the cases shown in FIGS. 64A to D can also be chosen to be rotationally symmetrical, thus avoiding different magnitude responses and picture detail modulation. It will be appreciated that the above arrangement produces global offset in the output frame of $(-\frac{1}{4},-\frac{1}{4})$ pixels, but this is negligible.

From the above it will be appreciated that, with conversion from 60 field/s 2:1 interlace HDVS to 24 Hz 1:1 film format, every other output frame from the interpolator 48 is produced from one of the progressive frames input to the interpolator, and the alternate output frames are produced by motion compensation between two progressive frames input. to the interpolator. This can result in (a) perspective changes not being satisfactorily merged, (b) alias effects when the adaptive progressive scan conversion fails due to noise, and (c) noise level modulation when the input image is noisy. As regards point (b), when adaptive progressive scan fails due to noise, the progressive scan frames are produced by intrafield interpolation. Of such a frame is directly output by the interpolator 48, stationary images would appear heavily aliased.

Figure 64A:
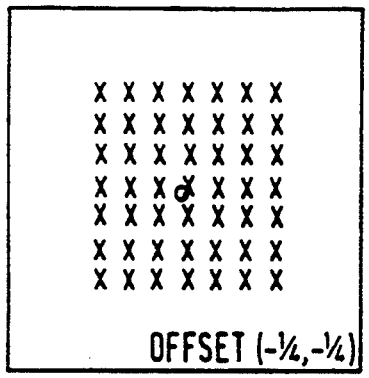
FIGS. 64A to 64D are similar to FIGS. 62A to 62D, respectively, but showing the offset of FIGS. 63A-1 to 63C-3.
Figure 64B:
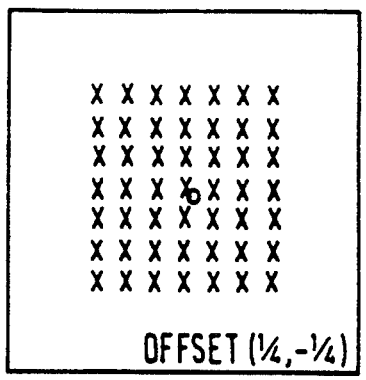
Figure 64C:
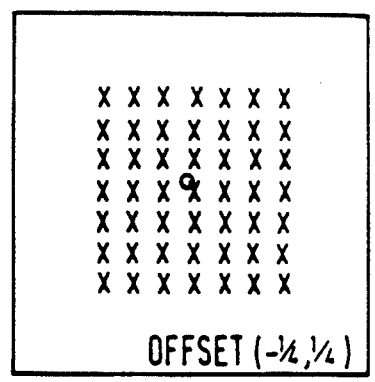
Figure 64D:
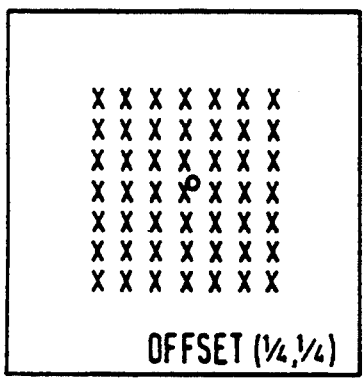
Figure 65A:
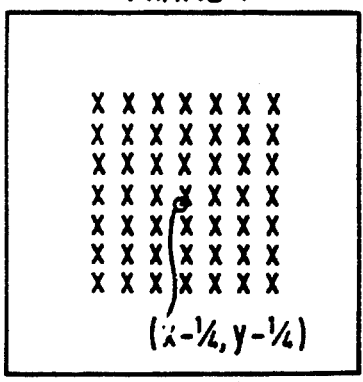
FIGS. 65A-65C are similar to a combinaLion of FIGS. 63A and 64A, but showing how a pixel in an output frame can be derived from pixels in both input frames, even when there is no temporal offset.
Figure 65B:
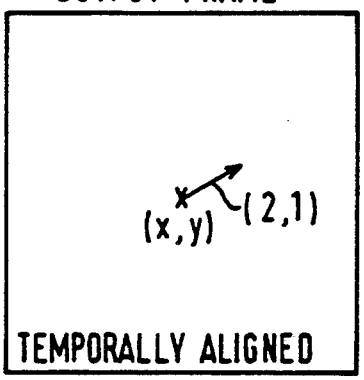
Figure 65C:
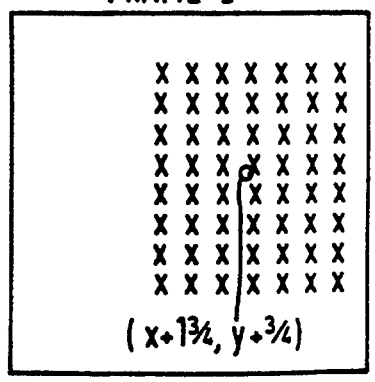

In order to reduce these problems, in the case of a temporally aligned output frame from the interpolator 48, the frame is produced by equal summing of the two respective input frames to the interpolator, but with the motion vector being used to determine the spatial offset between the respective pixel in the output frame and the pixel/patch to be used in frame 2, without there being army spatial offset dependent upon the motion vector belween the pixel in the output frame and the pixel/-patch to be used in frame 1. This scheme is illustrated in FIG. 65, in combination with the quarter pixel offset.

scheme described above with reference to FIGS. 63 and 64. In the example given, a pixel at location (x,y) in the output frame has a motion vector (2,1). Accordingly, the notional source pixel to be used from frame 1 has a location (x−¼, y−¼), and therefore the 7×7 patch centred on location (x,y) is used with the set of spatial interpolation coefficients for an offset of (−¼,−¼) (FIG. 64A). On the other hand, the notional source pixel to be used from frame 2 has a location (x+7/4, y+¾), and therefore the 7×7 patch to be used is centred on location (x+2, y+1) with the spatial interpolation coefficient set also for an offset (−¼,−¼).

By producing each pixel in the output frame by equal suntuning from two input frames, whether or not there is a temporal offset between the output frame and the input frames, alias is removed, because the frame 2 alias will always be in antiphase to the frame 1 alias as long as the interfield motion is an exact multiple of lines. As synthesised lines are mixed with non-synthesised lines in this scheme, an improved vertical response is also produced. A further advantage is that if there is noise in the input image, the noise will not be modulated, unlike the case where every other output frame is derived from only one of the input frames.

There now follows a description of a particular system using the apparatus described above which is used primarily for transfer from 24 Hz the film to 24 Hz film permitting HDVS post production. Due to the complexity of motion compensated interpolation processing, the equipment therefor tends to be large and expensive. In addition, there is always a risk that processing artifacts may be introduced into the video signal. For these reasons, it is desirable that only a single stage of motion compensated processing should be used between the source(s) and primary distibution path, if at all possible.

Figure 66:
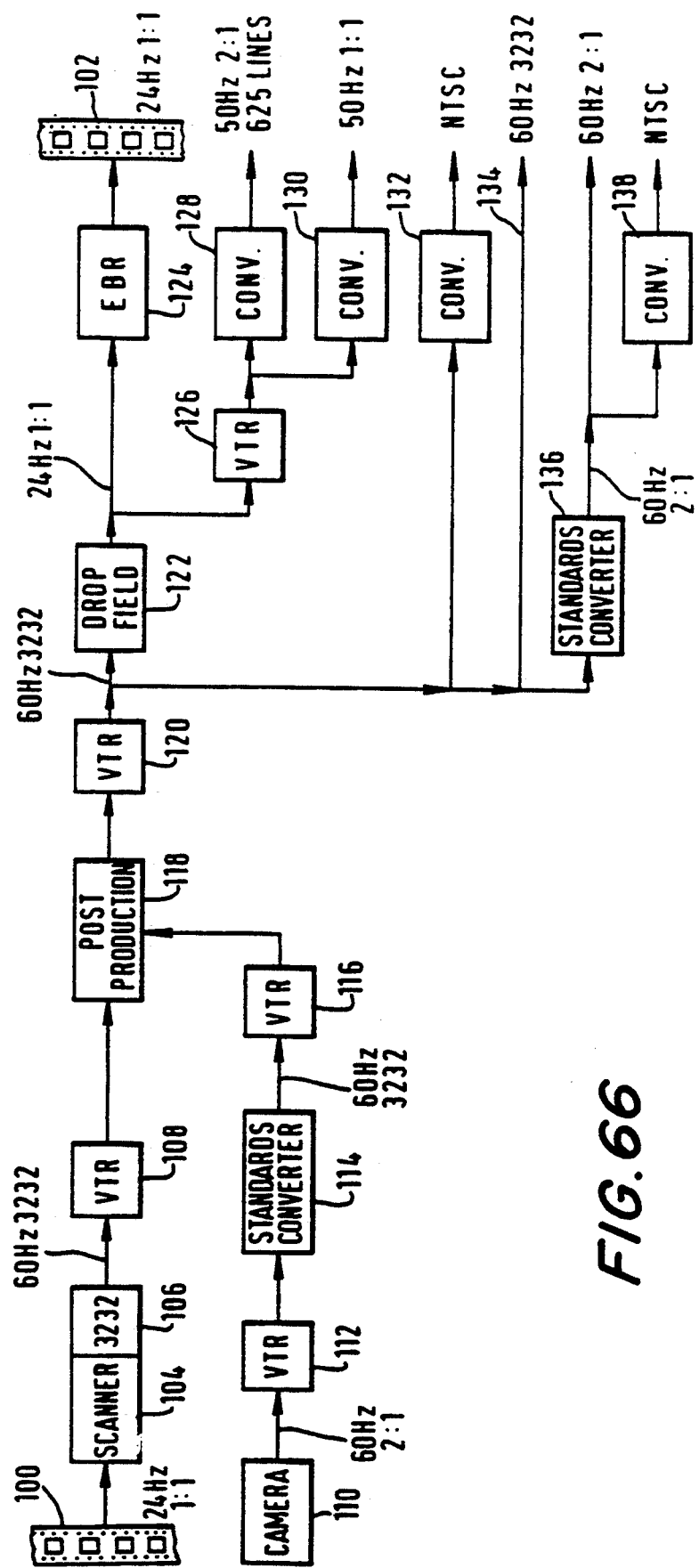
FIG. 66 illustrates an overall system primarily for transfer from 24 Hz 1:1 film to 24 Hz 1:1 film and allowing post production integration with 60 field/s 2:1 in-Lerlaced format material.

Referring to FIG. 66, the first source is 24 Hz film material 100, and the primary distribution medium is also 24 Hz film material 102. The source film 400 is read by a high definition film scanner 104, which incorporates a 3232 pulldown system 106 to provide a high definition 60 Hz 3232 format signal which is recorded by VTR 108.

The second source is a camera 140 which provides a 60 field/s 2:1 interlace HDVS signal to a VTR 112. The VTR 112 can reproduce the HDVS signal for input to a standards converter 414 which converts the 60 field/s 2:1 HDVS signal to a 60 Hz 3232 format signal which is recorded on VTR 116. The standards converter is therefore as described above with reference to FIGS. 49 to 51. Upon reproduction of the 60 field/s 3232 format signals by the VTRs 108, 116, these signals can be integrated in the HDVS post production system 118 to produce an output signal in 60 Hz 3232 format which is recorded by VTR 120. For further information concerning post-production with a 3232 pulldown format signal, reference is directed to patent application GB9018805.3, the content of which is incorporated herein by reference. Upon reproduction of the signal by the VTR 120, the primary path is via a drop field device 122 which converts the signal to 24 Hz 1:1 format, which is then used by the electron beam recorder (EBR) 124 to generate the film 102. Secondary distribution patIls are provided by a VTR 126 which can record the output signal from the drop field device 122, and the signal on reproduction is then fed to a 625 lines converter 128 which produces a 50 field/s 2:1 interlace 625 line signal and/or to a high definition 50 Hz 2:1/1:1 converter 130 which produces a 50 Hz 1:1 high definition video signal. It will be appreciated that there will be a 4% speed error in the signals output from the converters 128 and 130, due to the input frame frequency being 24 Hz, rather than 25 Hz.

Further secondary output patIls are provided from the VTR 120 via an HDVS to NTSC down converter 132, which produces an NTSC 59.94 Hz 2:1 signal. Furthermore, there is a direct output of the 60 Hz 3232 format signal on line 134. Also, a standards converter 136 is included for converting the 60 Hz 3232 format signal from the VTR 120 to a 60 field/s 2:1 interlace HDVS signal. It will therefore be appreciated that the standards converter 136 is as described above with reference to FIG. 56. The output of the standards converter 136 may also be fed to an HDVS to NTSC down converter 138 which produces an NTSC 59.94 Hz 2:1 signal which will be of more acceptable quality than the signal provided by the converter 132, due to proper removal of the phantom fields by the standards converter 136.

The above arrangement tlas the following features and advantages. Firstly, there is a single stage of motion compensated interpolation, in standards converter 114, between all acquisition media (film 100 and camera 110) and the primary distribution path on 24 Hz film. Secondly, the post production system 118 allows integration of 60 field/s 2:1 HDVS originated material from the camera 110 or other such source with material originated from 24 Hz film. Thirdly, there is provided a secondary distribution route as a 60 Hz 3232 format HDVS signal on line 134 which may well be acceptable for many applications. This obviates the requirement to post produce video and film release versions of material separately. Fourthly, thère is an additional or alternative secondary distribution route by way of the 60 field/s HDVS signal from the standards converter 136. Lastly, means are provided for converting the video signal to conventional definition NTSC (for use in U.S.A. and Japan) and for converting to both high definition and 625 lines signals at 25 field/s with 2:1 interlace.

There now follows a description of a particular system employing the apparatus described above which is used primarily for transfer from 24 Hz film to 60 field/s 2:1 interlaced HDVS permitting HDVS post production. Again, due to the complexity of motion compensated interpolation processing, the equipment therefor tends to be large and expensive. In addition, there is always a risk that processing artifacts may be introduced into the video signal. For these reasons it is important that only a single stage of motion compensated processing should be used between the source(s) and primary distribution path, if at all possible.

Figure 67:
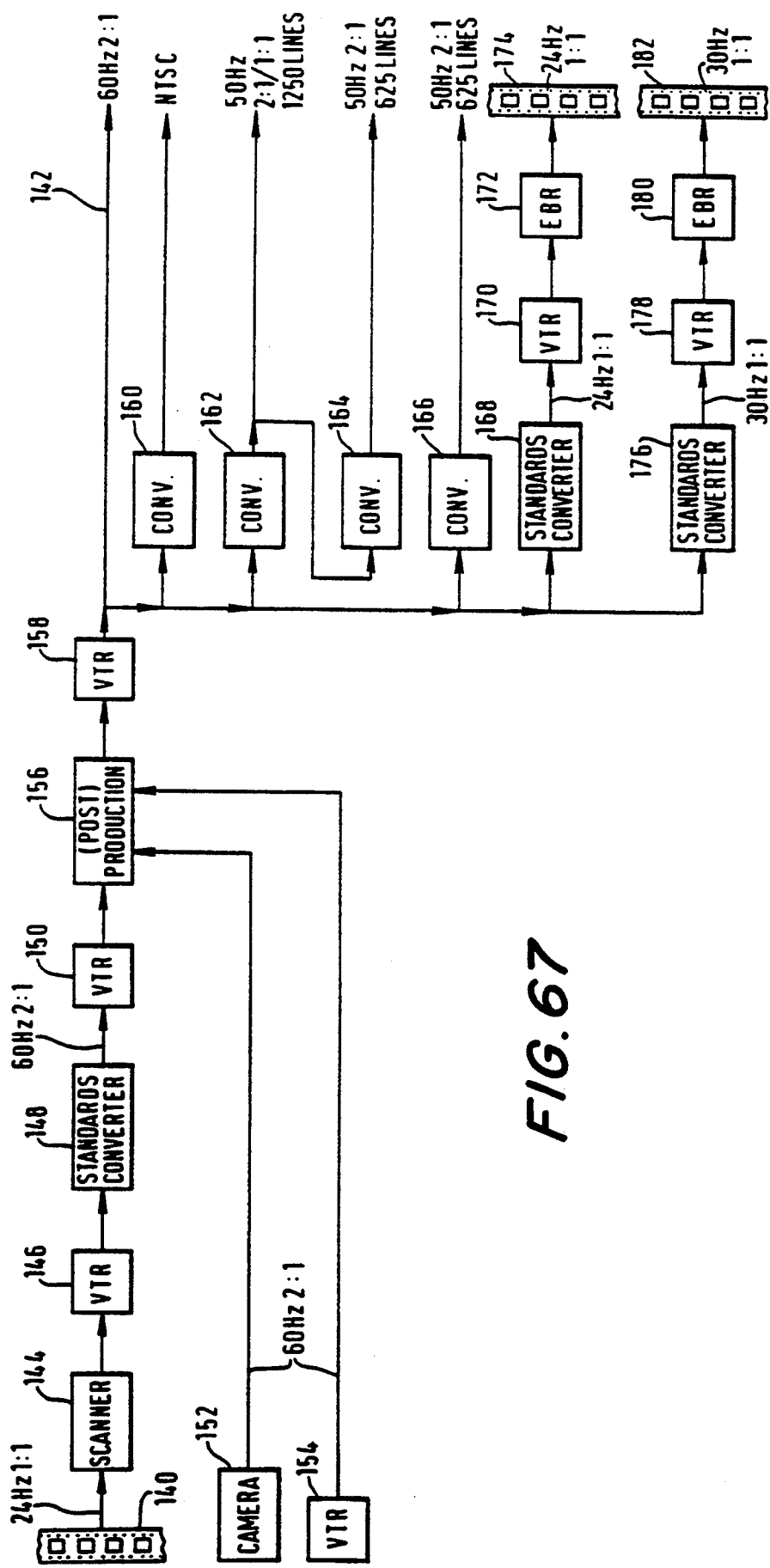
FIG. 67 illustrates an overall system primarily for transfer from 24 Hz 1:1 film to 60 field/s 2:1 interlace HDVS and allowing post production integration with 60 field/s 2:1 interlaced format material.

Referring to FIG. 67, the first source is 24 Hz film material 140, and the primary distribution is by way of a 60 field/s 2:1 HDVS signal on line 142. The source film 140 is read by a high definition film scanner 144, which provides a 24 Hz 1:1 signal to a VTR 146. The signal reproduced hy the VTR 146 is fed to a standards converter 148 which converts the 24 Hz 1:1 format signal to 60 field/s 2:1 interlaced format signal, which is recorded by a VTR 150. It will therefore be appreciated that the sLandards converter 148 is as described above with reference to FIG. 55.

Second and third sources are in the form of a camera 152 and a VTR 154, each of which produce 60 field/s 2:1 interlaced video signals. The signals from the VTR 150, camera 152 and VTR 154 can be integrated in the HDVS post production system 156 to produce a 60 field/s 2:1 interlace HDVS signal, which can be recorded by the VTR 158. The primary output path is directly from the VTR 158 on line 148, which carries the reproduced 60 field/s 2:1 interlaced HDVS.

Secondary distribution paths are provided from the VTR 158 via an HDVS to NTSC down converter 160 which outputs a sLandard NTSC signal and via an HDVS to 1250/50 high definition converter 162 which provides a 50 frame/s 1:1 video signal. A 625 lines 50 field per second 2:1 interlaced signal can either be provided by a 1250/50 to 625 lines converter 164 connected to the output of the converter 162, or by an HDVS to 625/50 down converter 166 receiving the 60 field/s 2:1 interlaced HDVS signal from the VTR 158.

A further secondary distribution path is provided by a standards converter 168 which converts the 60 field/s 2:1 interlaced HDVS signal from the VTR 158 to 24 Hz 1:1 format which is recorded by the VTR 170. The standards converter 168 is therefore as described above with reference to FIGS. 1 to 48. The reproduced signal from the VTR 170 supplies an EBR 172 to produce 24 Hz 1:1 film 174.

A further secondary disl. ribution path is via a standards converter 176 which receives the 60 field/s 2:1 interlaced HDVS from the VTR 158 and provides a 30 Hz 1:1 format signal to a VTR 178. The converter 176 is therefore as described above with reference to FIGS. 57 to 60. The VTR 178 reproduces the 30 Hz 1:1 signal to an EBR 180, which produces a 30 Hz 1:1 film 182.

The system described with reference to FIG. 67 has the following features and advantages. Firstly, there is a single stage of motion compensated interpolation, in the standards converter 148, between all of the acquisition media and the primary distribution path on line 142. Secondly, the system allows post production integration of 60 field/s 2:1 interlaced HDVS originated material with 24 Hz film material, and the camera 152 may be used live into the post production chain. A secondary distribution path is provided to output 30 Hz film, and in this case the standards converter 176 may be used without motion compensated interpolation processing, using only motion adaptive interpolation, as described above with reference to FIGS. 57 and 58. A means is provided of outputing 24 Hz film, but this does entail a second stage of motion compensated interpolation. The system also provides means for down converting to conventional definition NTSC (for U.S.A. and Japan) and also means for converting to both high definition and 625 lines format at 25 Hz frame rate.

There now follows a description of a particular system employing the apparatus described above which is used primarily for transfer from 30 Hz film to 30 Hz film permitting HDVS post production. Again, due to the complexity of motion compensated interpolation processing, the equipment therefor tends to be large and expensive. In addition, there is always a risk that processing artifacts may be introduced into the video signal. For these reasons it is important that the number of stages of motion compensated process ing between the source(s) and primary distribution path should be as few as possible.

Figure 68:
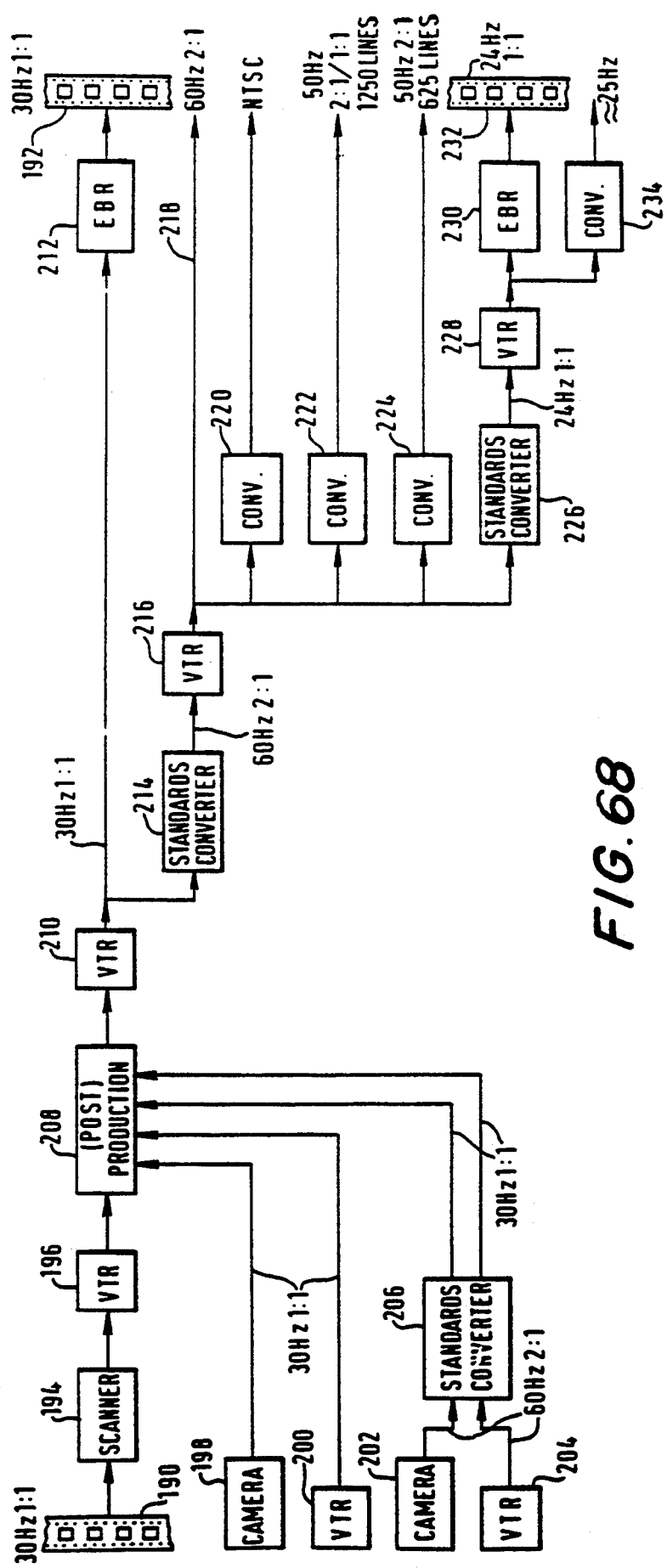
FIG. 68 illustrates an overall system primarily for transfer from 30 Hz 1:1 film to 30 Hz 1:1 film and allowing post production integration with 60 field/s 2:1 interlaced format: material and 30 Hz 1:1 formal material.

Referring to FIG. 68, the first source is 30 Hz film material 190, and the primary output is 30 Hz film 192. The source film 190 is read by a high definition film scanner 194, which provides a 30 Hz 1:1 signal to a VTR 196.

Second and third sources are in the form of a camera 198 and a VTR 200, each of which produce 30 Hz 1:1 video signals. Fourth and fifth sources are in the form of a camera 202 and a VTR 204, each of which provide a 60 field/s 2:1 interlace HDVS signal to a standards converter 206 which converts the signals to 30 Hz 1:1 format with motion adaptive interpolation, but not motion compensated interpolation. The convertor 206 is therefore of the form described above with reference to FIGS. 57 and 58.

The 30 Hz 1:1 format signals from the VTR 196, camera 198, VTR 200 and standards converter 206 can be integrated in the HDVS post production system 208 to produce an output 30 Hz 1:1 video signals, which can be recorded by the VTR 210. The primary output path is from the VTR 210 to an EBR 212 which products the output 30 Hz 1:1 film 192.

Secondary distribution paths are provided from the VTR 210 via a standards converLer 214 to a VTR 216. The converter 214 converts the input 30 Hz 1:1 video signals to 60 field/s 2:1 interlace format, and is therefore of the form described above with reference to FIG. 54. The signal reproduced by the VTR 216 can therefore be directly output on the line 218 as a 60 Hz 2:1 interlace HDVS signal, and can also be converted by converters 220, 222, 224 respectively to: NTSC format; 1250/50 format; and 625 lines 50 field/s 2:1 interlace formaL. Furthermore, the 60 field/s 2:1 interlace HDVS reproduced by the VTR 216 can be converted by a standards converter 226, of the type described above with reference to FIGS. 1 to 48, to 24 Hz 1:1 format for producing, via a VTR 228 and EBR 230, 24 Hz 1:1 film 232. The 24 Hz 1:1 signal reproduced by the VTR 228 may also be line rate converted by a converter 234 to produce a pseudo 25 Hz frame rate video signal.

The system described with reference to FIG. 68 has the following features and advantages. Firstly, there are no stages of motion compensated interpolation between any of the acquisition media 190, 198, 200, 202 and 204 and the primary distribution path on 30 Hz film 192. Secondly, the system allows post production integration of video originated material with 30 Hz film material, and the camera 198 may be used live in the post production chain. Secondary distribution paths are provided in 60 field/s 2:4 interlaced format and 59.94 Hz NTSC format with acceptable motion characteristics and without complex motion compensated interpolation. Notion portrayal in the 60 field/s 2:1 interlaced HDVS signal and NTSC signal is enhanced by the motion compensated progressive to interlace conversion by the standards converter 214. A means is provided of outputting 24 Hz film, but this does entail a second stage of motion compensated interpolation. The system also provides means for down converting to conventional definition NTSC (for U.S.A. and Japan) and also means for converting to both high definition and 625 lines format at 25 Hz frame rate. The standards converter 206 permits standard HDVS 2:1 interlaced cameras 202 and VTRs 204 to be used for video acquisition, but their outputs are converted to 30 Hz 1:1 format by a motion adaptive process, and therefore the vertical resolution of moving images will be more limited than in the case of the 30 Hz 1:1 camera 198 and VTR 200. The system of FIG. 68 requires the post production chain to process the images in progressive scan format and in this connection reference is directed to patent application GB 9048805.3, the content of which is incorporated herein by reference.

There now follows a description of a particular system employing the apparatus described above which is used primarily for transfer from 30 Hz or 60 Hz film to 60 field/s 2:1 interlaced HDVS signals permitting HDVS post production. Again, due to the complexity of motion compensated interpolation processing, the equipment therefor tends to be large and expensive. In addition, there is always a risk that processing artifacts may be introduced into the video signal. For these reasons it is important that not more than one stage of motion compensated processing should be used between the source(s) and primary distribution path, if at alll possible.

Figure 69:
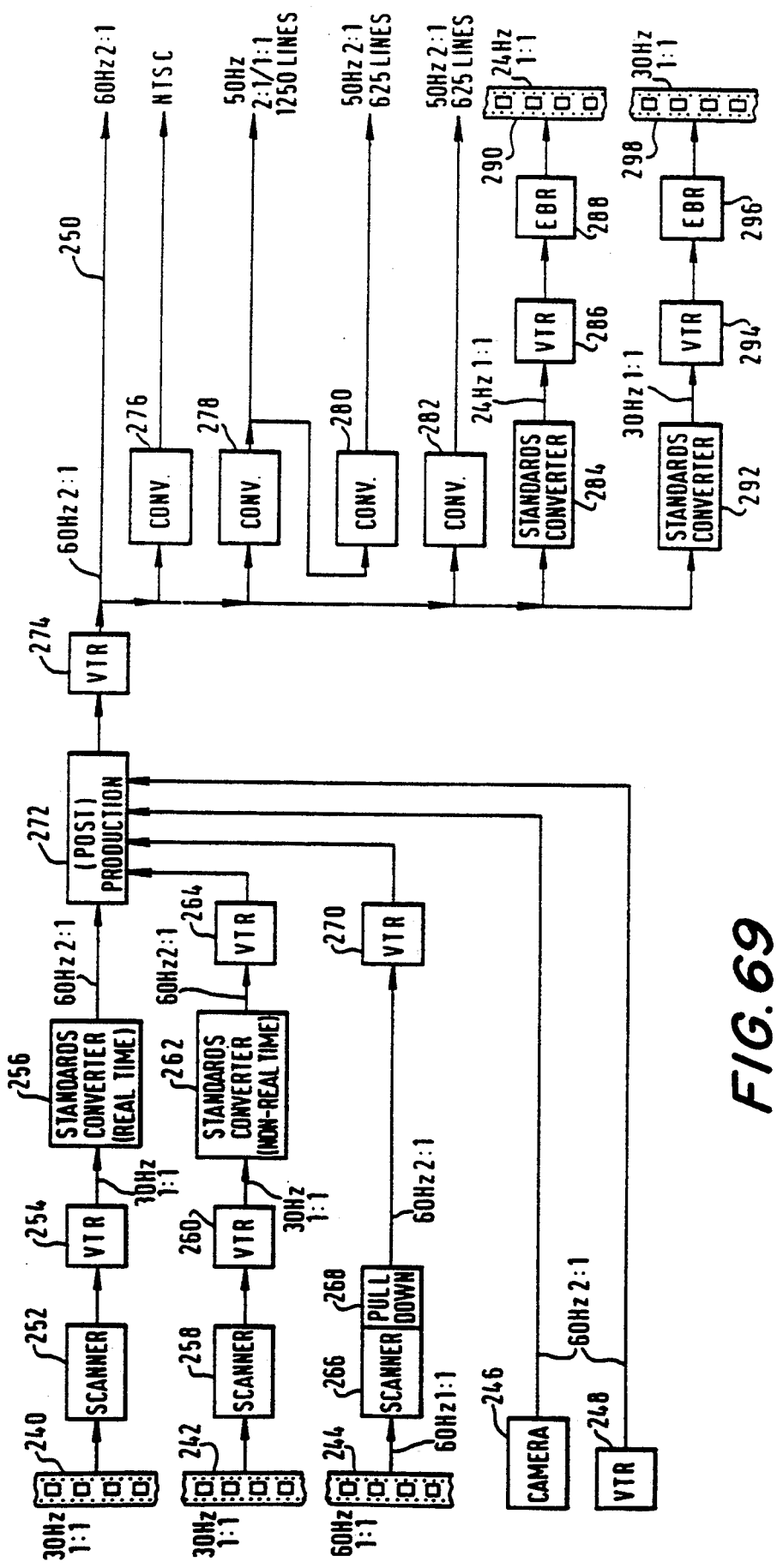
FIG. 69 illustrates an overal 1 system primarily for transfer from 30 Hz 1:1 film and 60 Hz 1:1 film to 60 field/s 2:1 interlace HDVS and allowing post production integration with 60 field/s 2:1 interlaced format material.

Referring to FIG. 69, the first source is 30 Hz film material 240 or 242; the second source is 60 Hz film material 244; the third and fourth sources are a 60 field/s 2:1 interlace HDVS format camera and VTR 248; and the primary distribution is by way of a 60 field/s 2:1 HDVS on line 250.

The 30 Hz source film 242 is read by a high definition film scanner 258, which provides a 30 Hz 1:1 signal to a VTR 260. Upon reproduction of the signal by the VTR 260, it is converted, not necessarily at real-time rate, to 60 field/s 2:1 interlace HDVS format by a standards converter 262, of the type described above with reference to FIG. 54, the converted signal being recorded by a VTR 264. As an alternative, in the case that real-time conversion from 30 Hz 1:1 to 60 field/s 2:1 interlace format becomes possible, the 30 Hz source film 240 may be read by a high definition film scanner 252, which provides a 30 Hz 1:1 signal to a VTR 254. Upon reproduction of the signal by the VTR 254, it is real-time converted to 60 field/s 2:1 interlace format HDVS by a converter 256. In the case of the 60 Hz film 244, it is read by a high definition film scanner 266, which incorporates a device 268 for pulldown on every field, so that a 60 Hz 2:1 interlace format HDVS signal is produced, which is recorded by a VTR 270.

The 60 Hz 2:1 interlace format video signals from the converter, 256, VTR 264, VTR 270, camera 246 and/or VTR 248 can be integrated in the HDVS post production system 272 to produce a 60 field/s 2:1 interlace HDVS signal, which can be recorded by the VTR 274. The primary output path is directly from the VTR 274 on line 250, which carries the reproduced 60 field/s 2:1 interlaced HDVS signal.

Secondary distribution paths are provided from the VTR 274 via an HDVS to NTSC down converter 276 which outputs a standard NTSC signal and via an HDVS to 1250/50 high definition converter 278 which provides a 50 frame/s 1:1 video signal or 50 field/s 2:1 interlace video signal. A 625 lines 50 field per second 2:1 interlaced signal can either be provided by a 1250/50 to 625 lines converter 280 connected to the output of the converter 278, or by an HDVS to 625/50 down converter 282 receiving the 60 field/s 2:1 interlaced signal from the VTR 274.

A further secondary distribution path is provided by a standards converter 284 which converts the 60 field/s 2:1 interlaced HDVS signal from the VTR 274 to 24 Hz 1:1 format which is recorded by the VTR 286. The standards converter 284 is therefore as described above with reference to FIGS. 1 to 48. TIm reproduced signal from the VTR 286 supplies an EBR 288 to produce 24 Hz 1:1 film 290.

A further secondary distribution path is via a standards converter 292 which receives the 60 field/s 2:1 interlaced HDVS from the VTR 274 and provides a 30 Hz 1:1 format signal to a VTR 294. The converter 292 is therefore as described above with reference to FIGS. 57 to 60. The VTR 294 reproduces the 30 Hz 1:1 signal to an EBR 296, which produces a 30 Hz 1:1 film 298.

The system described with reference to FIG. 69 has the following features and advantages. Firstly, there is a single stage of motion compensated interpolation, in the standards converter 262 for the 30 Hz film 258, between all of the acquisition media and the primary distribution path on line 250. Secondly, the system allows post production integration of 60 field/s 2:1 interlaced HDVS originated material with 30 Hz and 60 Hz film material, and the camera 246 may be used live in the post production chain. A secondary distribution path is provided to output 30 Hz film, and in this case the standards converter 284 may be used without motion compensated interpolation processing, using only motion adaptive interpolation, as described above with reference to FIGS. 57 and 58. A means is provided of outputting 24 Hz film, but this does entail a second stage of motion compensated interpolation. The system also provides means for down converting to conventional definition NTSC (for U.S.A. and Japan) and also means for converting to both high definition and 625 lines format at 25 Hz frame rate.

There now follows a description of a particular system employing the apparatus described above which is used primarily for transfer from 30 Hz film to 24 Hz film permitting HDVS post production. Again, due to the complexity of motion compensated interpolation processing, the equipment therefor tends to be large and expensive. In addition, there is always a risk that processing artifacts may be introduced into the video signal. For these reasons it is important that the number of stages of motion compensated processing between the source(s) and primary distribution path should be as few as possible.

Figure 70:
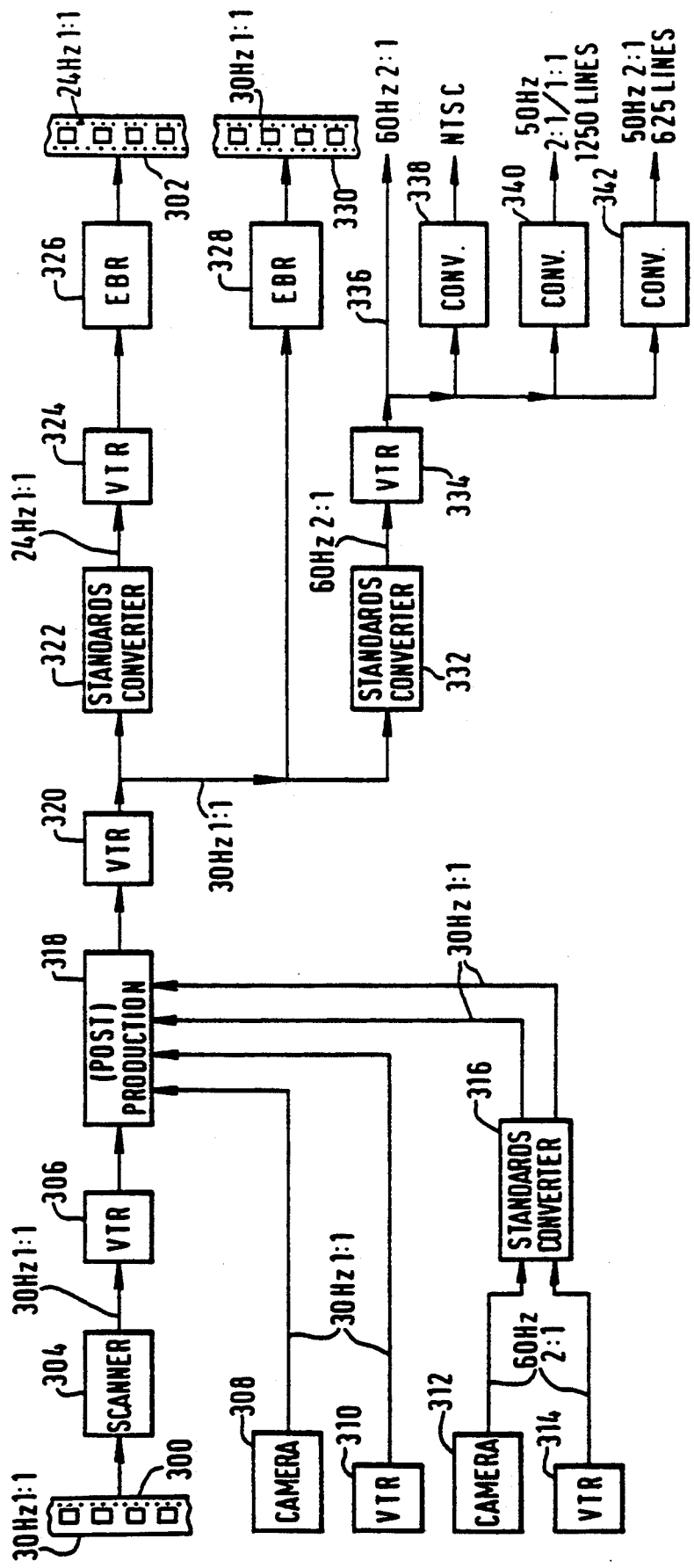
FIG. 70 illustrates an overall system primarily for transfer from 30 Hz 1:1 to 24 Hz 1:1 or 30 Hz 1:1 film and allowing post production integration with 30 Hz 1:1 video or 60 Hz 2:1 video.

Referring to FIG. 70, the first source is 30 Hz film material 300, and the primary output is 24 Hz film 302. The source film 300 is read by a high definition film scanner 304, which provides a 30 Hz 1:1 signal to a VTR 306.

Second and third sources are in the form of a camera 308 and a VTR 310, each of which produce 30 Hz 1:1 video signals. Fourth and fifth sources are in the form of a camera 312 and a VTR 314, each of which provide a 60 field/s 2:1 interlace HDVS signal to a standards converter 316 which converts the signals to 30 Hz 1:1 format with motion adaptive interpolation, but not necessarily motion compensated interpolation. The converter 316 is therefore of the form descrihed above with reference to FIGS. 57 and 58.

The 30 Hz 1:1 formal signals from the VTR 306, camera 308, VTR 310 and standards converter 316 can he integrated in the HDVS post production system 318 to produce an output 30 Hz 1:1 video signals, which can be recorded by the VTR 320. The primary output path is from the VTR 320 via a standard converter 322 which converts to 24 Hz 1:1 format and a VTR 324 to an EBR 326 which produces the output 24 Hz 1:1 film 302.

A secondary distribut ion path is provided from the VTR 210 to an EBR 328 which produces 30 Hz 1:1 formal film 330. Further secondary distribution paths are via a standards converter 332 to a VTR 334. The converter 332 converts the input 30 Hz 1:1 video signal to 60 field/s 2:1 interlace HDVS format, and is therefore of the form described above with reference to FIG.

54. The signal reproduced by the VTR 334 can therefore be directly output on the line 336 as a 60 Hz 2:1 interlace HDVS signal, and can also be converted by converters 338, 340, 342 respectively to: NTSC format; 1250/50 format; and 625 lines 50 field/s 2:1 interlace lormat.

The system described with reference to FIG. 70 has the following features and advantages. Firstly, there is only one stage of motion compensated interpolation (in converter 332) between any of the acquisition media 300, 308, 310, 312 and 314 and the primary distribution path on 24 Hz 1:1 film 302, and there is no motion compensated interpolation between the inputs and the output: 30 Hz 1:1 film. Secondly, the system allows post production integration of video originated material with 30 Hz film material, and the camera 308 may be used live in the post production chain. Secondary distribution paths are provided in 60 field/s 2:1 interlaced format and 59.94 Hz NTSC format with acceptable motion characteristics and without complex motion compensated interpolation, Motion portrayal in the 60 field/s 2:1 interlaced video signal and NTSC signall is enhanced by the motion compensated progressive to interlace conversion by the standards converter 332. The system also provides means for down converting to conventional definition NTSC (for U.S.A. and Japan) and also means for converting to both high definition and 625 lines format at 25 Hz frame rate. The standards converted 316 permits standard HDVS 2:1 interlaced cameras 312 and VTRs 314 to be used for video acquisition, but their outputs are converted to 30 Hz 1:1 format by a motion adaptive process, and therefore the vertical resolution of moving images will be more limited than in the case of the 30 Hz 1:1 camera 198 and VTR 200, The system of FIG. 70 requires the post production chain to process the images in progressive scan format and in this connection reference is directed to patent application GB 9018805.3, the content of which incorporated herein by reference.

In the arrangement described above with reference to FIG. 2, the VTR 11 plays at one-eighth speed into the standards converter 12, and the standards converter provides ten repeats of each output frame. The frame recorder 13 stores one in every ten of the repeated output frames until it is full, and the stored frames are then output at normal speed to the VTR 14 which records at normal speed. The material is therefore converted in segments, entailing starting, stopping and cuing of both of the VTRs 11,14. In order to convert one hour of source material using a frame recorder 13 with a capacity of 256 frames, it is necessary to start, stop and cue each of the recorders 338 times, and it will be realised that this can cause considerable wear of both recorders. Furthermore, the operations of alternately reading from the VTR 11 and then recording on the VTR 14, with cuing of both recorders results in the conversion process being slow. Indeed, in the example given above, although the standards converter processes at one-eighth speed, the conversion of one hour of material would take not 8 hours, but almost 11 hours. With smaller capacity frame to recorders 13, the wasted the would be increased.

The arrangement of FIG. 71 will now be described, which is designed to increase the conversion rate to the maximum possible. Instead of one frame recorder 13 of 256 frame capacity, two frame recorders 13A, 13B are provided, each of 128 frame capacity, each receiving the output of the sLandarcts converter 12, and each controlled by the system controller 15. The outputs of the frame recorders 13A, 13B are fed to a 2:1 digital multiplexer 13C, which selects the output from one or the other of the frame recorders 13 under control of the system controller 15 and supplies the selecLed signal to the VTR 14. With this modification, the source VTR 11 is operated non-stop, and every tenth frame in a series of 1280 frames output by the standards converter are recorded, alternately 128 frames by one frame recorder 13A and 128 frames by the other frame recorder 13B. When one frame recorder is recording, the other frame recorder has time to play back its stored 128 frames to the VTR 14. Thus, in the conversion of 1 hour of material, the VTR 11 starts and stops once, and the VTR 14 starts and stops 675 times, with sufficient the between stops and starts for the VTR 14 to be used. Accordingly, the conversion time for 1 hour of material is 8 hours, as limited by the processing rate of the standards converter.

Figure 71:
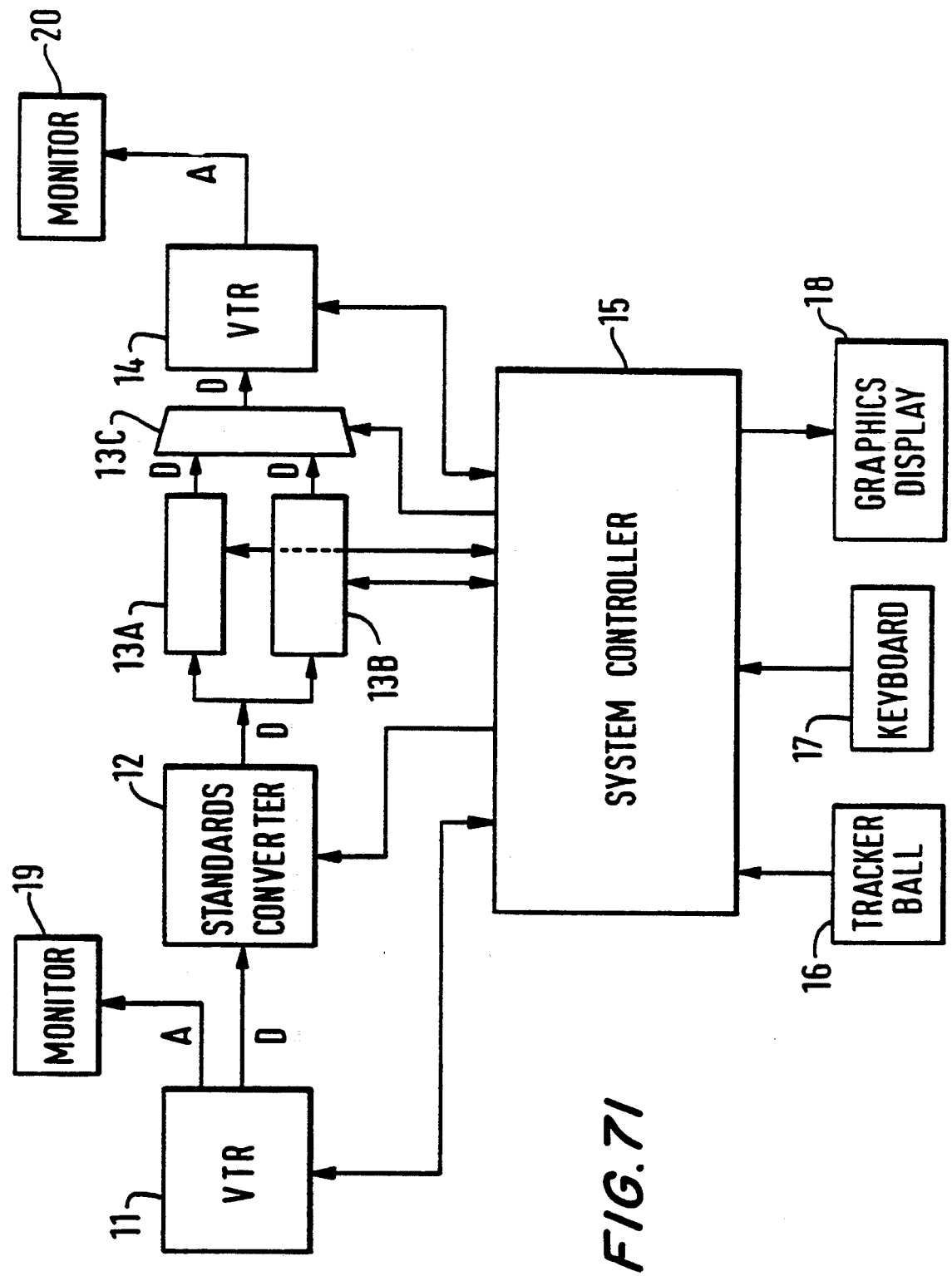
FIG. 71 shows a modification to FIG. 2 to increase the conversion rate.

As an alternative to the arrangement of FIG. 71, a system as shown in FIG. 2 may be used, but in which a frame recorder 13 is used which permits simultaneous recording and playback and which is operable with a cyclic frame addressing scheme. Thus, frames from the standards converter 12 can be stored al the relatively low rate dictated by the converter 12, and then, when the frame recorder is nearly full, the frames can be played back to the VTR 14 at the relatively high rate required by the VTR 14 (while the frame recorder is still being fed by the converter 12) leaving space in the frame recorder to be over written by further input frames. The use of this type of frame recorder reduces the memory requirement, as compared with the arrangement of FIG. 71, and also obviates the need for the multiplexer 13C.

Figure 72:
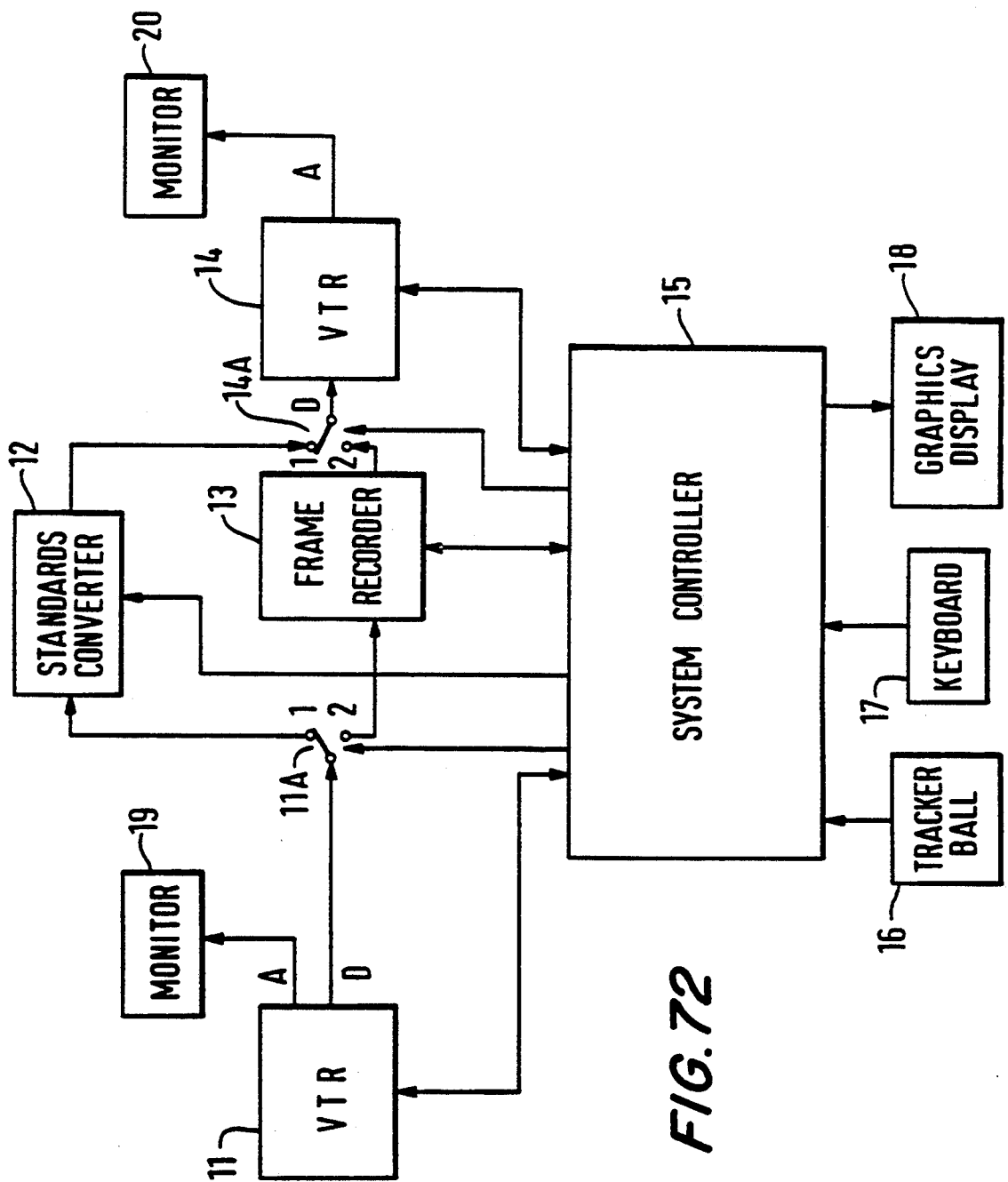
FIG. 72 shows a modification to FIG. 2 to enable conversion to take place in two phases requiring less starting and stopping of the video tape recorders.

The arrangement of FIG. 72 will now be described, which is designed to reduce the amount of wear of the VTRs 11, 14. The arrangement. of FIG. 72 is similar to that of FIG. 2, except that the path between the VTR 11 and the VTR 14 is either via the standards converter 12 when switches 11A, 14A under control of the system controller 15 are each in position "1", or via the frame recorder 13 when the switches 11A, 14A are each in position "2". Operation is in two phases: phase 1 when the switches are in position 1 and then phase 2 when the switches are in position 2.

In the following description it is considered that the tapes on the VTRs 11 , 14 have a number of sequential positions or slots for frames, which are numbered 0 to 86399, plus some spare, in the case of recording 1 hour of frames in 24 Hz 1:1 format, and that the frames of the 1 hour of material to be recorded in 24 Hz 1:1 format are numbered sequentially 0 to 86399. I t is also assumed that the frame recorder has a capacity C of 253 frames.

In phase 1, the VTR 11 and VTR 14 are operated intermittently and simultaneously. When VTR 11 is playing, the standards converter 12 produces a series of frames each repeated R times where R=10. The VTR 11 is operated so that $RC(R+1)=27830$ frames (including the repeats) are produced by the standards converter 12, and one in every $R(=10)$ of these frames is recorded by the VTR 14 at normal speed starting at frame slot 0, so that frames 0 to 2782 of the material are recorded in frame slots 0, 10, 20 ... 27820 on the tape on the VTR with the intermediate frame slots left blank. The VTR is then cued back to start reading again at a frame slot offset from the previous starting frame slot by $C(R+1)=2783$ frames, so that for this second recording run the starting slot is 2783. A furthher 27830 frames (including repeats) are produced by the converter and one in ten is recorded, Thus at frame slots 2783, 2793, 2803 . . . 30603 of the tape on the VTR. Re-cuing and frame production and recording continues like this, and the table below gives examples of the numbers of frames and the frame slots at which they are recorded, after the VTR's 11, 14 have been started and stopped 1+INT(86399/2783) (=32) times and all 86400 frames have been recorded by the VTR 14.

| Pass No. | First Frame No. | | | | Last Frame No. Slot |
|---|---|---|---|---|---|
| 0 | 0 | 1 | 2 | — | 2782 |
|   | 0 | 10 | 20 | — | 27820 |
| 1 | 2783 | 2784 | 2785 | — | 5565 |
|   | 2783 | 2793 | 2803 | — | 30603 |
| 2 | 5566 | 5567 | 5568 | — | 8348 |
|   | 5566 | 5576 | 5586 | — | 33386 |
| 3 | 8349 | 8350 | 8357 | — | 11131 |
|   | 8349 | 8359 | 8369 | — | 36169 |
| 4 | 11132 | 11133 | 11134 | — | 13914 |
|   | 11132 | 11142 | 11152 | — | 38952 |
| 5 | 13915 | 13916 | 13917 | — | 16697 |
|   | 13915 | 13925 | 13935 | — | 41735 |
| 6 | 16698 | 16699 | 16700 | — | 19480 |
|   | 16698 | 16708 | 16718 | — | 44518 |
| 7 | 19481 | 19482 | 19483 | — | 22263 |
|   | 19481 | 19491 | 19501 | — | 47301 |
| 8 | 22264 | 22265 | 22266 | — | 25046 |
|   | 22264 | 22274 | 22284 | — | 50084 |
| 9 | 25047 | 25048 | 25049 | — | 27829 |
|   | 25047 | 25057 | 25067 | — | 52867 |
| 10 | 27830 | 27831 | 27832 | — | 30612 |
|   | 27830 | 27840 | 27850 | — | 55650 |
| : | : | : | : | — | : |
| : | : | : | : | — | : |
| 31 | 86273 | 86274 | 86275 | — | 86399 |
|   | 86273 | 86283 | 86293 | — | 87533 |

If the above table is analyzed, it will be noted that any particular frame, having frame number F, is recorded during pass number $P = INT(F/C(R+1))$, and that it is recorded at slot number $S = RF - CP(R^2 - 1)$. It, should be also noted that nearer the beginning and end of the recorded tape, not. every frame slot is used. For example, between slots 0 and 2783, nine out of ten slots are left blank, and between slots 2783 and 5566 eight out of ten are blank.

In the second phase, the tape recorded on the VTR 14 during phase 1 is loaded onto the VTR 11; a fresh tape is loaded onto the VTR 14; and the switches 11A, 14A are moved to position "2". The tapes on the VTRs 11, 14 are then run continuously at normal speed and rewound repeatedly until the tapes have made R+1 (=11) passes through the VTRs 11, 14. During each pass, selected frames from the VTR 11 are stored in the frame recorder 13 until it has reached its capacity and the stored frames are then output to and recorded by the VTR 14; and this is repeated until the end of the recorded tape is reached. For each pass, there is a different offset between the slot numbers of the tapes on the two VTRs 11, 14.

More specifically, for each pass P (P=0 to R), the VTR 14 is started after the VTR 11 so that there is an offset between the slot number $S_1$ of the tape on the VTR 14 and the slot number $S_0$ the tape on the VTR 11 of $S_0 - S_1 = C(PR + R - P)$. Starting at slot number $S_0 = PCR$ on the VTR 11, every Rth (=10 th) frame is stored in the frame recorder 13 until it is full, i.e. has stored C frames. With both VTRs 11, 14 running, the stored Iraroes are output from the frame recorder 13 at normal speed and recorded by the VTR 14. This is then repeated so that every next Rth frame from the VTR 11 is stored in the frame recorder 13, and so on. A specific example of this is shown in the table below, where $F_0$ is the original frame numher of a frame input to the frame recorder and $F_1$ is the original frame; number at a frame output from the frame recorder.

| $S_0$ | $F_0$ | $F_1$ | $S_1$ | $S_0$ | $F_0$ | $F_1$ | $S_1$ |
|---|---|---|---|---|---|---|---|
| Pass 0 | | | | Pass 1 | | | |
| 0 | 0 | — | 2530 | 253 | | — | |
| 10 | 1 | — | 2540 | 254 | | — | |
| 20 | 2 | — | 2550 | 255 | | — | |
| : | : | — | : | : | | — | |
| 2520 | 252 | — | 5050 | 505 | | — | |
| 2530 | | 0 | 0 | 5060 | | 253 | 253 |
| 2531 | | 1 | 1 | 5061 | | 254 | 254 |
| : | | : | : | : | | : | : |
| 2782 | | 252 | 252 | 5312 | | 505 | 505 |
| 2783 | 2783 | | 253 | 5313 | 3036 | | 506 |
| 2793 | 2784 | | 263 | 5323 | 3037 | | 507 |
| : | : | | : | : | : | | : |
| 5303 | 3035 | | 2773 | 7833 | 3288 | | 3026 |
| 5313 | | 2783 | 2783 | 7843 | | 3036 | 3036 |
| 5314 | | 2784 | 2784 | 7844 | | 3037 | 3037 |
| : | | : | : | : | | : | : |
| 5565 | | 3035 | 3035 | 8095 | | 3288 | 3288 |
| : | | : | : | : | | : | : |
| Pass 10 | | | | Pass P (General case) | | | |
| 25300 | 2530 | | — | PCR | CP | | |
| 25310 | 2531 | | — | +10 | +1 | | |
| : | : | | — | : | : | | |
| 27820 | 2782 | | — | +10 | +1 | | |
| 27830 | | 2530 | 2530 | +10 | | CP | CP |
| 27831 | | 2531 | 2531 | +1 | | +1 | +1 |
| : | | : | : | : | | : | : |
| 28082 | | 2782 | 2782 | +1 | | +1 | +1 |
| 28083 | 5313 | | 2783 | +1 | C(P + R + 1) | | +1 |
| 28093 | 5314 | | 2793 | +10 | +1 | | +10 |
| : | : | | : | : | : | | : |
| 30603 | 5565 | | 5303 | +10 | +1 | | +10 |

-continued

| S₀ | F₀ | F₁ | S₁ | S₀ | F₀ | F₁ | S₁ |
|---|---|---|---|---|---|---|---|
| 30613 |  | 5313 | 5313 | +10 |  | C(P + R + 1) | +10 |
| 30614 |  | 5314 | 5314 | +1 |  | +1 | +1 |
| : | : | : | : | : |  | : | : |
| 30865 |  | 5565 | 5565 | +1 |  | +1 | +1 |
| : | : |  | : | +1 | C(P + 2R + 2) |  | +1 |
| : | : |  | : | +10 | +1 |  | +10 |
|  |  |  |  | : | : |  | : |

From an analysis of the above tables it will be appreciated that the original frames are recorded stage by stage at the appropriate frame slots on the tape on the VTR 14, so that after the R+1 passes all, of the original frames are recorded in the correct order on the tape.

For the above system to operate satisfactorily without frames on the intermediate tape being overwritten, it is necessary that (C modulo R) is non-zero, and that (C modulo R) and R do not have a common factor. Values of C and R may be chosen which do not satisfy these conditions, but it is then necessary to employ a more complicated system to determine the slavting slots of the intermediate tape in phase 1, and the offsets $S_0-S_1$ in phase 2, and possibly to make more than (R+1) passes of the tapes in phase 2.

During phase 1 of the above procedure, the number of starts and stops of each VTR 11, 14 is 1+ the integral part of ((highest frame number)/C(R+1)) which is 1+INT(86399/2783)=32 in the example given, and thus 64 total for both VTRs 11, 14. In phase 2, there are (R+1) starts and stops of each VTR, giving 22 for both recorders. Accordingly, the total number of starts and stops is 86 over both phases, which compares favourably with the figure of 676 for the arrangement of FIG. 2 without this modification.

In the arrangement described above, it is necessary for the VTR 11 to be ahle to provide a slow motion output, for example at one-eighth speed in the case of conversion from 60 field/s 2:1 interlace format to 24 Hz 1:1 format. If a versatile system is to be provided capable of converting between a variety of different formats, then the standards converter 13 requires a variety of input speeds, e.g. 1/8, 1/10, 1/20 th. In order to obviate the need for a VTR capable of a variety of playback speeds, the arrangement of FIG. 73 may be used. In this arrangement, a frame recorder 11A is placed in the path between the VTR 11 and the standards converter 12 under control of the system controller 15. The VTR 11 is operated at normal speed, and a series of the output frames (e.g. 256) are stored in the frame recorder 11A. When full, the frame recorder outputs each stored frame to the standards converter 12 the required number of times, for example ten times to simulate one-tenth speed, meanwhile the VTR 11 is cued ready to supply the next 256 frames to the frame recorder 11A once all of the stored frames have been output to the standards converter.

Figure 73:
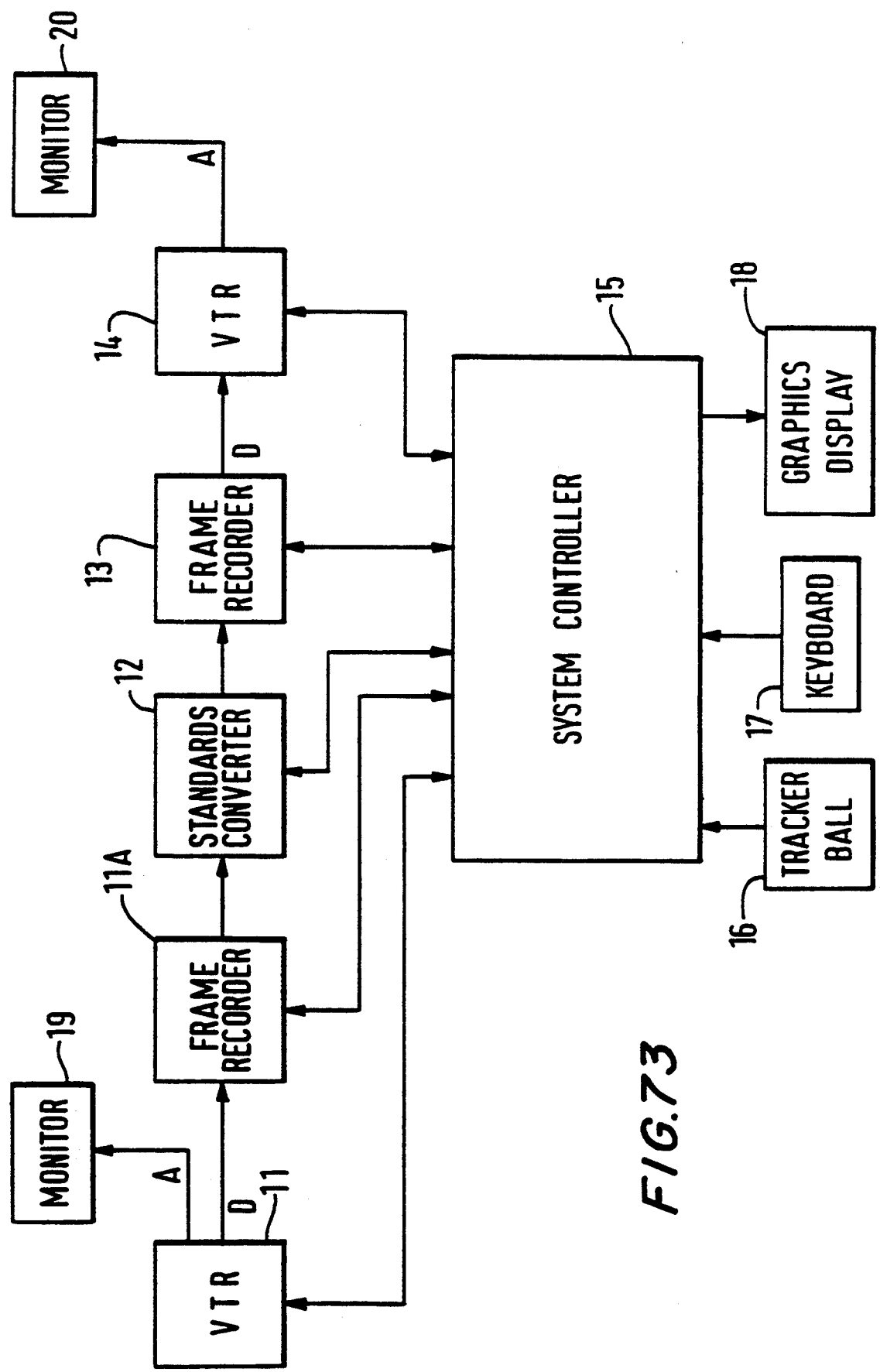
FIG. 73 shows a modification to FIG. 2 which obviates the need for a slow-motion source video tape recorder.
Figure 74:
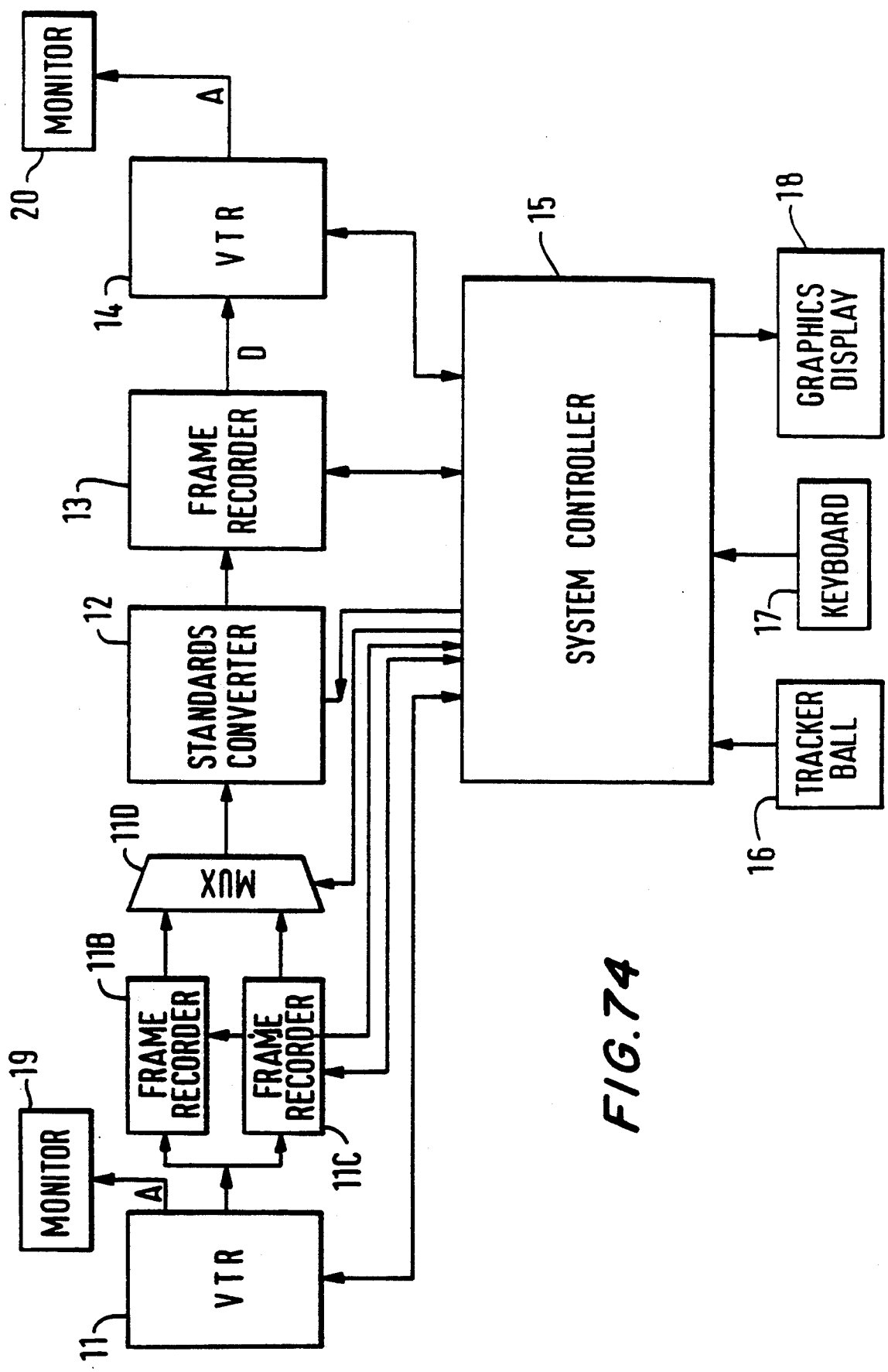
FIG. 74 shows a modification to FIG. 73 which also increases the conversion rate.

With the arrangement of FIG. 73, the standards converter cannot be operated continuously, because the has to be allowed for frame recorder 11A to be refreshed. In order to avoid this problem, a special cyclically addressable frame store as described above may be used, or alternatively the modification as shown in FIG. 74 may be made. In FIG. 74, a pair of frame recorders 11B, 11C are provided in parallel, and each of which can output via a 2:1 digital multiplexer 11D (controlled by the system controller 15) to the standards converter 12. Thus, when either frame recorder 11B, 11C is outputting to the standards converter 12, there is the got the next series of frames Lo be stored in the other frame recorder. Accordingly, continuous output to, and operation of, the standards converter 12 is permitted.

It will be appreciated that the modifications described above with reference to FIG. 71 and FIGS. 73 or 74 may be combined to permit continuous conversion at less than real-time speed without the need for slow-motion replay.

In a motion compensated interpolating system as described above with reference to FIGS. 1 to 48, only a small number of motion vectors can be tested on a pixel-by-pixel basis. For optimum operation of the system it is important that the best vectors are pre-selected for testing by the motion vector selector 46, Techniques using global motion vectors only have proved to be good for many types of picture and techniques using only locally derived motion vectors have proved good for certain material. Neither is good for all material, In order to improve on the system described above, a concept will now be described of dividing a picture up into large subdivisions and then calculating which motion vectors are detected most frequently in each of those subdivisions, This technique is an intermediate technique which combines good points from both of the above mentioned approaches.

The technique described above includes the process of counting the most frequently detected motion vectors within a given field and making these tootion vectors available for use throughout the picture, Calculating the most frequent vectors over the whole picture area and Then applying them in sonic overall vector reduction strategy has the advantage of providing likely vectors in areas where results obtained from immediately surrounding pixels are inconclusive. The technique described above with reference to FIGS. 1 to 48 includes the process of 'growing' which is a technique of two-dimensional area summing of correlation surfaces derived from block matching with those derived from adjacent areas of the picture (as described particularly with reference to FIG. 21) to enlarge the area over which the match is performed if the nature of the original surface does not permit a good vector to be calculated. Vector reduction as described before considers pictures in progressively larger blocks in order to discover satisfactory vectors to be applied to pixels within that region. These blocks start with a single 'search area' of, for example 32×24 pixels which can then be 'grown' in a variety of ways up to a maximum of, for example, 160×72 pixels. Thereafter global vectors are derived from the entire picture area of, for example, 1920×1035 pixels.

The advantage of considering a range of different block sizes when determining vectors is that the area which just encompasses a moving object over two field intervals is nearly optimum for discovering that motion vector. Thus small blocks favour small objects and large blocks favour large objects, such as a panning background.

In the strategy described with reference to FIGS. 1 to 48, no area larger than 160×72 and smaller than 1920×1035 is considered. However, by subdividing the picture into a number of regular adjoining or overlapping areas and deriving an intermediate vector or vectors for each of those areas in turn it is possible to favour the vectors pertaining to larger objects whose features make reliable detection of vectors over their whole surface by methods described before difficult, but which are still too small relative to the overall picture to be significant in a list of global vectors.

Figure 75:
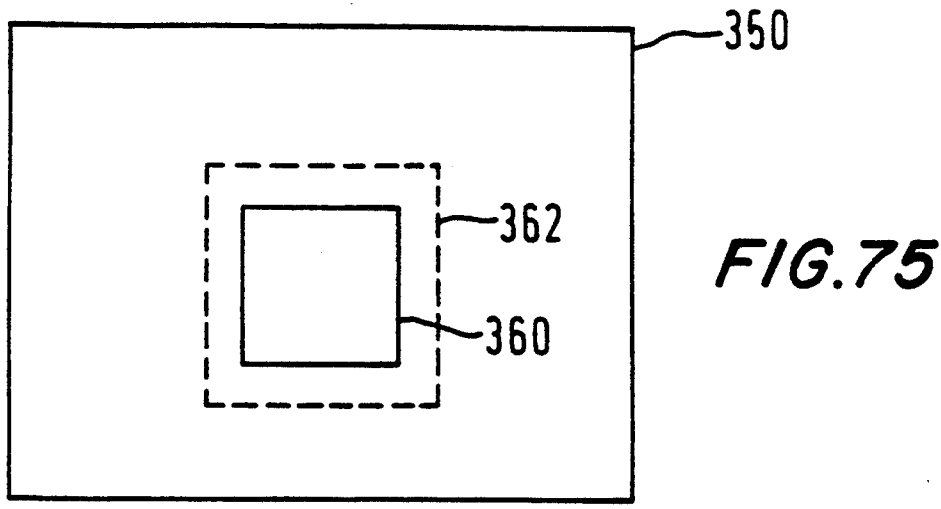
FIGS. 75 to 78 illustrates how an image area may be sub-divided into intermediate areas for determining and applying intermediate motion vectors.
Figure 76:
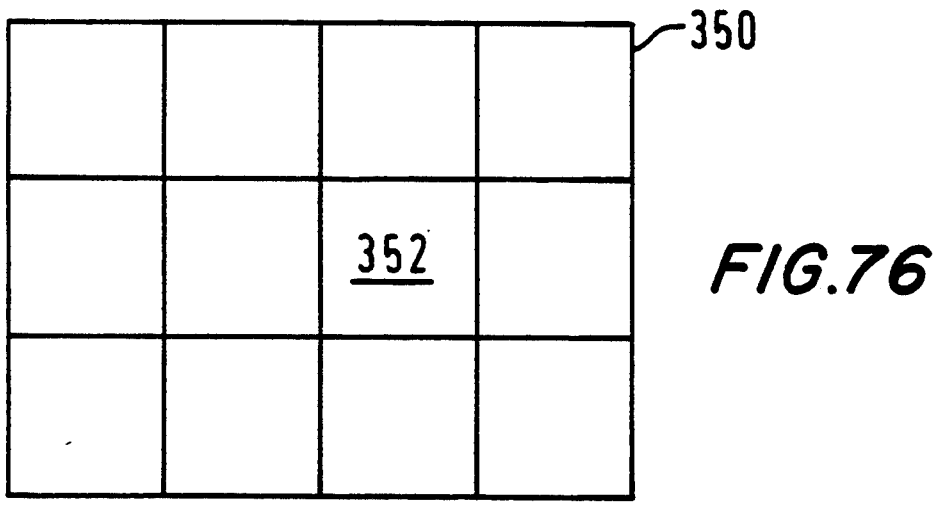
Figure 77:
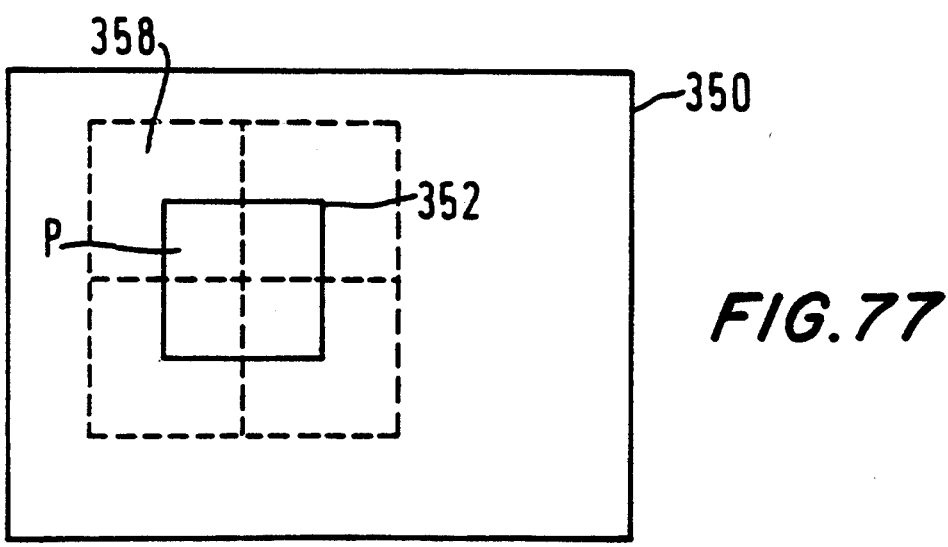
Figure 78:
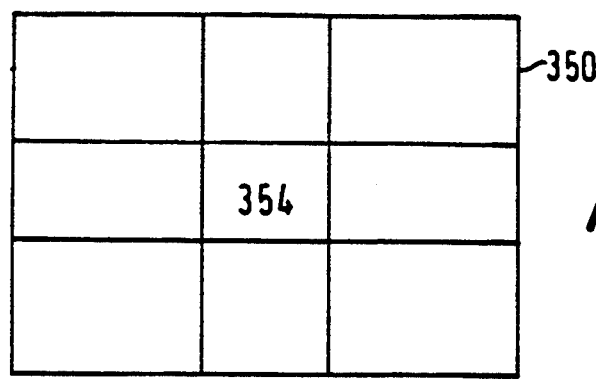

The subdivision of the picture area may be done in a number of ways. For example, the picture area 350 may be divided into a regular array, for example a 4×3 array, of intermediate areas 352, as shown in FIG. 76, or a non-regular array, for example a 3×3 array, of intermediate areas, as shown in FIG. 78, with, for example, the centre area 354 smaller than the rest so that the intermediate vector or vectors for that area are more localised than for the other areas. The intermediate areas may adjoin, but be distinct, as in FIGS. 76 and 78, or they may overlap, as shown by the example areas in FIG. 77. Thus, in FIG. 77, the motion vectors available for an output pixel P which lies both in area 356 and 358 are: the global vector(s), the intermediate vector(s) for area 356; the intermediate vector(s) for area 358; and the local vector(s) For the pixel P. Alternatively, as shown in FIG. 75, the intermediate vector(s) which are output for an intermediate area 360 may be calculated using an area 362 which is larger than and encloses the area 360, or indeed an area which is smaller than the area 360. These methods shown in FIGS. 75 and 77 minimise edge effects caused by small parts of larger objects extending into adjacent intermediate areas.

Figure 79:
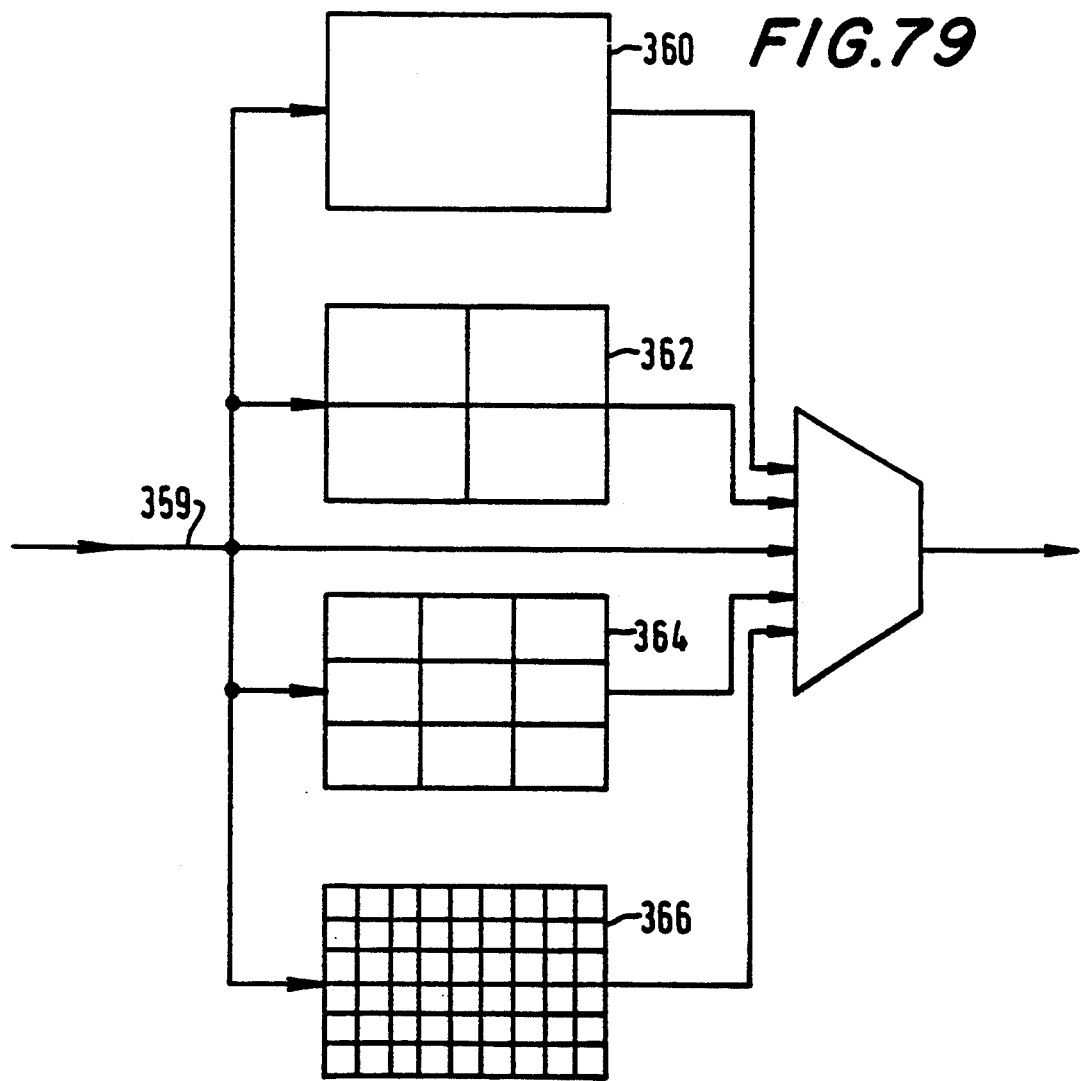
FIG. 79 illustrates schematically how local, global and various intermediate motion vectors are made available for selection.

In the arrangement described with reference to FIGS. 1 to 48, the motion vector for a pixel is selected from the global vector(s) for the whole picture and the local vector(s) for the pixel under consideration. This scheme is expanded to include the possibility of selecting from one or more types of intermediate vector for intermediate areas including the pixel under consideration, as shown in FIG. 79. The local vectors 359 for the picture are used to form a global vector 362 for a 2×2 array of intermediate areas; second intermediate vectors 364 for a 3×3 array of intermediate areas; and third intermediate vectors 366 for a 9×6 array of intermediate areas. The global, intermediate and original local vectors for each pixel are then supplied in combination to the motion vector selector 46 (FIG. 4).

In the above description, reference has been made to acquiring progressive scan format signals from photographic film and to using output progressive scan signals to record photographic film. It will be appreciated that other image sources may be used and other end products may be generated. For example, the input images may be computer generated, or produced by an animation camera, or video equipment.

Reference has also been made above to a 3232 pulldown format. It will be appreciated that other pulldown formats, such as 3223, 2323, or 2332 may alternatively be used.

Having described preferred embodiments of the inventions with reference to the accompanying drawings, it is to be understood that the inventions are not limited to the precise embodiments and that various changes and modification thereof may he effected by one skilled in the art without departing from the spirit or scope of the inventions as defined in the appended claims.

What we claim is:

1. A method of converting an input 60 field/s 2:1 interlace scan format digital video signal to an output 24 frame/s 60 field/s 3232 pulldown format digital video signal, comprising the steps of:

forming a first series of 60 frame/s progressive scan format frames from the fields of the input signal;

forming a second series of 24 frame/s progressive scan format frames from the first series of frames such that at least every other frame in the second series of frames is produced by motion compensated interpolation between a respective pair of successive frames of the first series of frames;

forming alternately odd and even fields from the second series of frames such that one field in every five is a repeat; and forming said output 24 frame/s 60 field/s 3232 pulldown format digital video signal from the alternately odd and even fields formed from the second series of frames.

2. A method as claimed in claim 1, wherein alternate frames of the second series are produced by motion compensated interpolation equally between a respective successive pair of frames of the first series, and the remaining frames of the second series are not produced by motion interpolated compensation.

3. A method as claimed in claim 1, wherein the alternately odd and even fields are supplied at a rate of 5/2 times the rate of production of the frames in the second series of frames.

4. A method as claimed in claim 1, further comprising the step of storing the frames in the second series at the same rate as they are produced, and wherein the alternately odd and even fields are produced from the stored frames such that one field in every five is a repeat.

5. A method as claimed in claim 1, wherein each input field is repeated with a repeat rate 4R times, where R is a predetermined integer, a frame is produced in the first series for every 4R repeated input fields, a frame is produced in the second series for every 10R repeated input fields, and each frame in the second series is repeated with a repeat rate of 5R times.

* * * * *